United States Patent
Farag et al.

(10) Patent No.: US 12,446,058 B2
(45) Date of Patent: Oct. 14, 2025

(54) METHOD AND APPARATUS FOR FAST BEAM INDICATION

(71) Applicant: Samsung Electronics Co., Ltd., Suwon-si (KR)

(72) Inventors: Emad N. Farag, Flanders, NJ (US); Eko Onggosanusi, Coppell, TX (US); Md. Saifur Rahman, Plano, TX (US); Dalin Zhu, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/432,916

(22) Filed: Feb. 5, 2024

(65) Prior Publication Data

US 2024/0179733 A1    May 30, 2024

Related U.S. Application Data

(63) Continuation of application No. 17/444,556, filed on Aug. 5, 2021, now Pat. No. 11,895,681.

(Continued)

(51) Int. Cl.
*H04W 72/53*     (2023.01)
*H04W 16/28*     (2009.01)
(Continued)

(52) U.S. Cl.
CPC .......... *H04W 72/53* (2023.01); *H04W 16/28* (2013.01); *H04W 72/046* (2013.01); *H04W 72/23* (2023.01); *H04W 80/02* (2013.01)

(58) Field of Classification Search
CPC ............................. H04W 16/28; H04W 80/02
See application file for complete search history.

(56) References Cited

U.S. PATENT DOCUMENTS 11,895,681 B2 *   2/2024   Farag .................. H04W 72/046
2019/0349964 A1   11/2019   Liou
(Continued)

FOREIGN PATENT DOCUMENTS

WO    2018195528 A1    10/2018
WO    2020019216 A1    1/2020

OTHER PUBLICATIONS

"3rd Generation Partnership Project; Technical Specification Group Radio Access Network; NR; Physical channels and modulation (Release 16)", 3GPP TS 38.211 V16.6.0, Jun. 2021, 134 pages.

(Continued)

*Primary Examiner* — Fahmida S Chowdhury

(57) ABSTRACT

Methods and apparatuses for fast beam indication. A method of operating a UE includes receiving a number (M) of transmission configuration indicator (TCI)state code points activated by a medium access control element (MAC CE) and, if the UE is configured to be indicated TCI state code points on DL control information (DCI) and M>1, receiving the DCI that indicates at least one TCI state code point from the M TCI state code points and determining a TCI state to apply to at least one of downlink (DL) channels and uplink (UL) channels. The method further includes updating one or more spatial filters for at least one of the DL channels and the UL channels based on the determined TCI state and at least one of receiving and transmitting the DL channels and the UL channels, respectively, based on the updated one or more spatial filters.

15 Claims, 21 Drawing Sheets

Related U.S. Application Data

(60) Provisional application No. 63/144,309, filed on Feb. 1, 2021, provisional application No. 63/112,422, filed on Nov. 11, 2020, provisional application No. 63/110,766, filed on Nov. 6, 2020, provisional application No. 63/091,127, filed on Oct. 13, 2020, provisional application No. 63/086,414, filed on Oct. 1, 2020, provisional application No. 63/070,638, filed on Aug. 26, 2020, provisional application No. 63/070,083, filed on Aug. 25, 2020, provisional application No. 63/067,122, filed on Aug. 18, 2020.

(51) Int. Cl.
*H04W 72/044* (2023.01)
*H04W 72/23* (2023.01)
*H04W 80/02* (2009.01)

(56) References Cited

U.S. PATENT DOCUMENTS

| | | | |
|---|---|---|---|
| 2020/0077395 A1 | 3/2020 | Guo | |
| 2020/0235901 A1* | 7/2020 | Dou | H04W 72/23 |
| 2020/0267748 A1* | 8/2020 | Khoshnevisan | H04W 76/15 |
| 2020/0305168 A1 | 9/2020 | Liou | |
| 2021/0036822 A1 | 2/2021 | Lyu | |
| 2021/0037503 A1 | 2/2021 | Nam | |
| 2021/0037532 A1 | 2/2021 | Nam | |
| 2021/0329575 A1 | 10/2021 | Li | |
| 2022/0061056 A1* | 2/2022 | Farag | H04W 16/28 |
| 2022/0124751 A1 | 4/2022 | Matsumura | |
| 2022/0217729 A1 | 7/2022 | Kim | |
| 2022/0224472 A1 | 7/2022 | Kim | |
| 2022/0239433 A1 | 7/2022 | Kim | |
| 2022/0248426 A1 | 8/2022 | Matsumura | |
| 2022/0272736 A1 | 8/2022 | Matsumura | |
| 2022/0295299 A1 | 9/2022 | Park | |
| 2022/0303090 A1 | 9/2022 | Zhang | |
| 2022/0312466 A1 | 9/2022 | Matsumura | |
| 2022/0322410 A1 | 10/2022 | Matsumura | |
| 2022/0400041 A1 | 12/2022 | Ling | |
| 2022/0408472 A1 | 12/2022 | Matsumura | |
| 2023/0007681 A1 | 1/2023 | Yuan | |
| 2023/0027718 A1 | 1/2023 | Venugopal | |
| 2023/0036012 A1* | 2/2023 | Chung | H04L 5/0051 |
| 2023/0068489 A1 | 3/2023 | Abdelghaffar | |
| 2023/0164760 A1* | 5/2023 | Onggosanusi | H04W 72/23 370/329 |
| 2023/0300851 A1* | 9/2023 | Zhou | H04W 72/231 370/329 |
| 2023/0319591 A1* | 10/2023 | Zhou | H04W 16/28 370/329 |
| 2023/0379835 A1* | 11/2023 | Matsumura | H04W 52/14 |
| 2023/0422180 A1* | 12/2023 | Yuan | H04W 52/242 |
| 2024/0014975 A1* | 1/2024 | Zhou | H04L 5/0051 |
| 2024/0040564 A1* | 2/2024 | Cirik | H04L 5/0023 |
| 2024/0040584 A1* | 2/2024 | Yuan | H04W 72/046 |
| 2024/0089861 A1* | 3/2024 | Yuan | H04W 52/146 |
| 2024/0098526 A1* | 3/2024 | Matsumura | H04L 5/0023 |
| 2024/0129988 A1* | 4/2024 | Yuan | H04L 5/0048 |
| 2024/0172223 A1* | 5/2024 | Yuan | H04W 72/232 |
| 2024/0179733 A1* | 5/2024 | Farag | H04B 7/0695 |
| 2024/0187162 A1* | 6/2024 | Nilsson | H04L 5/0091 |
| 2024/0188098 A1* | 6/2024 | Matsumura | H04L 1/1896 |
| 2024/0195479 A1* | 6/2024 | Liu | H04B 7/0691 |
| 2024/0334452 A1* | 10/2024 | Gao | H04L 5/0094 |

OTHER PUBLICATIONS

"3rd Generation Partnership Project; Technical Specification Group Radio Access Network; NR; Multiplexing and channel coding (Release 16)", 3GPP TS 38.212 V16.6.0, Jun. 2021, 153 pages.

"3rd Generation Partnership Project; Technical Specification Group Radio Access Network; NR; Physical layer procedures for control (Release 16)", 3GPP TS 38.213 V16.6.0, Jun. 2021, 187 pages.

"3rd Generation Partnership Project; Technical Specification Group Radio Access Network; NR; Physical layer procedures for data (Release 16)", 3GPP TS 38.214 V16.6.0, Jun. 2021, 172 pages.

"3rd Generation Partnership Project; Technical Specification Group Radio Access Network; NR; Medium Access Control (MAC) protocol specification (Release 16)", 3GPP TS 38.321 V16.5.0, Jun. 2021, 157 pages.

"3rd Generation Partnership Project; Technical Specification Group Radio Access Network; NR; Radio Resource Control (RRC) protocol specification (Release 16)", 3GPP TS 38.331 V16.5.0, Jun. 2021, 964 pages.

"5G; NR; Physical layer measurements (3GPP TS 38.215 version 16.4.0 Release 16)", ETSI TS 138 215 V16.4.0, Jan. 2021, 31 pages.

"3rd Generation Partnership Project; Technical Specification Group Radio Access Network; Evolved Universal Terrestrial Radio Access (E-UTRA); Physical channels and modulation (Release 16)", 3GPP TS 36.211 V16.6.0, Jun. 2021, 249 pages.

"3rd Generation Partnership Project; Technical Specification Group Radio Access Network; Evolved Universal Terrestrial Radio Access (E-UTRA); Multiplexing and channel coding (Release 16)", 3GPP TS 36.212 V16.6.0 , Jun. 2021, 256 pages.

"3rd Generation Partnership Project; Technical Specification Group Radio Access Network; Evolved Universal Terrestrial Radio Access (E-UTRA); Physical layer procedures (Release 16)", 3GPP TS 36.213 V16.6.0, Jun. 2021, 577 pages.

"3rd Generation Partnership Project; Technical Specification Group Radio Access Network; Evolved Universal Terrestrial Radio Access (E-UTRA); Medium Access Control (MAC) protocol specification (Release 16)", 3GPP TS 36.321 V16.5.0, Jun. 2021, 143 pages.

"3rd Generation Partnership Project; Technical Specification Group Radio Access Network; Evolved Universal Terrestrial Radio Access (E-UTRA); Radio Resource Control (RRC); Protocol specification (Release 16)", 3GPP TS 36.331 V16.5.0, Jun. 2021, 1091 pages.

International Search Report and Written Opinion of the International Searching Authority dated Nov. 12, 2021, in connection with International Application No. PCT/KR2021/010931, 7 pages.

Apple Inc., "On Beam Management Enhancement," R1-2006499, 3GPP TSG-RAN WG1 Meeting #102-e, e-Meeting, Aug. 17-28, 2020, 10 pages.

Lenovo, et al., "Enhancements on Multi-beam Operation," R1-2005820, 3GPP TSG RAN WG1#102-e, e-Meeting, Aug. 17-Aug. 28, 2020, 6 pages.

Samsung, "Multi-beam enhancements," R1-2006991, 3GPP TSG RAN WG1 #102-e, e-Meeting, Aug. 17-28, 2020, 15 pages.

Extended European Search Report dated Dec. 1, 2023 regarding Application No. 21858568.5, 7 pages.

ZTE, "Enhancements on Multi-beam Operation", 3GPP TSG RAN WG1 Meeting #102-e, R1-2005454, Aug. 2020, 11 pages.

Japanese Patent Office, Office Action issued Jun. 10, 2025 regarding Application No. 2023-512420, 7 pages.

* cited by examiner

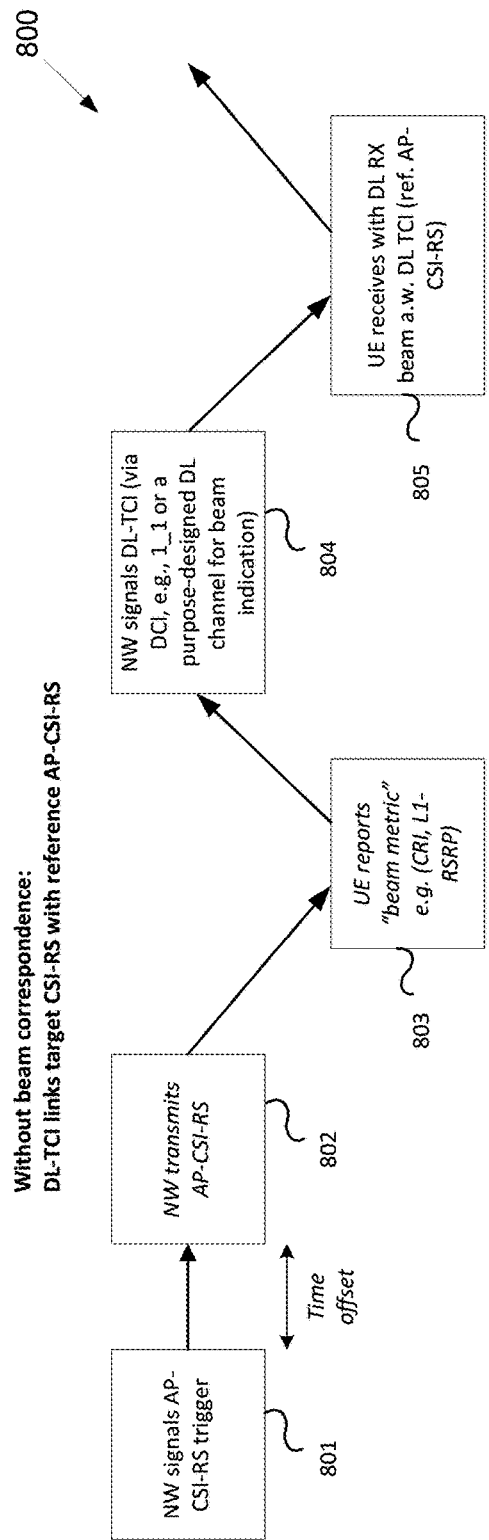
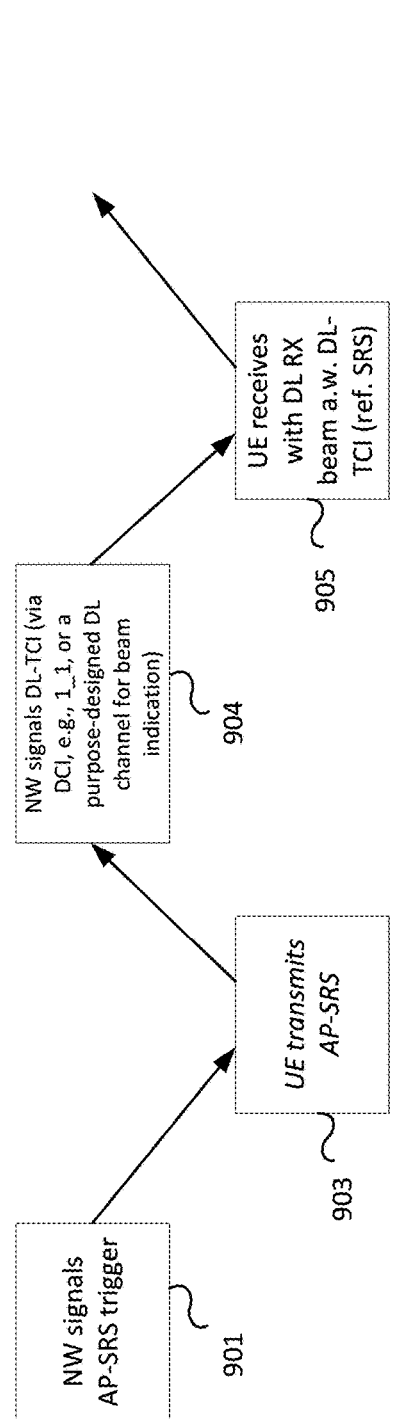
FIG. 8
FIG. 9

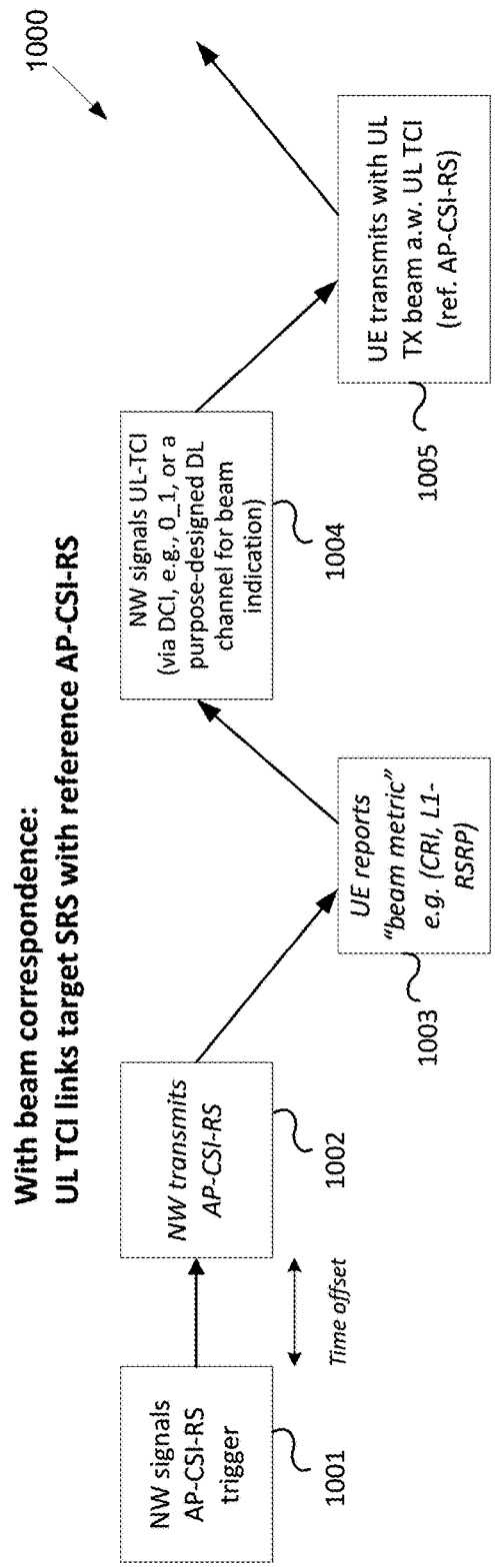
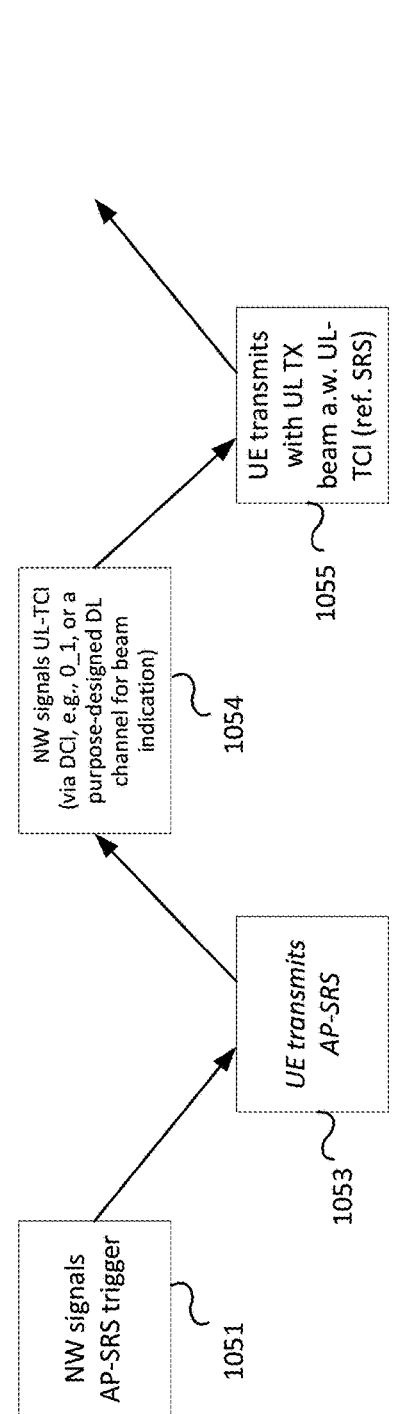
FIG. 10A
FIG. 10B

In one example M1, M2, ..., MN can be different.
In another example M1 = M2 = ... = MN = M

METHOD AND APPARATUS FOR FAST BEAM INDICATION

CROSS-REFERENCE TO RELATED APPLICATIONS AND CLAIM OF PRIORITY

This application is a continuation of U.S. patent application Ser. No. 17/444,556, filed on Aug. 5, 2021, which claims priority to:
- U.S. Provisional Patent Application No. 63/067,122, filed on Aug. 18, 2020;
- U.S. Provisional Patent Application No. 63/070,083, filed on Aug. 25, 2020;
- U.S. Provisional Patent Application No. 63/070,638, filed on Aug. 26, 2020;
- U.S. Provisional Patent Application No. 63/086,414, filed on Oct. 1, 2020;
- U.S. Provisional Patent Application No. 63/091,127, filed on Oct. 13, 2020;
- U.S. Provisional Patent Application No. 63/110,766, filed on Nov. 6, 2020;
- U.S. Provisional Patent Application No. 63/112,422, filed on Nov. 11, 2020; and
- U.S. Provisional Patent Application No. 63/144,309, filed on Feb. 1, 2021.

The content of the above-identified patent document is incorporated herein by reference.

TECHNICAL FIELD

The present disclosure relates generally to wireless communication systems and, more specifically, the present disclosure relates to a fast beam indication.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

The present disclosure relates to wireless communication systems and, more specifically, the present disclosure relates to a fast beam indication.

In one embodiment, a user equipment (UE) is provided. The UE includes a transceiver configured to receive configuration information for at least one of joint transmission configuration indicator (TCI) states downlink (DL) TCI states, and uplink (UL) TCI states; receive information on a number (M) of TCI state code points activated by a medium access control control element (MAC CE); receive the M TCI state code points activated by the MAC CE, and if the UE is configured to be indicated TCI state code points on DL control information (DCI) and M>1; and receive the DCI that indicates at least one TCI state code point from the M TCI state code points. The UE also includes a processor operably connected to the transceiver. The processor is configured to determine a TCI state to apply to at least one of DL channels and UL channels and update one or more spatial filters for at least one of the DL channels and the UL channels based on the determined TCI state. If M=1, the determined TCI state is based on the one TCI state code point activated by the MAC CE. If the UE is configured to be indicated TCI state code points on the DCI and M>1, the determined TCI state is based on the at least one TCI state code point indicated by the DCI. The transceiver is further configured to at least one of receive and transmit the DL channels and the UL channels, respectively, based on the updated one or more spatial filters.

In another embodiment, a base station (BS) is provided. The BS includes a transceiver configured to transmit configuration information for at least one of joint TCI states, DL TCI states, and UL TCI states. The BS also includes a processor operably connected to the transceiver. The processor is configured to determine TCI states to activate or indicate for at least one of DL channels and UL channels. The transceiver is further configured to transmit information on a number (M) of TCI state code points activated by a MAC CE, transmit the M TCI state code points activated by MAC CE, and if a UE is configured for indication of TCI state code points on DCI and M>1, transmit DCI that indicates at least one TCI state code point from the M TCI state code points. The processor is further configured to determine a TCI state to apply to at least one of the DL channels and the UL channels and update one or more spatial filters for at least one of the DL channels and the UL channels based on the determined TCI state. If M=1, the determined TCI state is based on the one TCI state code point activated by the MAC CE. If the UE is configured for indication of TCI state code points on the DCI and M>1, the determined TCI state is based on the at least one TCI state code point indicated by the DCI. The transceiver is further configured to at least one of transmit and receive the DL channels and the UL channels, respectively, based on the updated one or more spatial filters.

In yet another embodiment, a method of operating a UE is provided. The method includes receiving configuration information for at least one of joint TCI states, DL TCI states, and UL TCI states; receiving information on a number (M) of TCI state code points activated by a MAC CE; and receiving the M TCI state code points activated by the MAC CE. The method further includes, if the UE is configured to be indicated TCI state code points on DCI and M>1, receiving the DCI that indicates at least one TCI state code point from the M TCI state code points and determining a TCI state to apply to at least one of DL channels and UL channels. If M=1, the determined TCI state is based on the one TCI code point activated by the MAC CE and, if the UE is configured to be indicated TCI state code points on the DCI and M>1, the determined TCI state is based on the at least one TCI state code point indicated by the DCI. The method further includes updating one or more spatial filters for at least one of the DL channels and the UL channels based on the determined TCI state and at least one of receiving and transmitting the DL channels and the UL channels, respectively, based on the updated one or more spatial filters.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 8 illustrates a flowchart of a method for a DL multi-beam operation according to embodiments of the present disclosure;

FIG. 9 illustrates another flowchart of a method for a DL multi-beam operation according to embodiments of the present disclosure;

FIG. 10A illustrates a flowchart of a method for a UL multi-beam operation according to embodiments of the present disclosure;

FIG. 10B illustrates another flowchart of a method for a UL multi-beam operation according to embodiments of the present disclosure;

DETAILED DESCRIPTION

FIGS. 1 through FIG. 31, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents are hereby incorporated by reference into the present disclosure as if fully set forth herein: 3GPP TS 38.211 v16.6.0, "NR; Physical channels and modulation"; 3GPP TS 38.212 v16.6.0, "NR; Multiplexing and Channel coding"; 3GPP TS 38.213 v16.6.0, "NR; Physical Layer Procedures for Control"; 3GPP TS 38.214 v16.6.0, "NR; Physical Layer Procedures for Data"; 3GPP TS 38.321 v16.5.0, "NR; Medium Access Control (MAC) protocol specification"; 3GPP TS 38.331 v16.5.0, "NR; Radio Resource Control (RRC) Protocol Specification"; 3GPP TS 38.215 v16.4.0, "NR, Physical Layer measurements"; 3GPP TS 36.211 v16.6.0, "E-UTRA, Physical channels and modulation"; 3GPP TS 36.212 v16.6.0, "E-UTRA, Multiplexing and Channel coding"; 3GPP TS 36.213 v16.6.0, "E-UTRA, Physical Layer Procedures"; 3GPP TS 36.321 v16.5.0, "E-UTRA, Medium Access Control (MAC) protocol specification"; and 3GPP TS 36.331 v16.5.0, "E-UTRA, Radio Resource Control (RRC) Protocol Specification."

Figure 1:
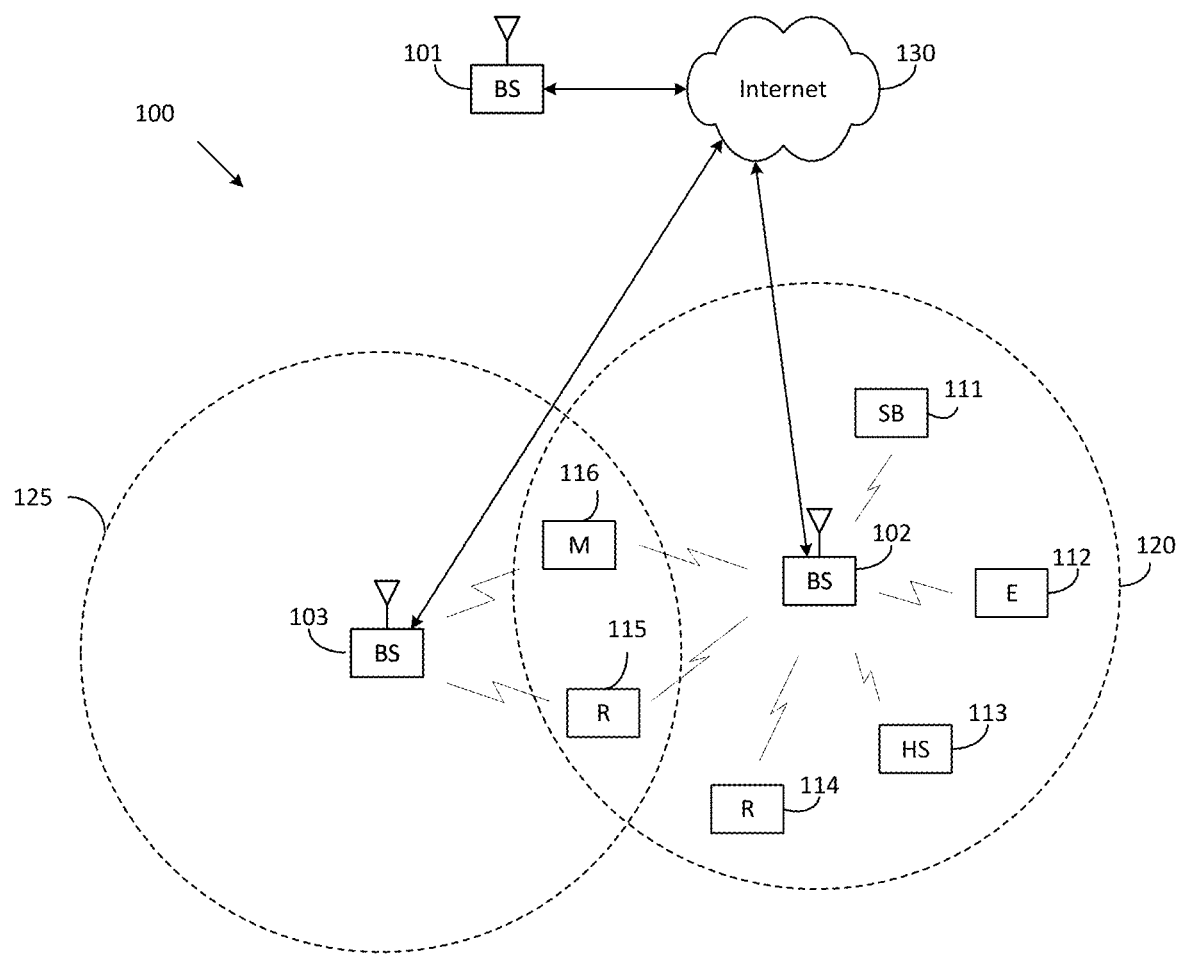
FIG. 1 illustrates an example wireless network according to embodiments of the present disclosure.
Figure 2:
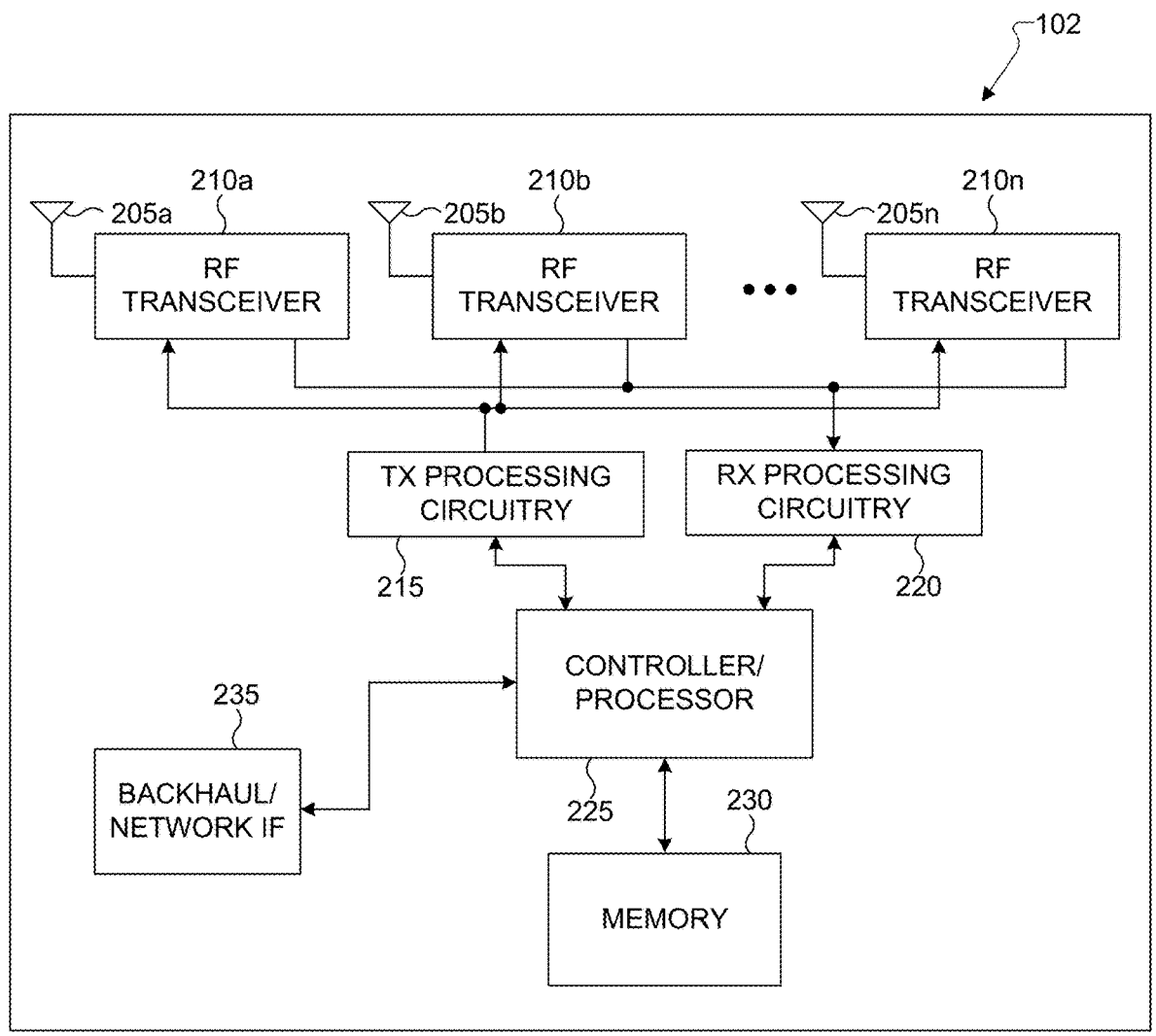
FIG. 2 illustrates an example gNB according to embodiments of the present disclosure.
Figure 3:
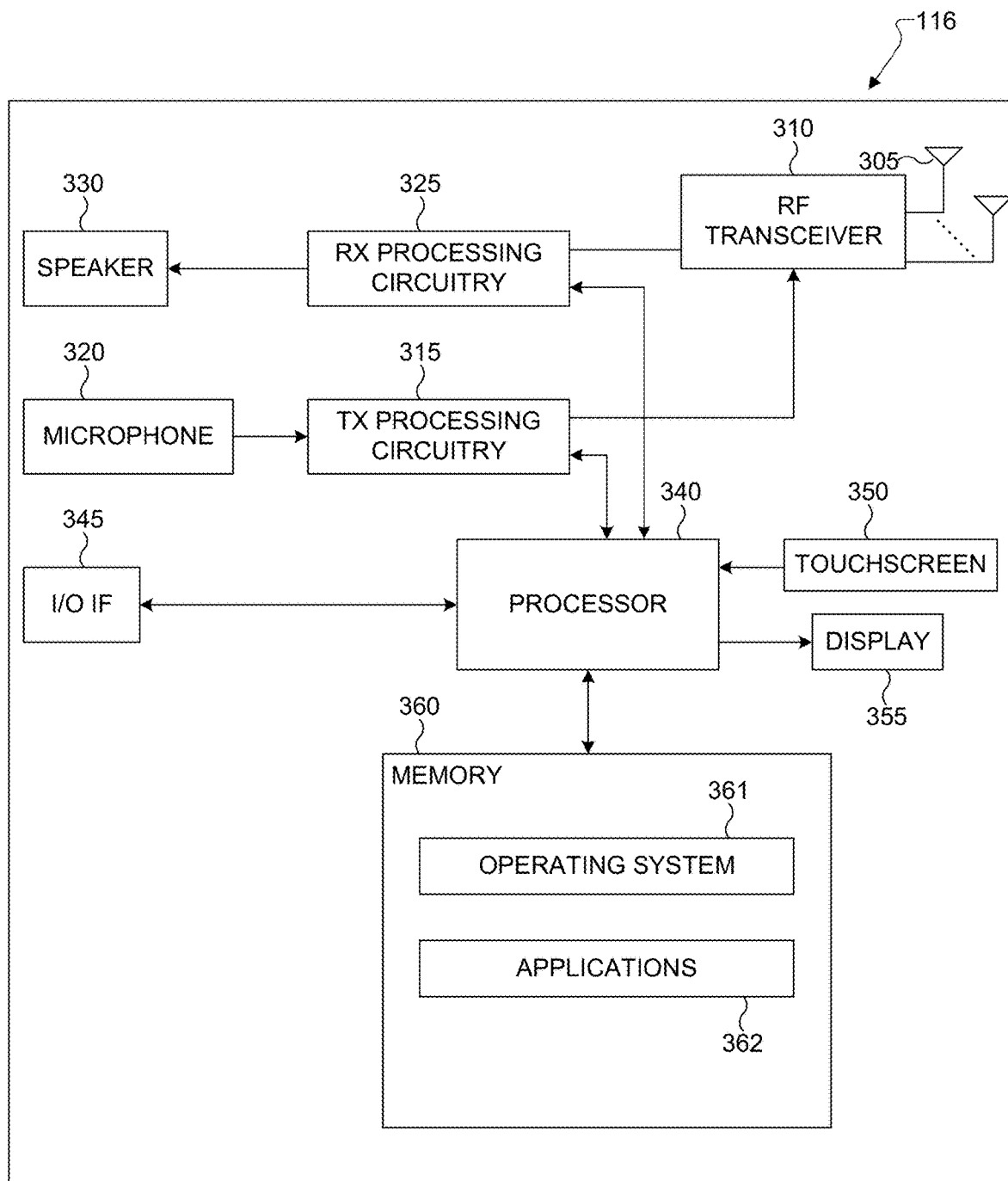
FIG. 3 illustrates an example UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of UEs within a coverage area 120 of the gNB 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, long term evolution (LTE), long term evolution-advanced (LTE-A), WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3GPP NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof, for a fast beam indication. In certain embodiments, and one or more of the gNBs 101-103 includes circuitry, programing, or a combination thereof, for a fast beam indication.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205*a*-205*n*, multiple RF transceivers 210*a*-210*n*, transmit (TX) processing circuitry 215, and receive (RX) processing circuitry 220. The gNB 102 also includes a controller/processor 225, a memory 230, and a backhaul or network interface 235.

The RF transceivers 210*a*-210*n* receive, from the antennas 205*a*-205*n*, incoming RF signals, such as signals transmitted by UEs in the network 100. The RF transceivers 210*a*-210*n* down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210*a*-210*n* receive the outgoing processed baseband or IF signals from the TX processing circuitry 215 and up-converts the baseband or IF signals to RF signals that are transmitted via the antennas 205*a*-205*n*.

The controller/processor 225 can include one or more processors or other processing devices that control the overall operation of the gNB 102. For example, the controller/processor 225 could control the reception of UL channel signals and the transmission of DL channel signals by the RF transceivers 210*a*-210*n*, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205*a*-205*n* are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of downlink channel signals and the transmission of uplink channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for a fast beam indication. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave) bands, e.g., 28 GHz or 60 GHz bands, so as to accomplish higher data rates or in lower frequency bands, such as 6 GHZ, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

The discussion of 5G systems and frequency bands associated therewith is for reference as certain embodiments of the present disclosure may be implemented in 5G systems. However, the present disclosure is not limited to 5G systems or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

A communication system includes a downlink (DL) that refers to transmissions from a base station or one or more transmission points to UEs and an uplink (UL) that refers to transmissions from UEs to a base station or to one or more reception points.

A time unit for DL signaling or for UL signaling on a cell is referred to as a slot and can include one or more symbols. A symbol can also serve as an additional time unit. A frequency (or bandwidth (BW)) unit is referred to as a resource block (RB). One RB includes a number of sub-carriers (SCs). For example, a slot can have duration of 0.5 milliseconds or 1 millisecond, include 14 symbols and an RB can include 12 SCs with inter-SC spacing of 30 KHz or 15 KHZ, and so on.

DL signals include data signals conveying information content, control signals conveying DL control information (DCI), and reference signals (RS) that are also known as pilot signals. A gNB transmits data information or DCI through respective physical DL shared channels (PDSCHs) or physical DL control channels (PDCCHs). A PDSCH or a PDCCH can be transmitted over a variable number of slot symbols including one slot symbol. For brevity, a DCI format scheduling a PDSCH reception by a UE is referred to as a DL DCI format and a DCI format scheduling a physical uplink shared channel (PUSCH) transmission from a UE is referred to as an UL DCI format.

A gNB transmits one or more of multiple types of RS including channel state information RS (CSI-RS) and demodulation RS (DMRS). A CSI-RS is primarily intended for UEs to perform measurements and provide CSI to a gNB. For channel measurement, non-zero power CSI-RS (NZP CSI-RS) resources are used. For interference measurement reports (IMRs), CSI interference measurement (CSI-IM) resources associated with a zero power CSI-RS (ZP CSI-RS) configuration are used. A CSI process includes NZP CSI-RS and CSI-IM resources.

A UE can determine CSI-RS transmission parameters through DL control signaling or higher layer signaling, such as radio resource control (RRC) signaling, from a gNB. Transmission instances of a CSI-RS can be indicated by DL control signaling or be configured by higher layer signaling. A DM-RS is transmitted only in the BW of a respective PDCCH or PDSCH and a UE can use the DMRS to demodulate data or control information.

Figure 4:
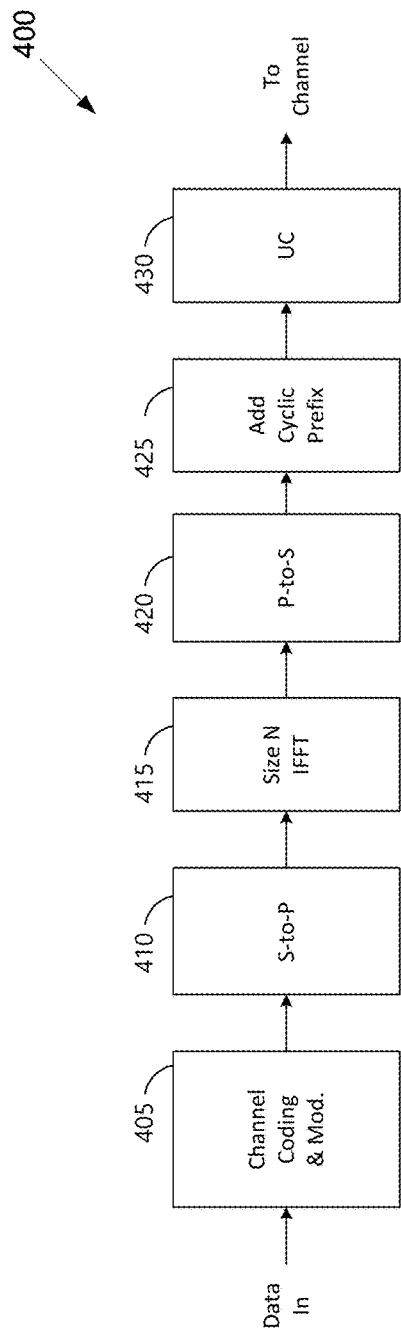
FIGS. 4 and 5 illustrate example wireless transmit and receive paths according to this disclosure.
Figure 5:
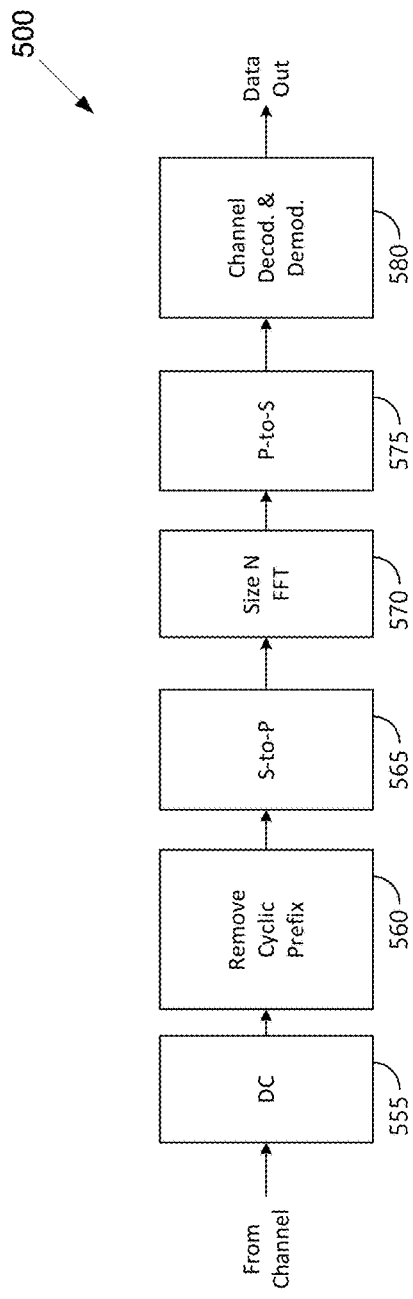

FIG. 4 and FIG. 5 illustrate example wireless transmit and receive paths according to this disclosure. In the following description, a transmit path 400 may be described as being implemented in a gNB (such as the gNB 102), while a receive path 500 may be described as being implemented in a UE (such as a UE 116). However, it may be understood that the receive path 500 can be implemented in a gNB and that the transmit path 400 can be implemented in a UE. In some embodiments, the receive path 500 is configured to support the beam indication channel in a multi-beam system as described in embodiments of the present disclosure.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 4, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols.

The serial-to-parallel block 410 converts (such as de-multiplexes) the serial modulated symbols to parallel data in order to generate N parallel symbol streams, where N is the IFFT/FFT size used in the gNB 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the gNB 102 arrives at the UE 116 after passing through the wireless channel, and reverse operations to those at the gNB 102 are performed at the UE 116.

As illustrated in FIG. 5, the down-converter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the gNBs 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-116. Similarly, each of UEs 111-116 may implement the transmit path 400 for transmitting in the uplink to the gNBs 101-103 and may implement the receive path 500 for receiving in the downlink from the gNBs 101-103.

Each of the components in FIG. 4 and FIG. 5 can be implemented using only hardware or using a combination of hardware and software/firmware. As a particular example, at least some of the components in FIGS. 4 and FIG. 5 may be implemented in software, while other components may be implemented by configurable hardware or a mixture of software and configurable hardware. For instance, the FFT block 570 and the IFFT block 415 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

Figure 6A:
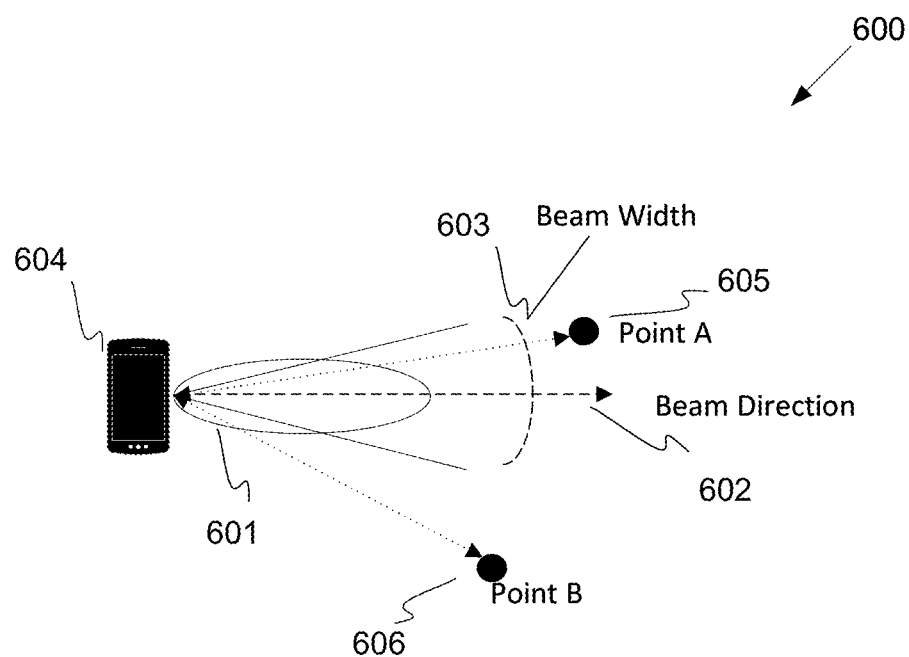
FIG. 6A illustrates an example of a beam in a wireless system according to embodiments of the present disclosure.

FIG. 6A illustrate an example of a beam in a wireless system 600 according to embodiments of the present disclosure. An embodiment of the beam shown in FIG. 6A is for illustration only.

As illustrated in FIG. 6A, in the wireless system 600, a beam 601, for a device 604, can be characterized by a beam direction 602 and a beam width 603. For example, a device 604 with a transmitter transmits RF energy in a beam direction and within a beam width. The device 604 with a receiver receives RF energy coming towards the device in a beam direction and within a beam width. As illustrated in FIG. 6A, a device at point A 605 can receive from and transmit to the device 604 as Point A is within a beam width of a beam traveling in a beam direction and coming from the device 604. A device at point B (606) cannot receive from and transmit to device (604) as Point B is outside a beam width and direction of a beam from device (604). While FIG. 6A, for illustrative purposes, shows a beam in 2-dimensions (2D), it should be apparent to those skilled in the art, that a beam can be in 3-dimensions (3D), where the beam direction and beam width are defined in space.

Figure 6B:
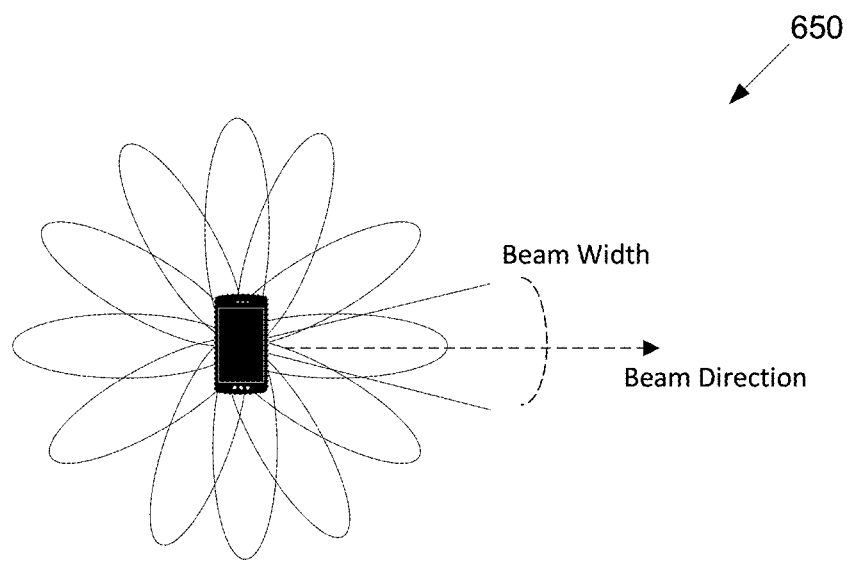
FIG. 6B illustrates an example multi-beam operation according to embodiments of the present disclosure.

FIG. 6B illustrate an example multi-beam operation 650 according to embodiments of the present disclosure. An embodiment of the multi-beam operation 650 shown in FIG. 6B is for illustration only.

In a wireless system, a device can transmit and/or receive on multiple beams. This is known as "multi-beam operation" and is illustrated in FIG. 6B. While FIG. 6B, for illustrative purposes, is in 2D, it may be apparent to those skilled in the art, that a beam can be 3D, where a beam can be transmitted to or received from any direction in space.

Rel.14 LTE and Rel.15 NR support up to 32 CSI-RS antenna ports which enable an eNB to be equipped with a large number of antenna elements (such as 64 or 128). In this case, a plurality of antenna elements is mapped onto one CSI-RS port. For mmWave bands, although the number of antenna elements can be larger for a given form factor, the number of CSI-RS ports—which can correspond to the number of digitally precoded ports—tends to be limited due to hardware constraints (such as the feasibility to install a large number of ADCs/DACs at mmWave frequencies) as illustrated in FIG. 7.

Figure 7:
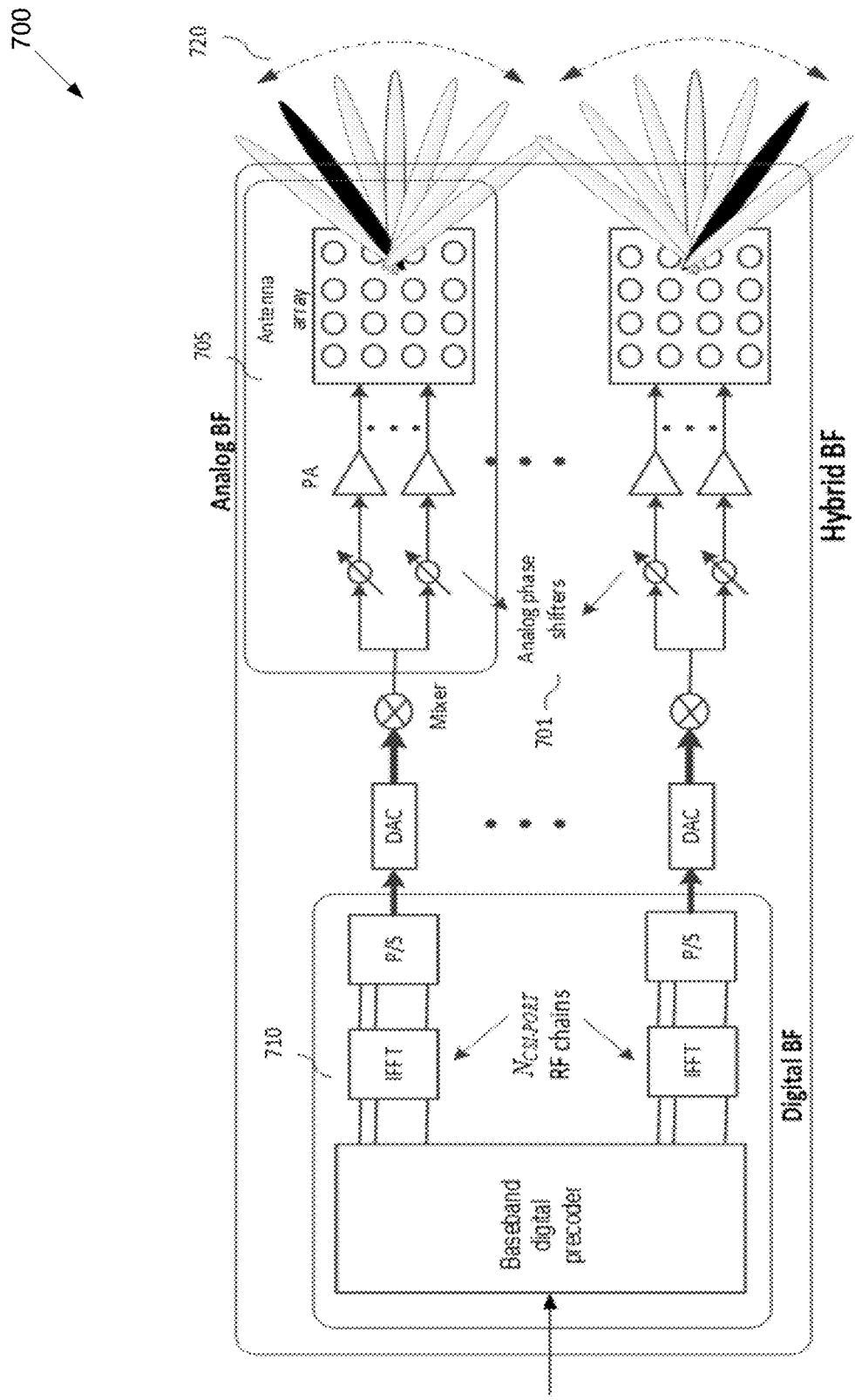
FIG. 7 illustrates an example antenna structure according to embodiments of the present disclosure.

FIG. 7 illustrates an example antenna structure 700 according to embodiments of the present disclosure. An embodiment of the antenna structure 700 shown in FIG. 7 is for illustration only. For example, the antenna structure 700 may be present in a wireless communication device, such as, for example, the UE 116 or the gNB 102 in FIG. 1.

In this case, one CSI-RS port is mapped onto a large number of antenna elements which can be controlled by a bank of analog phase shifters 701. One CSI-RS port can then correspond to one sub-array which produces a narrow analog beam through analog beamforming 705. This analog beam can be configured to sweep across a wider range of angles 720 by varying the phase shifter bank across symbols or subframes. The number of sub-arrays (equal to the number of RF chains) is the same as the number of CSI-RS ports $N_{CSI-PORT}$. A digital beamforming unit 710 performs a linear combination across $N_{CSI-PORT}$ analog beams to further increase precoding gain. While analog beams are wideband (hence not frequency-selective), digital precoding can be varied across frequency sub-bands or resource blocks. Receiver operation can be conceived analogously.

Since the described system utilizes multiple analog beams for transmission and reception (wherein one or a small number of analog beams are selected out of a large number, for instance, after a training duration—to be performed from time to time), the term "multi-beam operation" is used to refer to the overall system aspect. This includes, for the purpose of illustration, indicating the assigned DL or UL transmit (TX) beam (also termed "beam indication"), measuring at least one reference signal for calculating and performing beam reporting (also termed "beam measurement" and "beam reporting," respectively), and receiving a DL or UL transmission via a selection of a corresponding receive (RX) beam.

The described system is also applicable to higher frequency bands such as >52.6 GHZ. In this case, the system can employ only analog beams. Due to the O2 absorption loss around 60 GHz frequency (~10 dB additional loss @100 m distance), larger number of and sharper analog beams (hence larger number of radiators in the array) may be needed to compensate for the additional path loss.

In U.S. patent application Ser. No. 17/148,517 filed Jan. 13, 2021, which incorporated by reference herein, a TCI DCI can be a dedicated channel for beam indication information, i.e., a purposed designed DL channel for beam indication. Beam indication information can also be included in a DL-related DCI (e.g., DCI Format 1_0, DCI Format 1_1 or DCI Format 2_1) with or without DL assignment, or in an UL-related DCI (e.g., DCI Format 0_1, DCI Format 0_1 or DCI Format 0_2) with or without UL grant. In this disclosure more detailed aspects related to the configuration and signaling of beam indication relaying on L1 signaling as well as higher layer configuration and signaling are provided.

In release 15/16 a common framework is shared for CSI and beam management, while the complexity of such framework is justified for CSI in FR1, it makes beam management procedures rather cumbersome, and less efficient in FR2. Efficiency here refers to overhead associated with beam management operations and latency for reporting and indicating new beams.

Furthermore, in release 15 and release 16, the beam management framework is different for different channels. This increases the overhead of beam management and could lead to less robust beam-based operation. For example, for PDCCH the TCI state (used for beam indication), is updated through MAC CE signaling. While the TCI state of PDSCH can updated through a DL DCI carrying the DL assignment with codepoints configured by MAC CE, or the PDSCH TCI state can follow that of the corresponding PDCCH or use a default beam indication. In the uplink direction, the spatial-RelationInfo framework is used for beam indication for PUCCH and SRS, which is updated through RRC and MAC CE signaling. For PUSCH the SRI (SRS Resource Indicator), in an UL DCI with UL grants, can be used for beam indication. Having different beam indications and beam indication update mechanisms increases the complexity, overhead and latency of beam management, and could lead to less robust beam-based operation.

To reduce the latency and overhead of beam indication, L1 based beam indication has been proposed, wherein a TCI DCI is used for beam indication. A TCI DCI can be a dedicated channel for beam indication information, i.e., a purposed designed DL channel for beam indication. Beam indication information can also be included in a DL-related DCI or in an UL-related DCI. In this disclosure, design aspects are provided for fast beam indication including RRC signaling, MAC CE and L1 control (DCI) signaling.

The present disclosure relates to a 5G/NR communication system and provides design aspects for fast beam indication including RRC signaling, MAC CE and L1 control (DCI) signaling.

In the following, both FDD and TDD are considered as a duplex method for DL and UL signaling. Although exemplary descriptions and embodiments to follow assume orthogonal frequency division multiplexing (OFDM) or orthogonal frequency division multiple access (OFDMA), this disclosure can be extended to other OFDM-based transmission waveforms or multiple access schemes such as filtered OFDM (F-OFDM).

In the present disclosure, the term "activation" describes an operation wherein a UE receives and decodes a signal from the network (or gNB) that signifies a starting point in time. The starting point can be a present or a future slot/subframe or symbol and the exact location is either implicitly or explicitly indicated or is otherwise specified in the system operation or is configured by higher layers. Upon successfully decoding the signal, the UE responds according to an indication provided by the signal. The term "deactivation" describes an operation wherein a UE receives and decodes a signal from the network (or gNB) that signifies a stopping point in time. The stopping point can be a present or a future slot/subframe or symbol and the exact location is cither implicitly or explicitly indicated or is otherwise specified in the system operation or is configured by higher layers. Upon successfully decoding the signal, the UE responds according to an indication provided by the signal.

Terminology such as TCI, TCI states, SpatialRelationInfo, target RS, reference RS, and other terms is used for illustrative purposes and is therefore not normative. Other terms that refer to same functions can also be used.

A "reference RS" corresponds to a set of characteristics of a DL beam or an UL TX beam, such as a direction, a precoding/beamforming, a number of ports, and so on. For instance, for DL, as the UE receives a reference RS index/ID, for example through a field in a DCI format, that is represented by a TCI state, the UE applies the known characteristics of the reference RS to associated DL reception. The reference RS can be received and measured by the UE (for example, the reference RS is a downlink signal such as NZP CSI-RS and/or SSB) and the UE can use the result of the measurement for calculating a beam report (in 3GPP standard Specification Rel-15 NR, a beam report includes at least one layer 1-reference signal receive power (L1-RSRP) accompanied by at least one CSI-RS resource indicator (CRI). Using the received beam report, the NW/gNB can assign a particular DL TX beam to the UE. A reference RS can also be transmitted by the UE (for example, the reference RS is an uplink signal such as SRS). As the NW/gNB receives the reference RS from the UE, the NW/gNB can measure and calculate information used to assign a particular DL TX beam to the UE. This option is applicable at least when there is DL-UL beam pair correspondence.

In another instance, for UL transmissions, a UE can receive a reference RS index/ID in a DCI format scheduling an UL transmission such as a PUSCH transmission and the UE then applies the known characteristics of the reference RS to the UL transmission. The reference RS can be received and measured by the UE (for example, the reference RS is a downlink signal such as NZP CSI-RS and/or SSB) and the UE can use the result of the measurement to calculate a beam report. The NW/gNB can use the beam report to assign a particular UL TX beam to the UE. This option is applicable at least when DL-UL beam pair correspondence holds. A reference RS can also be transmitted by the UE (for example, the reference RS is an uplink signal such as SRS or DMRS). The NW/gNB can use the received reference RS to measure and calculate information that the NW/gNB can use to assign a particular UL TX beam to the UE.

The reference RS can be triggered by the NW/gNB, for example via DCI in case of aperiodic (AP) RS or can be configured with a certain time-domain behavior, such as a periodicity and offset in case of periodic RS, or can be a combination of such configuration and activation/deactivation in case of semi-persistent RS.

For mm Wave bands (or FR2) or for higher frequency bands (such as >52.6 GHz or FR4) (or for FR2-1 for 24.25-52.6 GHz, and FR2-2 for 52.6-71 GHz (two ranges under the FR2 common range)) where multi-beam operation is especially relevant, a transmission-reception process includes a receiver selecting a receive (RX) beam for a given TX beam. For DL multi-beam operation, a UE selects a DL RX beam for every DL TX beam (that corresponds to a reference RS). Therefore, when DL RS, such as CSI-RS and/or SSB, is used as reference RS, the NW/gNB transmits the DL RS to the UE for the UE to be able to select a DL RX beam. In response, the UE measures the DL RS, and in the process selects a DL RX beam, and reports the beam metric associated with the quality of the DL RS. In this case, the UE determines the TX-RX beam pair for every configured (DL) reference RS. Therefore, although this knowledge is unavailable to the NW/gNB, the UE, upon receiving a DL RS associated with a DL TX beam indication from the NW/gNB, can select the DL RX beam from the information the UE obtains on all the TX-RX beam pairs.

Conversely, when an UL RS, such as an SRS and/or a DMRS, is used as reference RS, at least when DL-UL beam correspondence or reciprocity holds, the NW/gNB triggers or configures the UE to transmit the UL RS (for DL and by reciprocity, this corresponds to a DL RX beam). The gNB, upon receiving and measuring the UL RS, can select a DL TX beam. As a result, a TX-RX beam pair is derived. The NW/gNB can perform this operation for all the configured UL RSs, either per reference RS or by "beam sweeping," and determine all TX-RX beam pairs associated with all the UL RSs configured to the UE to transmit.

The following two embodiments (A-1 and A-2) are examples of DL multi-beam operations that utilize DL-TCI-state based DL beam indication. In the first example embodiment (A-1), an aperiodic CSI-RS is transmitted by the NW/gNB and received/measured by the UE. This embodiment can be used regardless of whether or not there is UL-DL beam correspondence. In the second example embodiment (A-2), an aperiodic SRS is triggered by the NW and transmitted by the UE so that the NW (or a gNB) can measure the UL channel quality for the purpose of assigning a DL RX beam. This embodiment can be used at least when there is UL-DL beam correspondence. Although aperiodic RS is considered in the two examples, a periodic or a semi-persistent RS can also be used.

FIG. 8 illustrates a flowchart of a method 800 for a DL multi-beam operation according to embodiments of the present disclosure. An embodiment of the method 800 shown in FIG. 8 is for illustration only. One or more of the components illustrated in FIG. 8 can be implemented in specialized circuitry configured to perform the noted functions or one or more of the components can be implemented by one or more processors executing instructions to perform the noted functions.

In one example, as illustrated in FIG. 8 (embodiment A-1), a DL multi-beam operation (method 800) starts with the gNB/NW signaling to a UE an aperiodic CSI-RS (AP-CSI-RS) trigger or indication (step 801). This trigger or indication can be included in a DCI and indicate transmission of AP-CSI-RS in a same (zero time offset) or in a later slot/sub-frame (>0 time offset). For example, the DCI can be related to scheduling of a DL reception or an UL transmission and the CSI-RS trigger can be either jointly or separately coded with a CSI report trigger. Upon receiving the AP-CSI-RS transmitted by the gNB/NW (step 802), the UE measures the AP-CSI-RS and calculates and reports a "beam metric" that indicates a quality of a particular TX beam hypothesis (step 803). Examples of such beam reporting are a CSI-RS resource indicator (CRI), or a SSB resource indicator (SSB-RI), coupled with an associated L1-RSRP/L1-RSRQ/L1-SINR/CQI.

Upon receiving the beam report from the UE, the gNB/NW can use the beam report to select a DL RX beam for the UE and indicate the DL RX beam selection (step 804) using a TCI-state field in a DCI format such as a DCI format (e.g., DCI Format 1_0, DCI Format 1_1 or DCI Format 1_2) scheduling a PDSCH reception or without DL assignment by the UE. In this case, a value of the TCI-state field indicates a reference RS, such as an AP-CSI-RS, representing the selected DL TX beam (by the gNB/NW). In addition, the TCI-state can also indicate a "target" RS, such as a CSI-RS, that is linked to the reference RS, such as an AP-CSI-RS. Upon successfully decoding the DCI format providing the TCI-state, the UE selects an DL RX beam and performs DL reception, such as a PDSCH reception, using the DL RX beam associated with the reference CSI-RS (step 805).

Alternatively, the gNB/NW can use the beam report to select a DL RX beam for the UE and indicate to the UE the selected DL RX beam (step 804) using a value of a TCI-state field in a purpose-designed DL channel for beam indication. A purpose-designed DL channel for beam indication can be UE-specific or for a group of UEs. For example, a UE-specific DL channel can be a PDCCH that a UE receives according to a UE-specific search space (USS) while a UE-group common DL channel can be a PDCCH that a UE receives according to a common search space (CSS). In this case, the TCI-state indicates a reference RS, such as an AP-CSI-RS, representing the selected DL TX beam (by the gNB/NW). In addition, the TCI-state can also indicate a "target" RS, such as a CSI-RS, that is linked to the reference RS, such as an AP-CSI-RS. Upon successfully decoding the purpose-designed DL channel for beam indication with the TCI state, the UE selects a DL RX beam and performs DL reception, such as a PDSCH reception, using the DL RX beam associated with the reference CSI-RS (step 805).

For this embodiment (A-1), as described above, the UE selects a DL RX beam using an index of a reference RS, such as an AP-CSI-RS, that is provided via the TCI state field, for example in a DCI format. In this case, the CSI-RS resources or, in general, the DL RS resources including CSI-RS, SSB, or a combination of the two, that are configured to the UE as the reference RS resources can be linked to (associated with) a "beam metric" reporting such as CRI/L1-RSRP or L1-SINR.

FIG. 9 illustrates another flowchart of a method 900 for a DL multi-beam operation according to embodiments of the present disclosure. An embodiment of the method 900 shown in FIG. 9 is for illustration only. One or more of the components illustrated in FIG. 9 can be implemented in specialized circuitry configured to perform the noted functions or one or more of the components can be implemented by one or more processors executing instructions to perform the noted functions.

In another example, as illustrated in FIG. 9 (embodiment A-2), a DL multi-beam operation (method 900) starts with the gNB/NW signaling to a UE an aperiodic SRS (AP-SRS) trigger or request (step 901). This trigger can be included in a DCI format such as for example a DCI format scheduling a PDSCH reception or a PUSCH transmission. Upon receiving and decoding the DCI format with the AP-SRS trigger (step 902), the UE transmits an SRS (AP-SRS) to the gNB/NW (step 903) so that the NW (or gNB) can measure the UL propagation channel and select a DL RX beam for the UE for DL (at least when there is beam correspondence).

The gNB/NW can then indicate the DL RX beam selection (step 904) through a value of a TCI-state field in a DCI format, such as a DCI format (e.g., DCI Format 1_0, DCI Format 1_1 or DCI Format 1_2) scheduling a PDSCH reception, or without DL assignment. In this case, the TCI state indicates a reference RS, such as an AP-SRS, representing the selected DL RX beam. In addition, the TCI state can also indicate a "target" RS, such as a CSI-RS, that is linked to the reference RS, such as an AP-SRS. Upon successfully decoding the DCI format providing the TCI state, the UE performs DL receptions, such as a PDSCH reception, using the DL RX beam indicated by the TCI-state (step 905).

Alternatively, the gNB/NW can indicate the DL RX beam selection (step 904) to the UE using a TCI-state field in a purpose-designed DL channel for beam indication. A purpose-designed DL channel for beam indication can be UE-specific or for a group of UEs. For example, a UE-specific DL channel can be a PDCCH that a UE receives according to a UE-specific search space (USS) while a UE-group common DL channel can be a PDCCH that a UE receives according to a common search space (CSS). In this case, the TCI-state indicates a reference RS, such as an AP-SRS, representing the selected DL RX beam. In addition, the TCI-state can also indicate a "target" RS, such as a CSI-RS, that is linked to the reference RS, such as an AP-SRS. Upon successfully decoding a purpose-designed DL channel for beam indication with the TCI-state, the UE performs DL reception, such as a PDSCH reception, with the DL RX beam indicated by the TCI-state (step 905).

For this embodiment (A-2), as described above, the UE selects the DL RX beam based on the UL TX beam associated with the reference RS (AP-SRS) index signaled via the TCI-state field.

Similar, for a UL multi-beam operation, the gNB selects an UL RX beam for every UL TX beam that corresponds to a reference RS. Therefore, when an UL RS, such as an SRS and/or a DMRS, is used as a reference RS, the NW/gNB triggers or configures the UE to transmit the UL RS that is associated with a selection of an UL TX beam. The gNB, upon receiving and measuring the UL RS, selects an UL RX beam. As a result, a TX-RX beam pair is derived. The NW/gNB can perform this operation for all the configured reference RSs, either per reference RS or by "beam sweeping," and determine all the TX-RX beam pairs associated with all the reference RSs configured to the UE.

Conversely, when a DL RS, such as a CSI-RS and/or an SSB, is used as reference RS (at least when there is DL-UL beam correspondence or reciprocity), the NW/gNB transmits the RS to the UE (for UL and by reciprocity, this RS also corresponds to an UL RX beam). In response, the UE measures the reference RS (and in the process selects an UL TX beam) and reports the beam metric associated with the quality of the reference RS. In this case, the UE determines the TX-RX beam pair for every configured (DL) reference RS. Therefore, although this information is unavailable to the NW/gNB, upon receiving a reference RS (hence an UL RX beam) indication from the NW/gNB, the UE can select the UL TX beam from the information on all the TX-RX beam pairs.

The following two embodiments (B-1 and B-2) are examples of UL multi-beam operations that utilize TCI-based UL beam indication after the network (NW) receives a transmission from the UE. In the first example embodiment (B-1), a NW transmits an aperiodic CSI-RS and a UE receives and measures the CSI-RS. This embodiment can be used, for instance, at least when there is reciprocity between the UL and DL beam-pair-link (BPL). This condition is termed "UL-DL beam correspondence."

In the second example embodiment (B-2), the NW triggers an aperiodic SRS transmission from a UE and the UE transmits the SRS so that the NW (or a gNB) can measure the UL channel quality for the purpose of assigning an UL TX beam. This embodiment can be used regardless of whether or not there is UL-DL beam correspondence. Although aperiodic RS is considered in these two examples, periodic or semi-persistent RS can also be used.

FIG. 10A illustrates a flowchart of a method 1000 for a UL multi-beam operation according to embodiments of the present disclosure. An embodiment of the method 1000 shown in FIG. 10A is for illustration only. One or more of the components illustrated in FIG. 10 can be implemented in specialized circuitry configured to perform the noted functions or one or more of the components can be implemented by one or more processors executing instructions to perform the noted functions.

In one example, as illustrated in FIG. 10A (embodiment B-1), an UL multi-beam operation (method 1000) starts with the gNB/NW signaling to a UE an aperiodic CSI-RS (AP-CSI-RS) trigger or indication (step 1001). This trigger or indication can be included in a DCI format, such as a DCI format scheduling a PDSCH reception to the UE or a PUSCH transmission from the UE and can be either separately or jointly signaled with an aperiodic CSI request/trigger and indicate transmission of AP-CSI-RS in a same slot (zero time offset) or in a later slot/sub-frame (>0 time offset). Upon receiving the AP-CSI-RS transmitted by the gNB/NW (step 1002), the UE measures the AP-CSI-RS and, in turn, calculates and reports a "beam metric" (indicating quality of a particular TX beam hypothesis) (step 1003). Examples of such beam reporting are CRI or SSB resource indicator (SSB-RI) together with an associated L1-RSRP/L1-RSRQ/L1-SINR/CQI.

Upon receiving the beam report from the UE, the gNB/NW can use the beam report to select an UL TX beam for the UE and indicate the UL TX beam selection (step 1004) using a TCI-state field in a DCI format, such as a DCI format (e.g., DCI Format 0_0, DCI Format 0_1, or DCI Format 0_2) scheduling a PUSCH transmission from the UE or without UL grant. The TCI-state indicates a reference RS, such as an AP-CSI-RS, representing the selected UL RX beam (by the gNB/NW). In addition, the TCI-state can also indicate a "target" RS, such as a SRS, that is linked to the reference RS, such as an AP-CSI-RS. Upon successfully decoding the DCI format indicating the TCI-state, the UE selects an UL TX beam and performs UL transmission, such as a PUSCH transmission, using the UL TX beam associated with the reference CSI-RS (step 1005).

Alternatively, the gNB/NW can use the beam report to select an UL TX beam for the UE and indicate the UL TX beam selection (step 1004) to the UE using a value of a TCI-state field in a purpose-designed DL channel for beam indication. A purpose-designed DL channel for beam indication can be UE-specific or for a group of UEs. For example, a UE-specific DL channel can be a PDCCH that a UE receives according to a UE-specific search space (USS) while a UE-group common DL channel can be a PDCCH that a UE receives according to a common search space (CSS). In this case, the TCI-state indicates a reference RS, such as an AP-CSI-RS, representing the selected UL RX beam (by the gNB/NW). In addition, the TCI-state can also indicate a "target" RS, such as a SRS, that is linked to the reference RS, such as an AP-CSI-RS. Upon successfully decoding a purpose-designed DL channel providing a beam indication by the TCI-state, the UE selects an UL TX beam and performs UL transmission, such as a PUSCH transmission, using the UL TX beam associated with the reference CSI-RS (step 105).

For this embodiment (B-1), as described above, the UE selects the UL TX beam based on the derived DL RX beam associated with the reference RS index signaled via the value of the TCI-state field. In this case, the CSI-RS resources or, in general, the DL RS resources including CSI-RS, SSB, or a combination of the two, that are configured for the UE as the reference RS resources can be linked to (associated with) "beam metric" reporting such as CRI/L1-RSRP or L1-SINR.

FIG. 10B illustrates another flowchart of a method 1050 for a UL multi-beam operation according to embodiments of the present disclosure. An embodiment of the method 1050 shown in FIG. 10B is for illustration only. One or more of the components illustrated in FIG. 10B can be implemented in specialized circuitry configured to perform the noted functions or one or more of the components can be implemented by one or more processors executing instructions to perform the noted functions.

In another example, as illustrated in FIG. 10B (embodiment B-2), an UL multi-beam operation (method 1050) starts with the gNB/NW signaling to a UE an aperiodic SRS (AP-SRS) trigger or request (step 1051). This trigger can be included in a DCI format, such as a DCI format scheduling a PDSCH reception or a PUSCH transmission. Upon receiving and decoding the DCI format with the AP-SRS trigger (step 1052), the UE transmits AP-SRS to the gNB/NW (step 1053) so that the NW (or gNB) can measure the UL propagation channel and select an UL TX beam for the UE.

The gNB/NW can then indicate the UL TX beam selection (step 1054) using a value of the TCI-state field in the DCI format. In this case, the UL-TCI indicates a reference RS, such as an AP-SRS, representing the selected UL TX beam. In addition, the TCI-state can also indicate a "target" RS, such as a SRS, that is linked to the reference RS, such as an AP-SRS. Upon successfully decoding the DCI format providing a value for the TCI-state, the UE transmits, for example a PUSCH or a PUCCH, using the UL TX beam indicated by the TCI-state (step 1055).

Alternatively, a gNB/NW can indicate the UL TX beam selection (step 1054) to the UE using a value of a TCI-state field in a purpose-designed DL channel for beam indication. A purpose-designed DL channel for beam indication can be UE-specific or for a group of UEs. For example, a UE-specific DL channel can be a PDCCH that a UE receives according to a UE-specific search space (USS) while a UE-group common DL channel can be a PDCCH that a UE receives according to a common search space (CSS). In this case, the UL-TCI indicates a reference RS, such as an AP-SRS, representing the selected UL TX beam. In addition, the TCI-state can also indicate a "target" RS, such as a SRS, that is linked to the reference RS, such as an AP-SRS. Upon successfully decoding a purpose-designed DL channel for beam indication through a value of the TCI-state field, the UE transmits, such as a PUSCH or a PUCCH, using the UL TX beam indicated by the value of the TCI-state (step 1055).

For this embodiment (B-2), as described above, the UE selects the UL TX beam from the reference RS (in this case SRS) index signaled via the value of the TCI-state field.

In any of the following components, examples and sub-examples, flowcharts and diagrams maybe used for illustrative purposes. The present disclosure covers any possible variation of the flowcharts and diagrams as long as at least some of the components are included.

In the present disclosure, a TCI state is used for beam indication and can refer to a DL TCI state for downlink channels (e.g., PDCCH and PDSCH), an uplink TCI state for uplink channels (e.g., PUSCH or PUCCH), a joint TCI state for downlink and uplink channels, or separate TCI states for uplink and downlink channels. A TCI state can be common across multiple component carriers or can be a separate TCI state for a component carrier or a set of component carriers. A TCI state can be gNB or UE panel specific or common across panels. In some examples, the uplink TCI state can be replaced by SRS resource indicator (SRI). The term TCI state is used generically to refer to any beam indication or spatial filter indication signaling, for example a TCI state can be replaced by spatial relation information, RS resources index, wherein an RS is associated with a beam or a spatial receive or transmit filter, etc.

Figure 11:
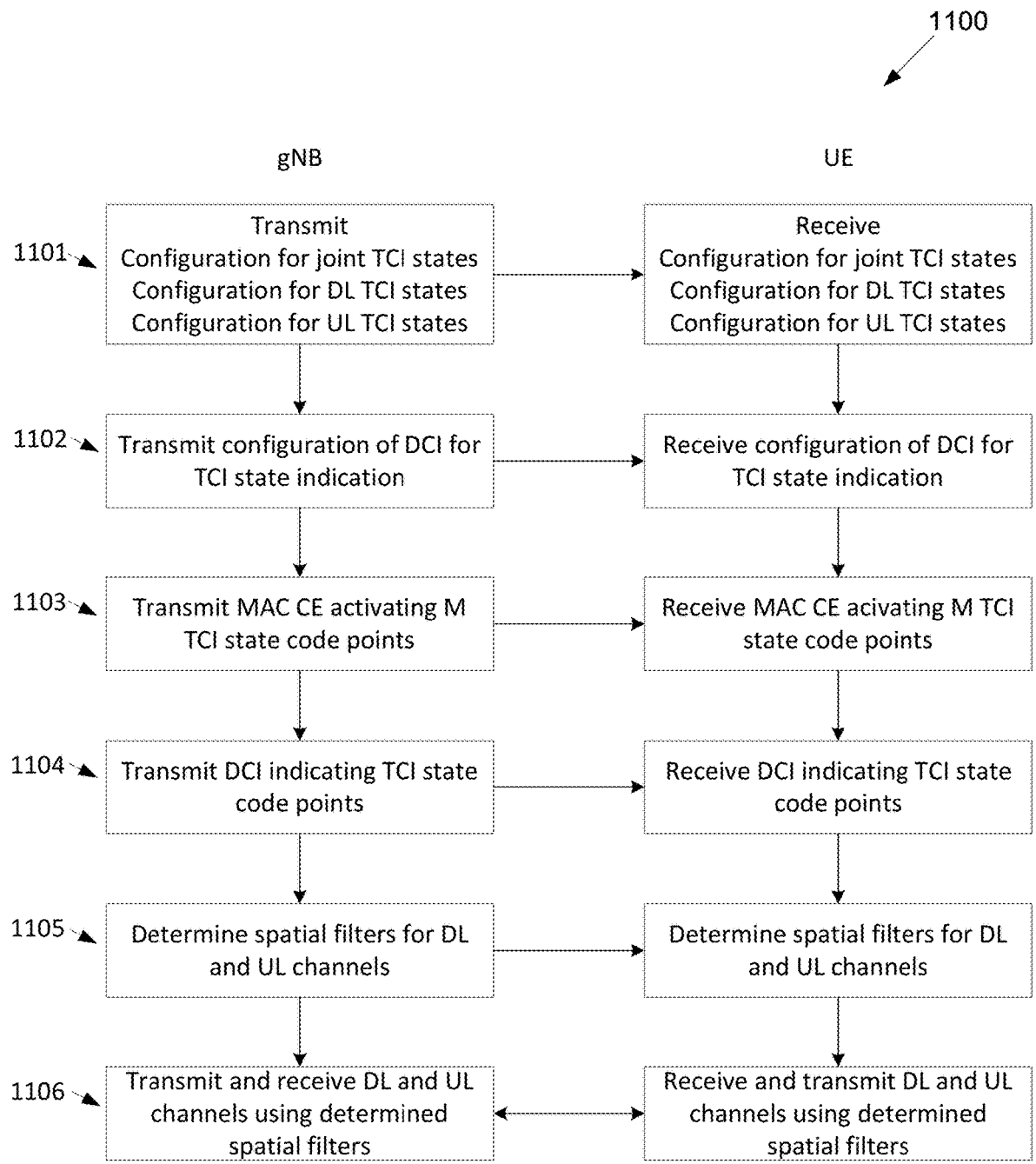
FIG. 11 illustrates a flowchart of a method for fast beam indication according to embodiments of the present disclosure.

FIG. 11 illustrates a flowchart of a method 1100 for fast beam indication according to embodiments of the present disclosure. For example, the method 1100 may be performed by a gNB and a UE such as the gNB 102 and the UE 116 in FIG. 1. An embodiment of the method 1100 shown in FIG. 11 is for illustration only.

As illustrated, in step 1101, a gNB provides a UE a configuration of:
  Joint TCI states. In one example, a joint TCI state includes
    a reference signal that determines the spatial filter for
      DL channels (e.g., spatial receive filter of a DL channel at the UE and/or spatial transmit filter of a DL channel at the gNB), and the spatial filter for UL channels (e.g., spatial transmit filter of an UL channel at the UE and/or spatial receive filter of an UL channel at the gNB). In another example a joint TCI state includes two reference signals, a first reference signal determines the spatial filter for DL channels (e.g., spatial receive filter of a DL channel at the UE and/or spatial transmit filter of a DL channel at the gNB), and a second reference signal determines the spatial filter for UL channels (e.g., spatial transmit filter of an UL channel at the UE and/or spatial receive filter of an UL channel at the gNB).

A DL TCI state. A DL TCI state includes a reference signal that determines the spatial filter for DL channels (e.g., spatial receive filter of a DL channel at the UE and/or spatial transmit filter of a DL channel at the gNB).

An UL TCI state. An UL TCI state includes a reference signal that determines the spatial filter for UL channels (e.g., spatial transmit filter of an UL channel at the UE and/or spatial receive filter of an UL channel at the gNB).

In one example, there is a separate configuration, e.g., separate pools, for Joint TCI states, DL TCI states and UL TCI states. In another example, there is a single configuration, e.g., single pool, for Joint TCI states, DL TCI states and UL TCI states. A further indication can indicate if joint TCI states or separate TCI states for DL and UL channels are being used. Additionally, or alternatively, at the time of TCI state indication and/or TCI state activation, a type can indicate whether the TCI state is a joint TCI state, a DL TCI state or an UL TCI state. In another example, there are two configurations, e.g., two pools. A first configuration (e.g., pool) for Joint TCI states and DL TCI states. A further indication can indicate if joint TCI states or separate TCI states for DL and UL channels are being used. Additionally, or alternatively, at the time of TCI state indication and/or TCI state activation, a type can indicate whether the TCI state is a joint TCI state or DL TCI state. A second configuration (e.g., pool) for UL TCI states.

In another example, there are two configurations, e.g., two pools. A first configuration (e.g., pool) for Joint TCI states and UL TCI states. A further indication can indicate if joint TCI states or separate TCI states for DL and UL channels are being used. Additionally, or alternatively, at the time of TCI state indication and/or TCI state activation, a type can indicate whether the TCI state is a joint TCI state or UL TCI state. A second configuration (e.g., pool) for DL TCI states.

In another example, there are two configurations, e.g., two pools. A first configuration (e.g., pool) for DL TCI states and UL TCI states. In one example a TCI state includes a single source RS, at the time of TCI state indication and/or TCI state activation, a type can indicate whether the TCI state is a DL TCI state or UL TCI state. In another example, a TCI state includes two reference signals, a first reference signal determines the spatial filter for DL channels (e.g., spatial receive filter of a DL channel at the UE and/or spatial transmit filter of a DL channel at the gNB), and a second reference signal determines the spatial filter for UL channels (e.g., spatial transmit filter of an UL channel at the UE and/or spatial receive filter of an UL channel at the gNB). A second configuration (e.g., pool) for joint TCI states. A further indication can indicate if joint TCI states or separate TCI states for DL and UL channels are being used. If separate TCI state indication is being used, the first configuration (e.g., pool) is used for TCI state indication and/or TCI state activation. If joint TCI state indication is being used, the second configuration (e.g., pool) is used for TCI state indication and/or TCI state activation.

In another example, only joint TCI states are configured, hence only joint indication of DL/UL TCI states is permitted. In another example, only separate TCI states are configured (e.g., DL/UL TCI state configuration in a same pool or DL/UL TCI state configurations in separate pools), hence only separate indication of DL/UL TCI states is permitted.

In step 1101, the configuration of TCI states can be by RRC configuration. The TCI states may be further updated by RRC signaling and/or MAC CE signaling and/or L1 control signaling.

In step 1102: the gNB can configure a DCI for TCI state indication. The DCI can be: a DL-related DCI (e.g., DCI Format 1_0 and/or DCI Format 1_1 and/or DCI Format 1_2). The DL-related DCI can be with DL assignment or without DL assignment; an UL-related DCI (e.g., DCI Format 0_0 and/or DCI Format 0_1 and/or DCI Format 0_2). The UL-related DCI can be with UL grant or without UL grant; a purposed designed DCI for TCI state indication.

In one example, a UE capability can determine whether a DCI for TCI state indication is configured. A UE not capable of supporting a DCI for TCI state indication is not configured a DCI for TCI state indication. In another example, it could be up to network implementation whether a DCI for TCI state indication is configured.

In step 1103: the gNB activates M TCI states code points. A TCI state code point can include one or more TCI states. In one example, a value M can be configured by RRC signaling. In another example, M depends on a UE capability. The UE signals the network its capability on the value of M it can support. In another example, M is configured by RRC signaling based on the indicated UE capability. In another example, M is indicated in the MAC CE activation message. A maximum value of M can be specified in the system specification. In one further example, the maximum value of M can be based on a UE capability. In yet another example, M is indicated in the MAC CE activation message. A maximum value of M can be configured by RRC signaling. In one further example, the maximum value of M can be based on a UE capability. In another example, M is determined implicitly based on the number of activated TCI state code points in the MAC CE message activating TCI states. In one example, if a DCI for TCI state indication is not configure, i.e. not configured in step 1102. The MAC CE can only include 1 TCI state code point, i.e. M=1. The TCI state code point indicated or activated in the MAC CE determines the spatial filter(s) for DL and/or UL channels.

In another example, if a DCI for TCI state indication is not configure, i.e. not configured in step 1102. The MAC CE can only include more than 1 TCI state code point, i.e. M>1. A first TCI state code point indicated or activated in the MAC CE determines the spatial filter(s) for DL and/or UL channels.

In one example, the code points of the MAC CE can include: code point(s) with joint TCI state, code point(s) with DL TCI state, code point(s) with UL TCI state and/or code point(s) with a pair of DL TCI state and UL TCI state. In another example, a configuration message (RRC configuration and/or MAC CE configuration and/or DCI configuration) can configure either joint TCI state indication or separate TCI state indication. In case of joint TCI state indication, the MAC CE activated TCI state code points include joint TCI state. In case of separate TCI state indication, the MAC CE activated TCI state code points include one or more code point of type: code point with DL TCI state, code point with UL TCI state, or code point with a pair of DL TCI state and UL TCI state.

In another example, two MAC CE sets are activated: A first MAC CE activated set with code points that include joint TCI state and a second MAC CE activated set with code points that include one or more code point of type: code point with DL TCI state, code point with UL TCI state, or code point with a pair of DL TCI state and UL TCI state. A configuration message (RRC configuration and/or MAC CE configuration and/or DCI configuration) can configure either joint TCI state indication or separate TCI state indication which determines the MAC CE activated set to used.

In step 1104: If a DCI for conveying TCI state code point is supported (e.g., configured, and/or supported based on a UE capability) and M>1, a DCI can indicate to the UE the TCI state code point. The DCI can be: A DL-related DCI (e.g., DCI Format 1_0 and/or DCI Format 1_1 and/or DCI Format 1_2). The DL-related DCI can be with DL assignment or without DL assignment; an UL-related DCI (e.g., DCI Format 0_0 and/or DCI Format 0_1 and/or DCI Format 0_2). The UL-related DCI can be with UL grant or without UL grant; or purposed designed DCI for TCI state indication.

In step 1105: the UE and the gNB can determine the spatial filters to use for the DL channels and the UL channels based on the TCI state code points indicated in the DCI for TCI state indication (if supported and M>1) or the MAC CE (otherwise).

In step 1106: after a beam application time from the indication of the TCI state code points and/or the acknowledgement of the indication message, the UE applies and the gNB applies the determined spatial filters for reception/transmission of the UL and/or DL channels.

In one embodiment (component 1), TCI state configuration and signaling are provided.

Figure 12:
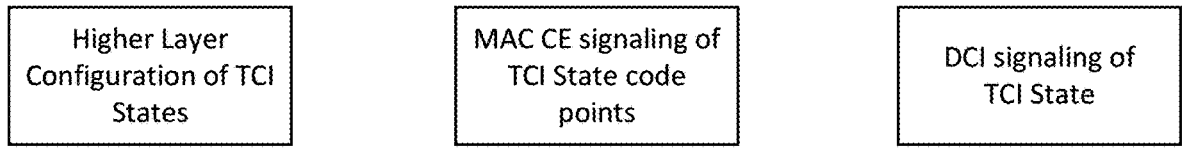
FIG. 12 illustrates an example TCI state configuration and signaling according to embodiments of the present disclosure.

FIG. 12 illustrates an example TCI state configuration and signaling 1200 according to embodiments of the present disclosure. An embodiment of the TCI state configuration and signaling 1200 shown in FIG. 12 is for illustration only.

In the following examples, as illustrated in FIG. 12, a UE is configured/updated through higher layer RRC signaling a set of TCI States with N elements (step 1101 of FIG. 11). The N TCI states include Joint TCI states and/or DL TCI states and/or UL TCI states. MAC CE signaling includes a subset of M (M≤N) TCI states from the set of N TCI states (step 1103 of FIG. 11), wherein each TCI state is associated with a code point of the DCI field used for indication of the TCI state. L1 control signaling (i.e. Downlink Control Information (DCI)) updates the UE's TCI state (step 1104 of FIG. 11), wherein the DCI includes a TCI State field e.g., with m bits (such that M≤2$^m$), the TCI state corresponds to a code point signaled by MAC CE.

Figure 14:
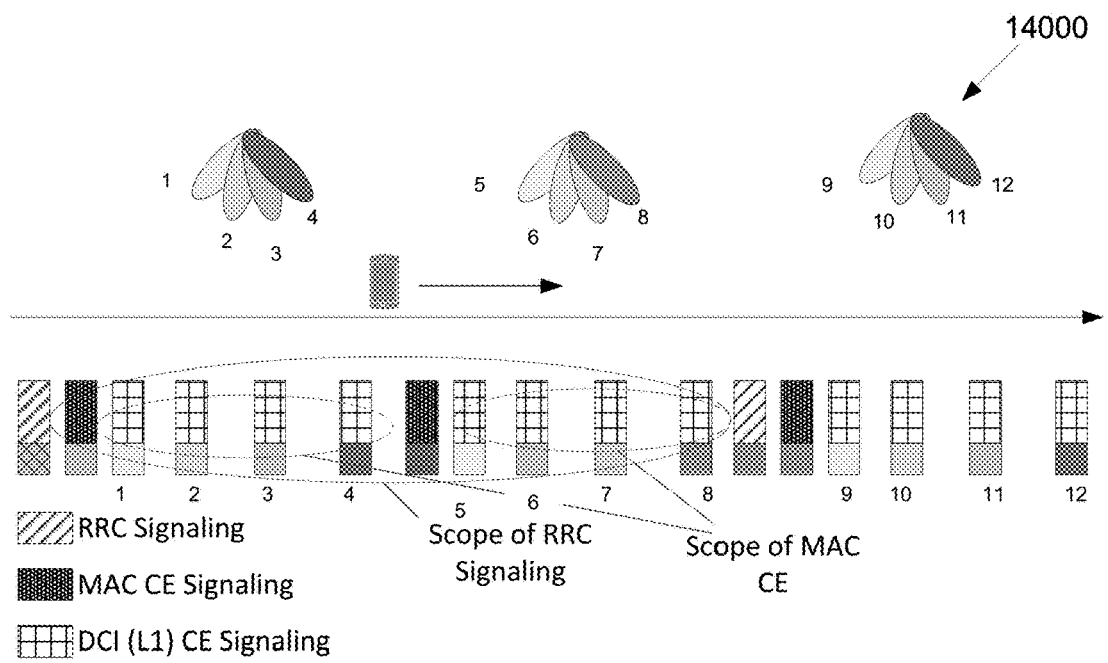
FIG. 14 illustrates an example RRC signaling, MACE CE signaling, and DCI signaling according to embodiments of the present disclosure.

As a UE moves along a trajectory, the rate of DCI signaling to update the TCI state can be higher than the rate of MAC CE signaling to update the TCI state code points which in turn can be higher than the rate of RRC signaling to configure/update the TCI states. As illustrated in FIG. 14, as a UE moves along a trajectory, RRC signaling configures/updates a set of N TCI state states. MAC signaling includes a subset of M TCI states and associates each with code points for the DCI. There can be one or more MAC CE TCI state updates between two consecutive RRC configurations of TCI states. DCI signaling updates the TCI state as a UE moves along a trajectory according to the code points included in the MAC CE. There can be one or more DCI TCI state updates between two consecutive MAC CE TCI state updates.

In one example, there is no DCI signaling of the TCI state, the MAC CE selects or activates a TCI state out of the set of the N TCI states configured by RRC. This is illustrated in FIG. 13A.

Figure 13A:
FIG. 13A illustrates another example TCI state configuration and signaling according to embodiments of the present disclosure.

FIG. 13A illustrates another example TCI state configuration and signaling 1300 according to embodiments of the present disclosure. An embodiment of the TCI state configuration and signaling 1300 shown in FIG. 13A is for illustration only.

In one example, there is no MAC CE signaling of the TCI code points, the RRC configured TCI states directly provide code points for DCI signaling of the TCI state (e.g., step 1103 in FIG. 11 is not performed). This is illustrated in FIG. 13B.

Figure 13B:
FIG. 13B illustrates yet another example TCI state configuration and signaling according to embodiments of the present disclosure.

FIG. 13B illustrates yet another example TCI state configuration and signaling 1310 according to embodiments of the present disclosure. An embodiment of the TCI state configuration and signaling 1310 shown in FIG. 13B is for illustration only.

In one example, according to the examples of FIG. 12, FIG. 13A, and FIG. 13B, the TCI states configured by RRC are common (joint) for UL and DL channels, e.g., joint TCI states for DL/UL channels.

In one example, according to the examples of FIG. 12, FIG. 13A, and FIG. 13B, the TCI states configured by RRC for UL channels are separate from the TCI state configured for DL channels, e.g., DL TCI states configured for DL channels and UL TCI state configured for UL channels, alternatively or additionally, a TCI state includes a first source RS for DL channels and a second source RS for UL channels.

In one example, according to the examples of FIG. 12, the TCI states configured by RRC are common (joint) for UL and DL channels, and MAC CE signaling activates a common subset of joint TCI states for UL and DL channels.

In one example, according to the examples of FIG. 12, the TCI states configured by RRC are common (joint) for UL and DL channels, and MAC CE signaling activates for UL channels a subset of TCI states separate from that activated for DL channels.

In one example, according to the examples of FIG. 12, the TCI states configured by RRC are common (joint) for UL and DL channels, and MAC CE signaling activates a common subset of joint TCI states for UL and DL channels, and DCI signaling activates/signals/indicates a common (joint) TCI state for UL and DL channels.

In one example, according to the examples of FIG. 12, the TCI states configured by RRC are common (joint) for UL and DL channels, and MAC CE signaling activates a common subset of TCI states for UL and DL channels, and DCI signaling activates/signals/indicates a TCI state for UL channels and a separate TCI state for DL channels.

In one example, according to the examples of FIG. 13A, the TCI states configured by RRC are common (joint) for UL and DL channels, and MAC CE signaling activates/signals/indicates a common (joint) TCI state for UL and DL channels.

In one example, according to the examples of FIG. 13A, the TCI states configured by RRC are common (joint) for UL and DL channels, and MAC CE signaling activates/signals/indicates a TCI state for UL channels and a separate TCI state for DL channels.

In one example, according to the examples of FIG. 13B, the TCI states configured by RRC are common (joint) for UL and DL channels, and DCI signaling activates/signals/indicates a common (joint) TCI state for UL and DL channels.

In one example, according to the examples of FIG. 13B, the TCI states configured by RRC are common (joint) for UL and DL channels, and DCI signaling activates/signals/indicates a TCI state for UL channels and a separate TCI state for DL channels.

In one further example to the examples of FIG. 12, FIG. 13A, and FIG. 13B. TCI state signaled or activated, can be K TCI states wherein, K≥1. Wherein, the multiple TCI states can correspond to different entities, e.g., UL/DL directions, and/or serving cells, and/or bandwidth parts (BWPs) and/or component carriers and/or TRPs and/or TRP panels and/or UE panels.

Figure 13C:
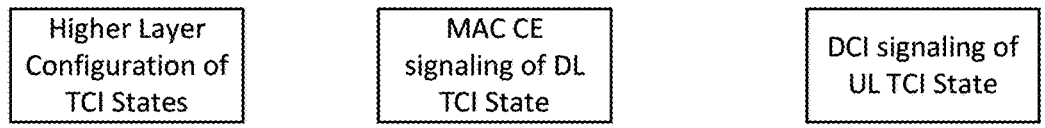
FIG. 13C illustrates yet another example TCI state configuration and signaling according to embodiments of the present disclosure.

FIG. 13C illustrates yet another example TCI state configuration and signaling 1320 according to embodiments of the present disclosure. An embodiment of the TCI state configuration and signaling 1320 shown in FIG. 13C is for illustration only.

In one example, RRC signaling configures a common set of TCI states for UL and DL channels. MAC CE activates/signals/indicates a TCI state for DL channels. DCI signaling activates a TCI state for UL channels. This is illustrated in FIG. 13C.

In one example, RRC signaling configures a set of TCI states for UL channels and a separate set of TCI states for DL channels. MAC CE activates/signals/indicates a TCI state for DL channels. DCI signaling activates a TCI state for UL channels. This is illustrated in FIG. 13C.

Figure 13D:
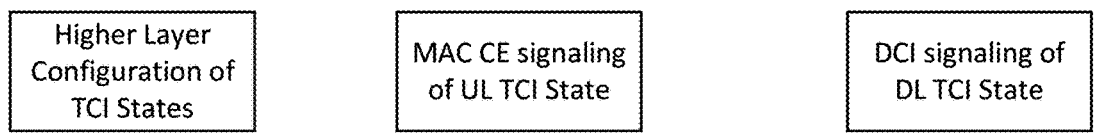
FIG. 13D illustrates yet another example TCI state configuration and signaling according to embodiments of the present disclosure.

FIG. 13D illustrates yet another example TCI state configuration and signaling 1330 according to embodiments of the present disclosure. An embodiment of the TCI state configuration and signaling 1330 shown in FIG. 13D is for illustration only.

In one example, RRC signaling configures a common set of TCI states for UL and DL channels. MAC CE activates/signals/indicates a TCI state for UL channels. DCI signaling activates a TCI state for DL channels. This is illustrated in FIG. 13D.

In one example, RRC signaling configures a set of TCI states for UL channels and a separate set of TCI states for DL channels. MAC CE activates/signals/indicates a TCI state for UL channels. DCI signaling activates a TCI state for DL channels. This is illustrated in FIG. 13D.

Figure 13E:
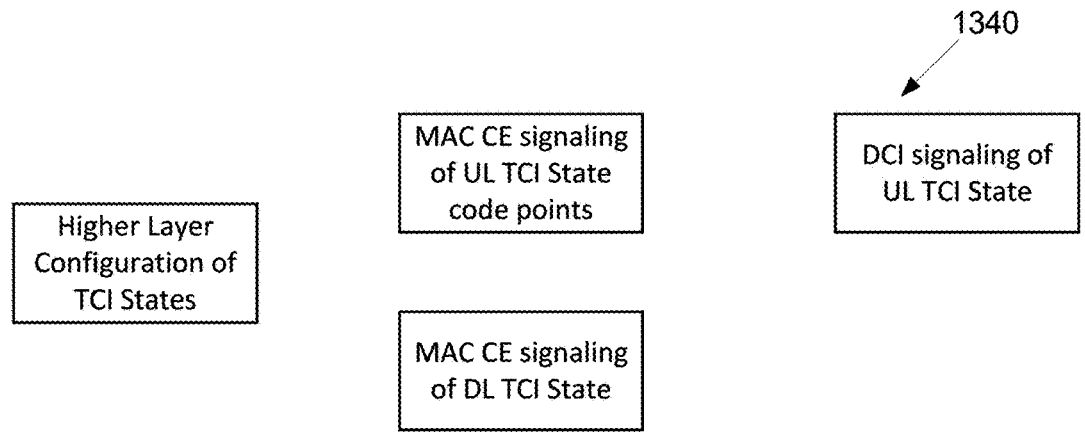
FIG. 13E illustrates yet another example TCI state configuration and signaling according to embodiments of the present disclosure.

FIG. 13E illustrates yet another example TCI state configuration and signaling 1340 according to embodiments of the present disclosure. An embodiment of the TCI state configuration and signaling 1340 shown in FIG. 13E is for illustration only.

Figure 13F:
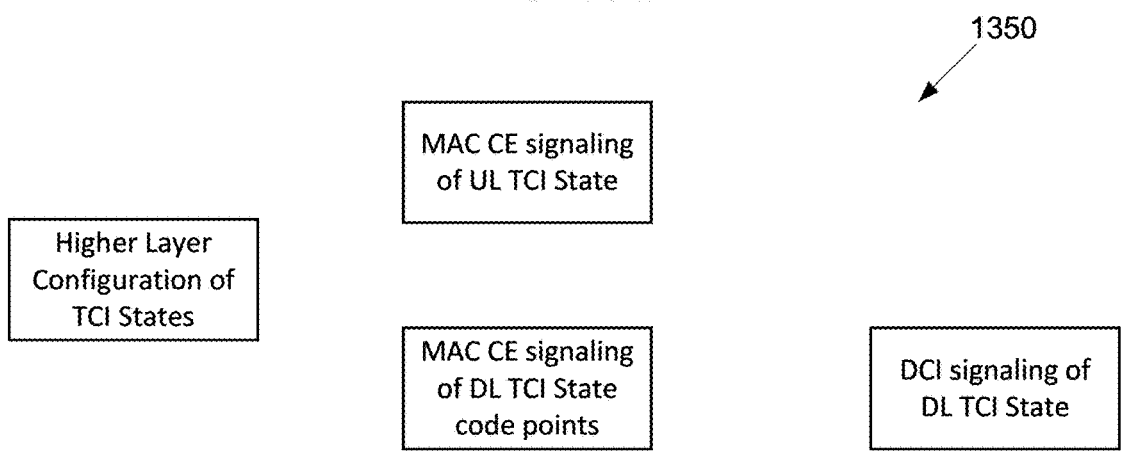
FIG. 13F illustrates yet another example TCI state configuration and signaling according to embodiments of the present disclosure.

FIG. 13F illustrates yet another example TCI state configuration and signaling 1350 according to embodiments of the present disclosure. An embodiment of the TCI state configuration and signaling 1350 shown in FIG. 13F is for illustration only.

In further examples following the examples of FIG. 13C and FIG. 13D, a MAC CE can activate a subset of TCI states corresponding to the code points of the DCI TCI state signaling. This is illustrated in FIG. 13E and FIG. 13F respectively. In one sub-example, a single MAC CE message can include the UL TCI state code points and DL TCI state (e.g., the example of FIG. 13E), or a single MAC CE message can include the DL TCI state code points and UL TCI state (e.g., the example of FIG. 13F). In another sub-example, UL TCI state code points and the DL TCI state are included in separated MAC CE messages (e.g., the example of FIG. 13E), or DL TCI state code points and the UL TCI state are included in separated MAC CE messages (e.g., the example of FIG. 13F).

In one further example to the examples of FIG. 13C, FIG. 13D, FIG. 13E, and FIG. 13F. The UL and/or DL TCI state code points signaled or activated or include, can be N UL TCI states and/or M DL TCI states wherein, N≥1 and M≥1. Wherein, the multiple TCI states can correspond to different entities, e.g., serving cells and/or bandwidth parts (BWPs) and/or component carriers and/or TRPs and/or TRP panels and/or UE panels.

FIG. 14 illustrates an example RRC signaling, MACE CE signaling, and DCI signaling 1400 according to embodiments of the present disclosure. An embodiment of the RRC signaling, MACE CE signaling, and DCI signaling 1400 shown in FIG. 14 is for illustration only.

Figure 15:
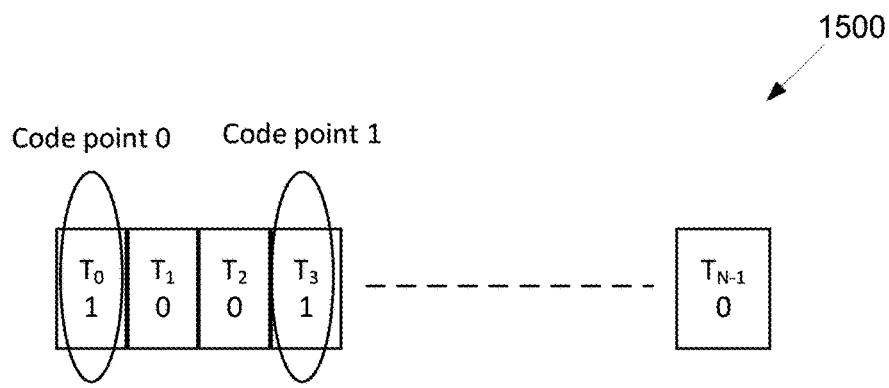
FIG. 15 illustrates an example code point and TCI state according to embodiments of the present disclosure.

In one example, the mapping of TCI states to code points, by a MAC CE, can be based on the ordinal position of the activate TCI states. In one embodiment, the MAC CE provides a list of active TCI States, as illustrated in TABLE 1, wherein the first active TCI state in the list corresponds to code point 0, the second active TCI state in the list corresponds to code point 1, and so on. In another embodiment, the MAC CE includes a bit map of the N RRC-configured TCI states as illustrated in FIG. 15, with a bit corresponding to each RRC-configured TCI state, a bit is set to 1 when its corresponding TCI state is active, otherwise the bit is set 0. The first TCI state with its corresponding bit set to 1, corresponds to code point 0. The second TCI state with its corresponding bit set to 1, corresponds to code point 1, and so on.

TABLE 1

| List of TCI States Active by MAC CE | |
| --- | --- |
| Code point | List of Active TCI states |
| Code point 0 | TCI State $T_i$ |
| Code point 1 | TCI State $T_j$ |
| . . . | . . . |

FIG. 15 illustrates an example code point and TCI state 1500 according to embodiments of the present disclosure. An embodiment of the code point and TCI state 1500 shown in FIG. 15 is for illustration only.

In another example, $K_i$ TCI states are mapped to code point i, wherein $K_0, K_1, \ldots, K_{M-1}$, the number of TCI states mapped to a TCI state code point, can be configured and updated by higher layer RRC signaling and/or MAC CE signaling and/or specified in system specifications. In one further embodiment $K_0 = K_1 = \ldots = K_{M-1} = K$.

In the examples of FIG. 12 and FIGS. 13A-13F UE specific or UE group signaling can be used to update the TCI state.

In one example 1.1, a UE specific RRC signaling can be used to configure/update the N TCI states.

In another example 1.2, a UE group signaling can be used to configure/update the N TCI states, wherein an RRC message is sent to a group a UEs including a set of N TCI states.

In another example 1.3, a cell-part signaling can be used to configure/update the N TCI states, wherein an RRC message is broadcast in part of a cell. For example, a part of a cell can be covered by one or more beams, or in another example a part of a cell can be covered by one or more TRPs. In yet a third example a part of a cell can be cover by one or more beams or one or a more TRPs. In yet a fourth example a part of cell can cover the entire cell.

In one example 1.4, the RRC message signaling the TCI states includes an index. The MAC CE including the subset of the selected TCI states and associated code points, includes the index of the corresponding RRC message providing the TCI states. This is illustrated in FIG. 16.

Figure 16:
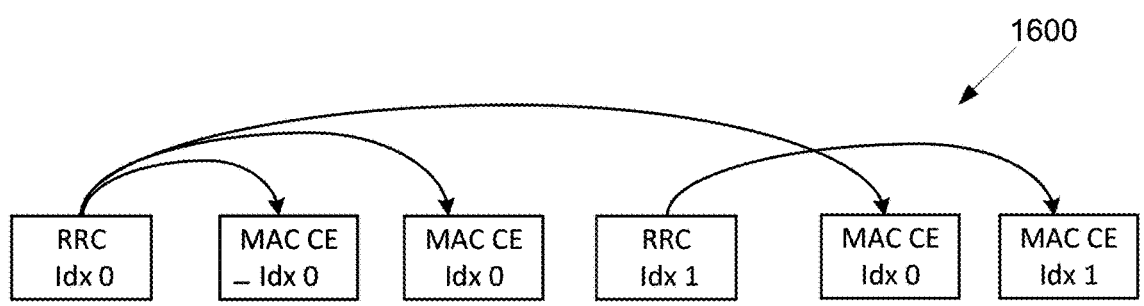
FIG. 16 illustrates an example RRC signaling and MAC CE signaling according to embodiments of the present disclosure.

FIG. 16 illustrates an example RRC signaling and MAC CE signaling 1600 according to embodiments of the present disclosure. An embodiment of the RRC signaling and MAC CE signaling 1600 shown in FIG. 16 is for illustration only.

Figure 17:
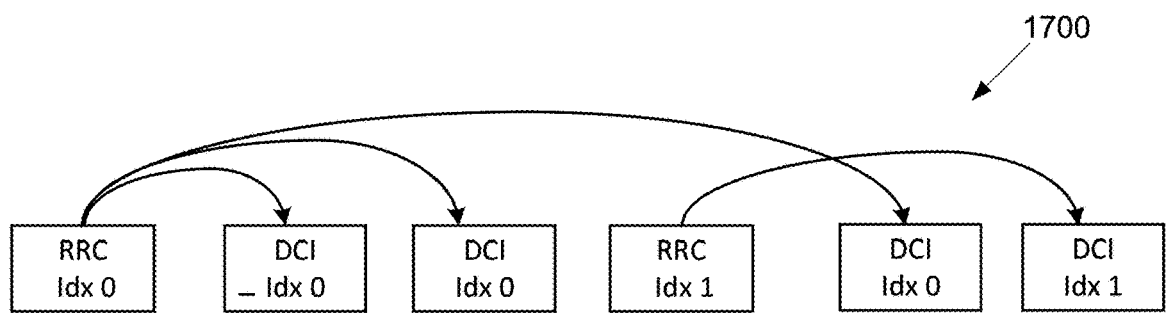
FIG. 17 illustrates an example RRC signaling and DCI signaling according to embodiments of the present disclosure.

In another example 1.5, the RRC signaling the TCI state includes an index. There is no configured MAC CE to update the TCI state code points (example 4.3 and example 4.4). The DCI including the TCI state field, includes the index of the corresponding RRC message providing the TCI states. As illustrated in FIG. 13B and FIG. 17.

FIG. 17 illustrates an example RRC signaling and DCI signaling 1700 according to embodiments of the present disclosure. An embodiment of the RRC signaling and DCI signaling 1700 shown in FIG. 17 is for illustration only.

In one example 2.1, a UE specific MAC CE signaling can be used to indicate a subset of M TCI states and associate with the code points of the DCI for TCI state update.

In one further example 2.1.1, M=1, i.e., a MAC CE activates or signals or indicates a TCI state to a UE.

In another example 2.2, a UE group MAC CE signaling can be used to indicate a subset of M TCI states and associate with the code points of the DCI for TCI state update. Wherein a MAC CE message is sent to a group of UEs.

In one further example 2.2.1, according to FIG. 13A, a UE group MAC CE signaling can be used to activate/indicate/signal a TCI state for each UE within a group of UEs. Wherein, a MAC CE message is sent to a group of UEs.

In one example, each UE has at least one TCI (a TCI state can be common (joint) for UL and DL channels or separate TCI states for DL and UL channels) in the MAC CE sent to a group of UEs.

In another example, a TCI state can apply to a subset of UEs within the group of UEs, wherein a TCI state can be common (joint) for UL and DL channels, and/or a TCI state for UL channels can be separate from that of a DL channel.

In yet another example a TCI state can apply to all UEs within a group of UEs, wherein a TCI state can be common (joint) for UL and DL channels, or a TCI state for UL channels can be separate from that of a DL channel.

In another example 2.3, a cell-part MAC CE signaling can be used to indicate a subset of M TCI states and associate with the code points of the DCI for TCI state update. For example, a part of a cell can be covered by one or more beams, or in another example a part of a cell can be covered by one or more TRPs. In yet a third example a part of a cell can be cover by one or more beams or one or a more TRPs. In yet a fourth example a part of cell can cover the entire cell.

In one further example 2.3.1, according to FIG. 13A, a cell-part MAC CE signaling can be used to activate/indicate/signal a TCI state for each UE within a part of a cell. Wherein, a MAC CE message is sent to a group of UEs.

In one example, each UE has at least one TCI (a TCI state can be common (joint) for UL and DL channels or separate TCI states for DL and UL channels) in the MAC CE sent to UEs in a part of a cell.

In another example, a TCI state can apply to a subset of UEs within the UEs of a part of a cell, wherein a TCI state can be common (joint) for UL and DL channels, and/or a TCI state for UL channels can be separate from that of a DL channel.

In yet another example a TCI state can apply to all UEs within the UEs of a part of a cell, wherein a TCI state can be common (joint) for UL and DL channels, or a TCI state for UL channels can be separate from that of a DL channel.

In one example 2.4, the MAC CE includes an index. The DCI including the TCI state field, includes the index of the corresponding MAC CE providing the TCI state code points. This is illustrated in FIG. 18.

Figure 18:
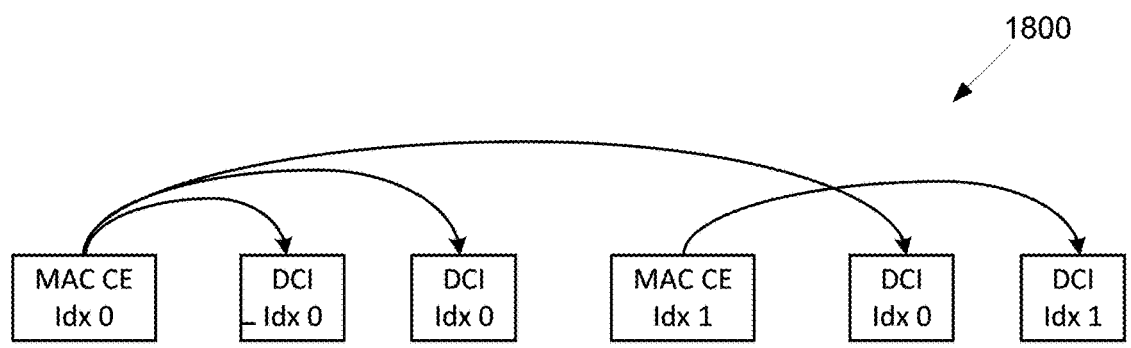
FIG. 18 illustrates an example MAC CE signaling and DCI signaling according to embodiments of the present disclosure.

FIG. 18 illustrates an example MAC CE signaling and DCI signaling 1800 according to embodiments of the present disclosure. An embodiment of the MAC CE signaling and DCI signaling 1800 shown in FIG. 18 is for illustration only.

In one example 3.1, a UE specific L1 signaling can be used to indicate a TCI state to the UE.

In one example 3.1.1, the DCI carrying the TCI state can be a downlink related DCI, i.e., a DCI for PDSCH assignment (e.g., DCI Format 1_0 or DCI Format 1_1 or DCI Format 1_2) with a DL assignment or without a DL assignment.

In another example 3.1.2, the DCI carrying the TCI state can be an uplink related DCI, i.e., a DCI for PUSCH scheduling (e.g., DCI Format 0_0 or DCI Format 0_1 or DCI Format 0_2) with an UL grant or without a UL grant.

In another example 3.1.3, the DCI carrying the TCI state can be purpose designed DCI for TCI state indication.

In another example 3.2, a UE group signaling can be used to indicate a TCI state for a UE. Wherein a L1 DCI message is sent to a group of UEs, a TCI state can be common (joint) for UL and DL channels and/or separate TCI states for DL and UL channels.

In one example 3.2.1, DCI can include one TCI state that applies to a group of UEs.

In another example 3.2.2, a DCI can include multiple TCI states, wherein each TCI state is associated with one UE.

In another example 3.2.3, a DCI can include multiple TCI states, wherein each TCI state is associated with one or more UEs.

In the aforementioned examples, a TCI state signaled or activated, can be K TCI states wherein, K≥1. Wherein, the multiple TCI states can correspond to different entities, e.g., UL/DL directions and/or serving cells and/or bandwidth parts (BWPs) and/or component carriers and/or TRPs and/or TRP panels and/or UE panels.

A TCI state of a UE can be updated by L1 control (DCI) signaling and/or MAC CE signaling, wherein the decision to update a TCI state by L1 control signaling and/or MAC CE signaling can be based on UE capability and/or higher layer (RRC and/or MAC CE) configuration or as specified in the system specifications or other condition or network implementation.

In one example 4.1, a UE can indicate capability of the UE to support TCI state update by L1 control (DCI) signaling. If a UE does not support TCI state update by L1 control (DCI) signaling, the TCI state can be updated by MAC CE signaling, in this case according to the illustration of FIG. 12, an RRC configuration message including N TCI states, and a MAC CE can be sent to a UE or to a group of UEs (example 2.2 and example 2.3). In one embodiment, the MAC CE includes a TCI state for a UE, i.e., M=1, as illustrated in FIG. 13A.

In a second embodiment, the MAC CE includes M (>1) TCI states, the first TCI state is used to indicate a beam to a UE not supporting TCI state update by L1 control (DCI) signaling. A TCI state can be common for UL and DL channels and/or separate TCI states for DL and UL channels. Separate TCI states can be used for different entities.

In another example 4.2, a UE can be configured by RRC signaling or MAC CE an L1 control (DCI) signal to update the TCI state. If a UE is not configured an L1 control (DCI) signal to update the TCI state, the TCI state can be updated by MAC CE signaling, in this case according to the illustration of FIG. 12, an RRC configuration message including N TCI states, and a MAC CE can be sent to a UE or to a group of UEs (example 2.2 and example 2.3).

In one embodiment, the MAC CE includes a TCI state for a UE, i.e., M=1, as illustrated in FIG. 13A. In a second embodiment, the MAC CE includes M (>1) TCI states, the first TCI state is used to indicate a beam to a UE that is not configured an L1 control (DCI) signal to update the TCI state. A TCI state can be common for UL and DL channels and/or separate TCI states for DL and UL channels. Separate TCI states can be used for different entities.

In one example 4.2.1, a UE can be configured with an L1 control (DCI) to update the TCI state, a UE can be further configured with a MAC CE to update the TCI state. A UE can be further configured/updated, by RRC signaling and/or MAC CE signaling and/or L1 control (DCI) signaling, a parameter to select the mechanism for beam indication (TCI state indication), i.e., whether to use DCI for TCI state indication or MAC CE for TCI state indication.

In another example 4.2.2, a UE can be configured with an L1 control (DCI) to update the TCI state, a UE can be further configured with a MAC CE to select, M, TCI state codepoints for DCI state indication, wherein M can be configured/updated by RRC signaling and/or MAC CE signaling and/or L1 signaling. If M=1, i.e., the MAC CE selects 1 codepoint for TCI state, the MAC is used for TCI state indication, and there is no DCI signaling for TCI state indication.

In another example 4.2.3, a UE can be configured with an L1 control (DCI) to update the TCI state, a UE can be further configured with a MAC CE to update the TCI state. A gNB can select either the DCI to update the TCI state, or the MAC CE to update the TCI state. In one example, this selection is determined by the gNB's implementation. In another example, the selection can be based on the payload size of the TCI state indication. For small TCI state payloads, the DCI is used to update the TCI state. For large TCI state payload, the MAC CE is used to update the TCI state. In one example, a maximum or threshold payload size of TCI state indication by DCI is specified in system specifications and/or is configured and updated by RRC signaling and/or by MAC CE signaling: if the payload size is larger than (or larger than or equal to) the maximum or threshold value, MAC CE TCI state indication is used instead of DCI TCI state indication.

In another example, a maximum or threshold number of TCI states in a TCI state indication by DCI is specified in system specifications and/or is configured and updated by RRC signaling and/or by MAC CE signaling; if the number of TCI states is larger than (or larger than or equal to) the maximum or threshold value, MAC CE TCI state indication is used instead of DCI TCI state indication.

In another example 4.2.4, a UE can be configured with an L1 control (DCI) to update the TCI state, a UE can be further configured a MAC CE to update the TCI state. A DCI TCI state indication is used for certain entities, while a MAC CE TCI state indication is used for other entities. In the examples of FIG. 13C and FIG. 13E, MAC CE is used for DL TCI state indication, while DCI is used for UL TCI state indication. While in the examples of FIG. 13D and FIG. 13F, MAC CE is used for UL TCI state indication, while DCI is used for DL TCI state indication. A person skilled in the art can realize that an entity can be other than UL/DL direction. For example, an entity can be a component carrier(s), wherein the TCI state(s) of one component carrier is indicated by MAC CE, while the TCI state(s) of other component carrier(s) is indicated by DCI. The decision which TCI state indication mechanism to use (e.g., MAC CE or DCI) can be at least one of: (1) specified in system specifications; (2) based on higher layer (RRC and/or MAC CE) configuration and reconfiguration; (3) payload load of corresponding TCI state message relative to a threshold; (4) number of TCI states indicated in corresponding TCI state message relative to a threshold; (5) UE capability; or (6) left for network implementation.

In another example 4.3, a UE can indicate capability of the UE to support TCI state update MAC CE. If a UE does not support TCI state code point update by MAC CE, the TCI state code points are determined by the RRC configuration, wherein the first TCI state in the RRC configuration corresponds to code point 0, the second TCI state in the RRC configuration corresponds to code point 1, and so on. In this case, according to the illustration of FIG. 12, the only messages that can be sent to the UE are "the higher layer configuration of TCI State" and the "DCI signaling of TCI states" as illustrated in FIG. 13B. If there are N TCI state configured by RRC and the TCI state field in the DCI is m bits, $N \leq 2^m$. A TCI state can be common for UL and DL channels and/or separate TCI states for DL and UL channels.

In another example 4.4, a UE can be configured by RRC signaling a TCI state update MAC CE. If a UE is not configured with a MAC CE to update the TCI state code points, the TCI state code points are determined by the RRC configuration, wherein the first TCI state in the RRC configuration corresponds to code point 0, the second TCI state in the RRC configuration corresponds to code point 1, and so on. In this case, according to the illustration of FIG. 12, the only messages that can be sent to the UE are "the higher layer configuration of TCI state" and the "DCI signaling of TCI states" as illustrated in FIG. 13B. If there are N TCI state configured by RRC and the TCI state field in the DCI is m bits, $N \leq 2^m$. A TCI state can be common for UL and DL channels and/or separate TCI states for DL and UL channels.

In another example 4.5, it is specified by system specification that a TCI state can be updated by MAC CE signaling, in this case according to the illustration of FIG. 13A, an RRC configuration message including N TCI states, and a MAC CE can be sent to a UE or to a group of UEs (example 2.2 and example 2.3), wherein, the MAC CE includes a TCI state for a UE, i.e., M=1. A TCI state can be common for UL and DL channels and/or separate TCI states for DL and UL channels.

In another example 4.6, it is specified by system specification that a UE does not support TCI state code point update by MAC CE, the TCI state code points are determined by the RRC configuration, wherein the first TCI state in the RRC configuration corresponds to code point 0, the second TCI state in the RRC configuration corresponds to code point 1, and so on. In this case, according to the illustration of FIG. 13B, the only messages that can be sent to the UE are "the higher layer configuration of TCI state" and the "DCI signaling of TCI states." If there are N TCI state configured by RRC and the TCI state field in the DCI is m bits, $N \leq 2^m$. A TCI state can be common for UL and DL channels and/or separate TCI states for DL and UL channels.

In the aforementioned examples, a TCI state signaled or activated, can be K TCI states wherein, $K \geq 1$. Wherein, the multiple TCI states can correspond to different entities, e.g., UL/DL directions and/or serving cells and/or bandwidth parts (BWPs) and/or component carriers and/or TRPs and/or TRP panels and/or UE panels.

A TCI state of a UE can be updated by a single stage/part TCI state (beam) indication and/or a two stage/part TCI state (beam) indication, wherein the decision to update a TCI state by a single stage/part TCI state (beam) indication and/or a two stage/part TCI state (beam) indication can be based on UE capability and/or higher layer (RRC and/or MAC CE) configuration or as specified in the system specifications.

In one example 5.1, the L1 control (DCI) signal to update the TCI state is a single stage/part L1 control signal for TCI state update (e.g., U.S. patent application Ser. No. 17/249,115 filed Feb. 19, 2021, which is incorporated by reference herein). Wherein, the L1 control (DCI) signal to update the TCI state can be a UE specific L1 control (DCI) signal to a single UE, or a UE group L1 control (DCI) signal to a group of UEs.

In another example 5.2, the L1 control (DCI) signal to update the TCI state is a two stage/part L1 control signal for TCI state update (e.g., U.S. patent application Ser. No. 17/249,115 filed Feb. 19, 2021, which is incorporated by reference herein). Wherein, the L1 control (DCI) signal to update the TCI state can be a UE specific L1 control (DCI) signal to a single UE, and/or a UE group L1 control (DCI) signal to a group of UEs. In one example, a first stage/part is to a single UE and a second stage/part is to single UE. In another example, a first stage/part is to a group of UEs and a second stage/part is to single UE. In another example, a first stage/part is to a single UE and a second stage/part is to a group of UEs. In another example, a first stage/part is to a group of UEs and a second stage/part is to a group of UE.

In another example 5.3, the control signal to update the TCI state is a two/stage part signal for TCI state update. Wherein, the control signal to update the TCI state can be a UE specific control signal to a single UE, and/or a UE group control signal to a group of UEs. In one example, a first stage/part is to a single UE and a second stage/part is to single UE. In another example, a first stage/part is to a group of UEs and a second stage/part is to single UE. In another example, a first stage/part is to a single UE and a second stage/part is to a group of UEs. In another example, a first stage/part is to a group of UEs and a second stage/part is to a group of UE. Furthermore, wherein;

In one example 5.3.1, a first stage/part is a MAC CE, and a second stage part is a L1 control (DCI) signal.

In another example 5.3.2, a first stage/part is a L1 control (DCI) signal, while a second stage part is a MAC CE.

In some examples, a first stage/part message is followed by one or more second stage/part message(s).

In one example 5.4, the MAC CE signal to update the TCI state is a single stage/part MAC CE signal for TCI state update. Wherein, the MAC CE signal to update the TCI state can be a UE specific MAC CE signal to a single UE, or a UE group MAC CE signal to a group of UEs.

In another example 5.5, the MAC CE signal to update the TCI state is a two stage/part MAC CE signal for TCI state update. Wherein, the MAC CE signal to update the TCI state can be a UE MAC CE signal to a single UE, and/or a UE group MAC CE signal to a group of UEs. In one example, a first stage/part is to a single UE and a second stage/part is to single UE. In another example, a first stage/part is to a group of UEs and a second stage/part is to single UE. In another example, a first stage/part is to a single UE and a second stage/part is to a group of UEs. In another example, a first stage/part is to a group of UEs and a second stage/part is to a group of UE. In one embodiment (component 2), a MAC CE TCI state signaling is provided.

Figure 19:
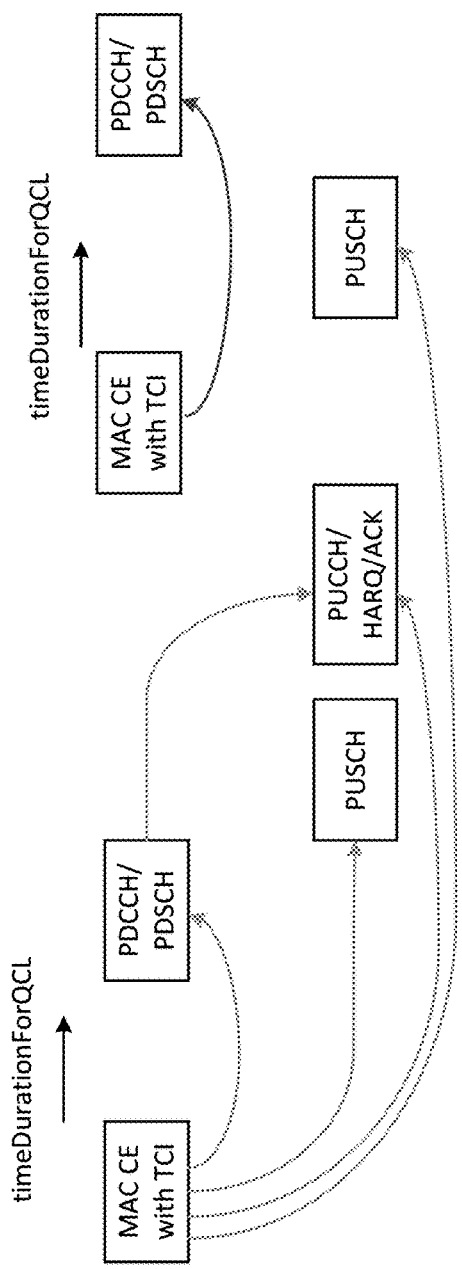
FIG. 19 illustrates an example MAC CE TCI state signaling according to embodiments of the present disclosure.

FIG. 19 illustrates an example MAC CE TCI state signaling 1900 according to embodiments of the present disclosure. An embodiment of the MAC CE TCI state signaling 1900 shown in FIG. 19 is for illustration only.

A TCI signaled in a MAC CE at time $t_1$ becomes effective at time $t_1$+timeDurationForQCL, as illustrated in FIG. 19 (and also step 1106 of FIG. 11). The timeDurationforQCL is also referred to as beam application time.

As illustrated in FIG. 19, timeDurationForQCL is the time required for the new TCI state to be activate. In one example, the timeDurationForQCL can be specified in the system specifications and/or configured or updated by RRC signaling and/or MAC CE signaling and/or L1 control (DCI) signaling. The timeDurationForQCL can be configured/updated by UE specific signaling or by common signaling. In another example, the timeDurationForQCL can be common for uplink and downlink channels or can be separately specified/configured/updated for uplink and downlink channels. In yet another example, the timeDurationForQCL can depend on the subcarrier spacing of the uplink and/or downlink channels involved with TCI state update. These channels can include the channels for indication of the TCI state update (e.g., PDCCH/PDSCH of MAC CE and corresponding PUCCH of the HARQ-ACK feedback), as well as the channels on which the updated TCI state applies. In case of different subcarrier spacing, timeDurationForQCL can depend on the smallest (or largest) subcarrier spacing among these channels.

Figure 20:
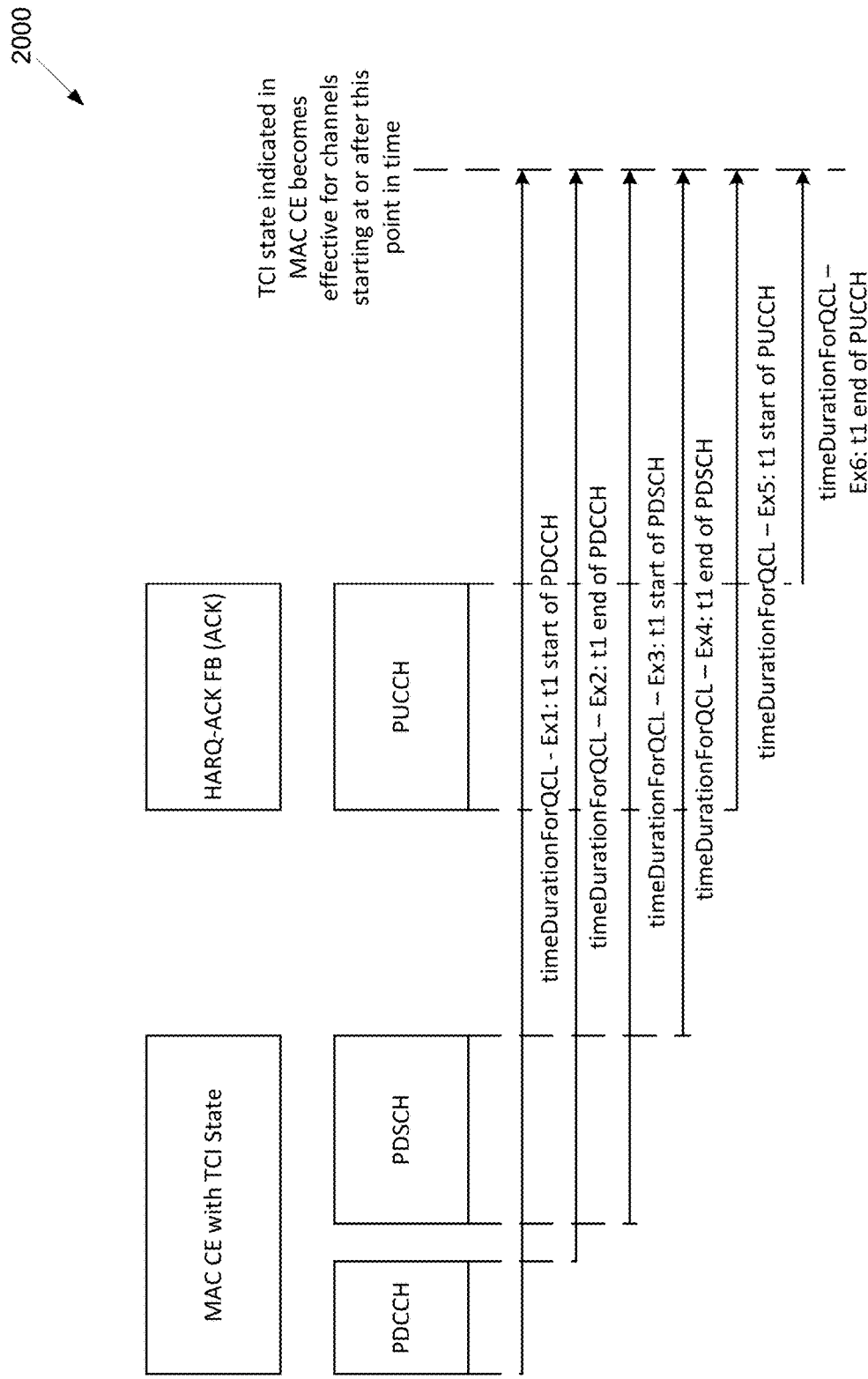
FIG. 20 illustrates an example time duration according to embodiments of the present disclosure.

FIG. 20 illustrates an example time duration for QCL 2000 according to embodiments of the present disclosure. An embodiment of the time duration for QCL 2000 shown in FIG. 20 is for illustration only.

As illustrated in FIG. 19, time $t_1$ can correspond to, as illustrated in FIG. 20; the starting symbol of the PDCCH of a positively acknowledged MAC CE including the TCI state update, or the ending symbol of the PDCCH of a positively acknowledged MAC CE including the TCI state update, or the starting symbol of the PDSCH of a positively acknowledged MAC CE including the TCI state update, or the ending symbol of the PDSCH of a positively acknowledged MAC CE including the TCI state update, or the starting symbol of the PUCCH including a positive ACK feedback of a MAC CE including the TCI state update or the ending symbol of the PUCCH including a positive ACK feedback of a MAC CE including the TCI state update In any of the above example embodiments, terms such as "timeDurationForQCL" or "beam application time," etc. are used for illustrative purposes. They can be substituted with any other terms for the same functionality.

The TCI state in the MAC CE can apply to UE specific channels transmitted and received by a UE. A common (joint) TCI state can apply to uplink and downlink channels and/or signals transmitted from/received by a UE. Alternatively, a TCI state can apply to uplink channels transmitted from a UE and a separate TCI state can apply to downlink channels received by a UE.

In one example, an indication (implicit or explicit) in a MAC CE with the TCI state, can indicate whether common (joint) or separate TCI state(s) are indicated for UL and DL channels.

In another example, an indication can be configured/updated by higher layer UE dedicated or common signaling (e.g., RRC signaling and/or MAC CE signaling) whether common (joint) or separate TCI state(s) are indicated for UL and DL channels, Separate TCI state(s) can be signaled in a MAC CE for common and/or UE-group specific channels. In some examples, a same TCI state can apply to common and/or UE-group specific and/or UE-specific channels.

Figure 21:
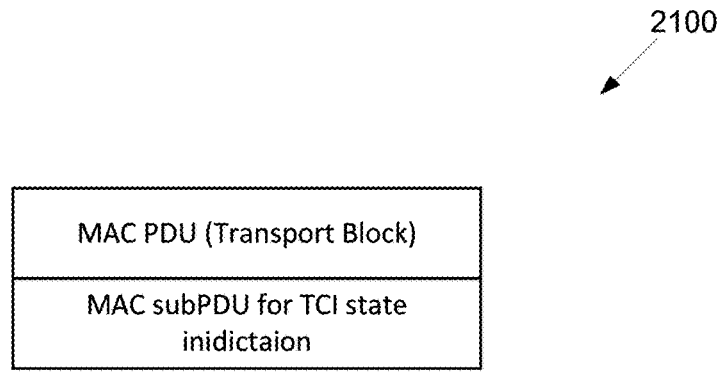
FIG. 21 illustrates an example MAC PDU and MAC subPDU according to embodiments of the present disclosure.

FIG. 21 illustrates an example MAC PDU and MAC subPDU 2100 according to embodiments of the present disclosure. An embodiment of the MAC PDU and MAC subPDU 2100 shown in FIG. 21 is for illustration only.

Figure 22:
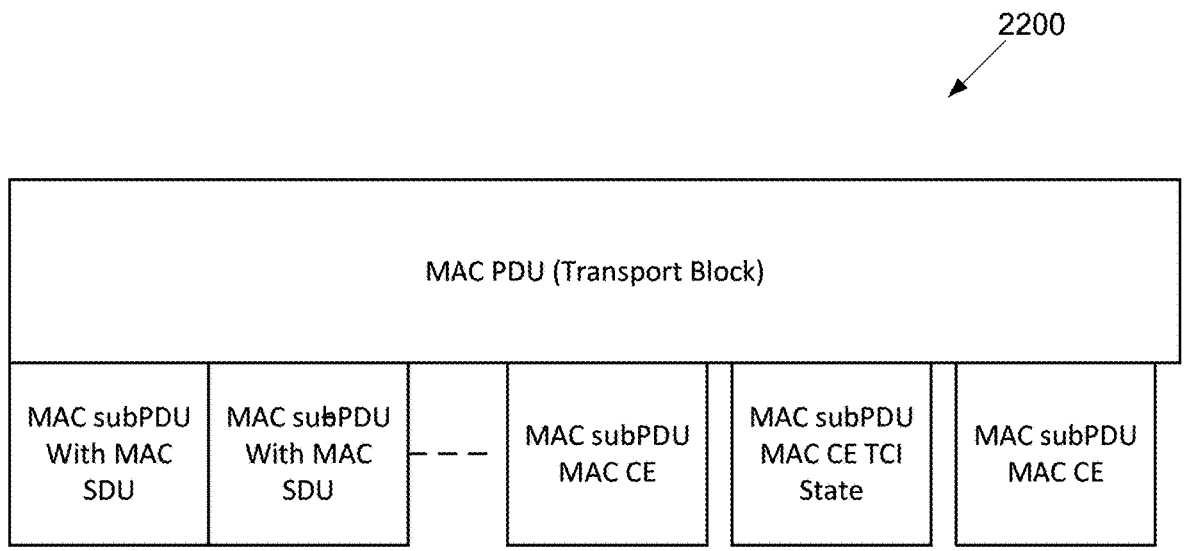
FIG. 22 illustrates another example MAC PDU and MAC subPDU according to embodiments of the present disclosure.

FIG. 22 illustrates another example MAC PDU and MAC subPDU 2200 according to embodiments of the present disclosure. An embodiment of the MAC PDU and MAC subPDU 2200 shown in FIG. 22 is for illustration only.

Figure 23:
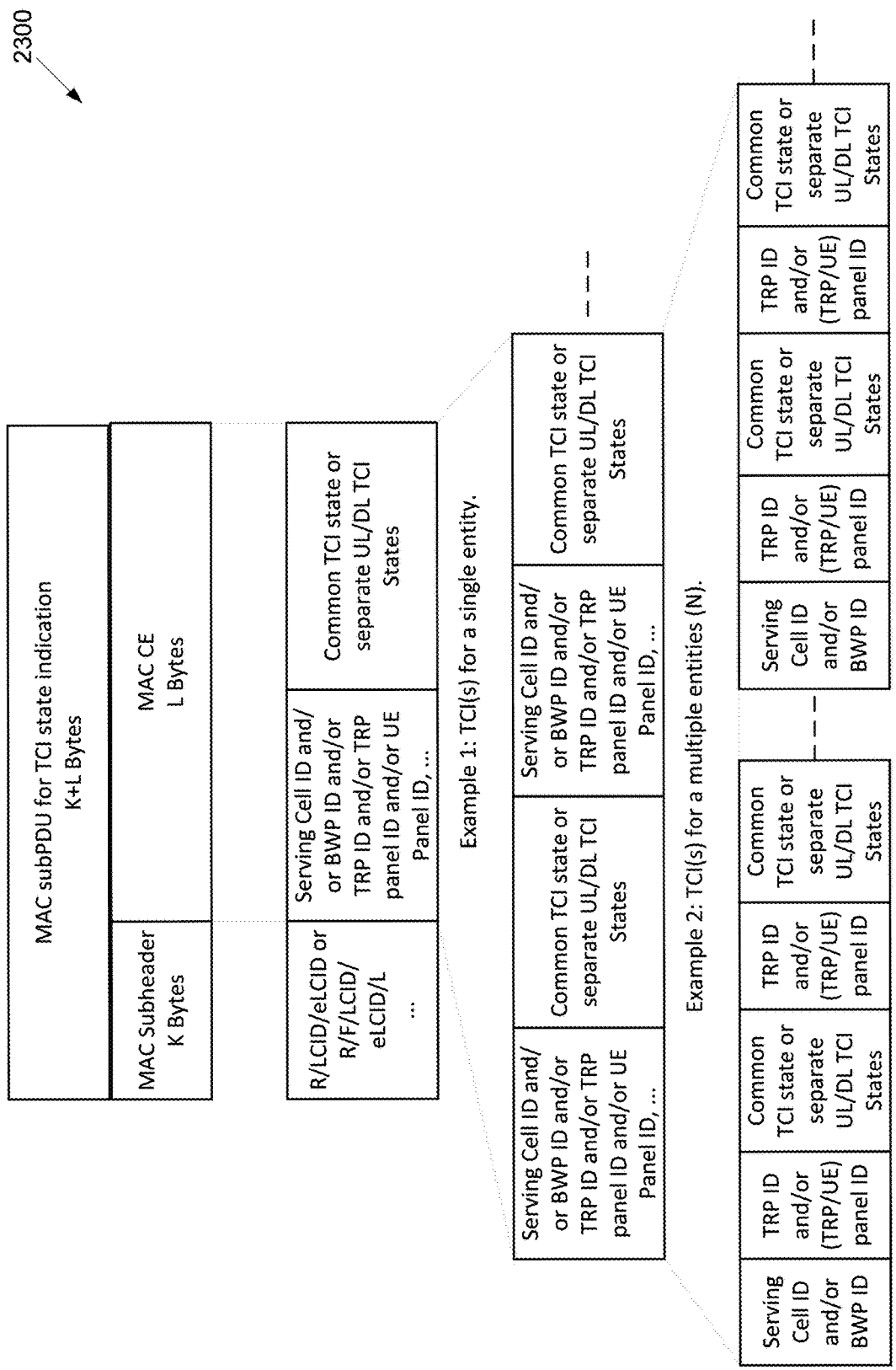
FIG. 23 illustrates an example TCI for multiple entities and multiple subentities according to embodiments of the present disclosure.

FIG. 23 illustrates an example TCI for multiple entities and multiple sub-entities 2300 according to embodiments of the present disclosure. An embodiment of the TCI for multiple entities and multiple sub-entities 2300 shown in FIG. 23 is for illustration only.

A MAC CE with a TCI state can be for a specific UE or for a group of UEs.

In one example II.1, a UE-specific MAC CE signaling is used to indicate TCI state as shown in the examples of FIG. 23.

In one example II.1.1, the MAC CE of FIG. 23, can be sent standalone with no other MAC CEs or data (MAC SDUs) as illustrated in FIG. 21.

In another example II.1.2, the MAC CE of FIG. 23, can be sent with other MAC CEs and/or data (MAC SDUs) as illustrated in FIG. 22.

As illustrated in FIG. 23, in one example, a MAC CE for TCI beam indication can include a MAC subheader and a MAC CE. In another example, a MAC subheader can include some or all of the following field; "R" reserved bit, "F" Format Field, "LCID" Logical Channel ID, "eLCID" extended Logical Channel ID, "L" Length field. The size of the MAC subheader of the TCI State MAC CE can be K bytes, wherein K depends on the information fields included in the MAC subheader. In yet another example, the MAC CE for TCI State can be of fixed length or of variable length. The size of the MAC CE of the TCI state can be L bytes, wherein L depends on the information included in the MAC CE as described next.

In one example II.1.3 (example 1 of FIG. 23), a TCI state of a single entity can be included in the MAC CE. Wherein, an entity can be serving cell ID, and/or a BWP ID and/or a TRP ID, and/or a TRP panel ID and/or a UE panel ID, etc. A TCI state can be common for UL and DL channels and/or separate TCI states for DL and UL channels.

In another example II.1.4 (example 2 of FIG. 23), a TCI state of a multiple entities (e.g., N) can be included in the MAC CE. Wherein, an entity can be serving cell ID, and/or a BWP ID and/or a TRP ID, and/or a TRP panel ID and/or a UE panel ID, etc. The number of entities (e.g., N), can be indicated in the MAC CE, or the number of entities (e.g., N) can be configured by higher layer signaling (e.g., RRC signaling and/or MAC CE signaling). A TCI state can be common for UL and DL channels and/or separate TCI states for DL and UL channels.

In another example II.1.5 (example 3 of FIG. 23), a TCI state of a multiple entities (e.g., N) and sub-entities (e.g., M (common to all entities), or $M_1, M_2, \ldots, M_N$, wherein $M_n$ is the number of sub-entities of entity n) can be included in the MAC CE. Wherein, an entity or sub-entity can be serving cell ID, and/or a BWP ID and/or a TRP ID, and/or a TRP panel ID and/or a UE panel ID, etc. The number of entities (e.g., N) and sub-entities (e.g., M or $M_1, M_2, \ldots, M_N$), can be indicated in the MAC CE, or the number of entities (e.g., N) and sub-entities (e.g., M or $M_1, M_2, \ldots, M_N$) can be configured by higher layer signaling (e.g., RRC signaling and/or MAC CE signaling). A TCI state can be common for UL and DL channels and/or separate TCI states for DL and UL channels.

As illustrated in FIG. 23 (example 3), the entities are serving cell index and BWP ID and the sub-entities are TRP ID, TRP panel ID or UE panel ID. The role of entities and sub-entities can be exchanged. In a further example, there could be more levels of sub-entities, i.e., sub-sub-entities, etc.

Figure 24:
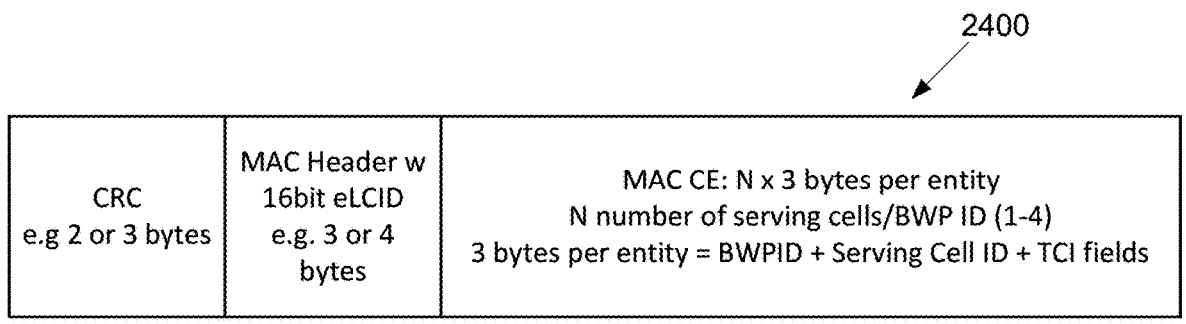
FIG. 24 illustrates an example transport block including transport block CRC according to embodiments of the present disclosure.

In one example, following example 1 of FIG. 23, the transport block including Transport Block CRC can be as illustrated in FIG. 24.

FIG. 24 illustrates an example transport block including transport block CRC 2400 according to embodiments of the present disclosure. An embodiment of the transport block including transport block CRC 2400 shown in FIG. 24 is for illustration only.

In another example II.2, UE-group MAC CE signaling is used to indicate TCI state.

Figure 25:
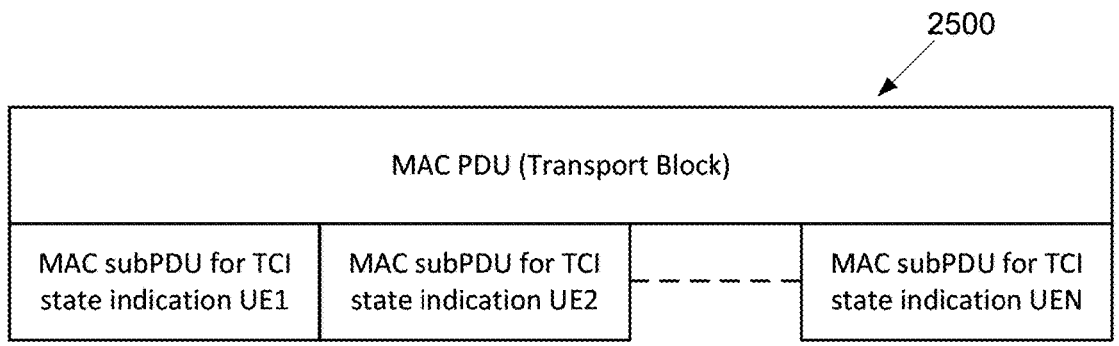
FIG. 25 illustrates another example MAC PDU and MAC subPDU according to embodiments of the present disclosure.

FIG. 25 illustrates another example MAC PDU and MAC subPDU 2500 according to embodiments of the present disclosure. An embodiment of the MAC PDU and MAC subPDU 2500 shown in FIG. 25 is for illustration only.

In one example II.2.1, a MAC CE includes TCI state(s) for a single UE, a MAC PDU can include multiple MAC CEs, with each MAC CE including TCI state(s) of a UE. An example of a standalone MAC PDU for TCI state indication to multiple UEs is illustrated in FIG. 25, wherein a MAC subPDU is for a TCI state indication of a UE. The MAC PDU can also include other MAC subPDUs for MAC SDU and/or other MAC CE.

Figure 26:
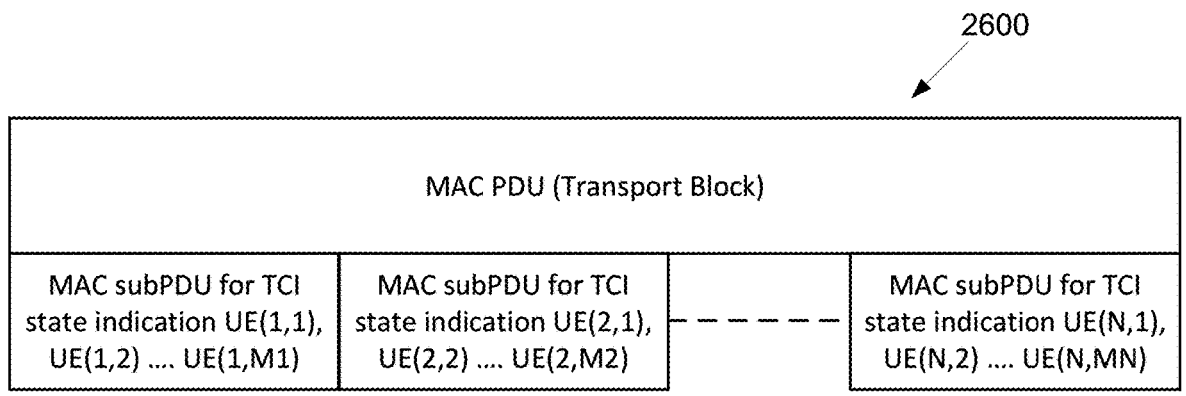
FIG. 26 illustrates yet another example MAC PDU and MAC subPDU according to embodiments of the present disclosure.

FIG. 26 illustrates yet another example MAC PDU and MAC subPDU 2600 according to embodiments of the present disclosure. An embodiment of the MAC PDU and MAC subPDU 2600 shown in FIG. 26 is for illustration only.

In another example II.2.2, a MAC CE includes TCI state(s) for multiple UEs, a MAC PDU can include a single MAC CE for TCI state indication to multiple UEs. An example of a standalone MAC PDU for TCI state indication to multiple UEs is illustrated in FIG. 26, wherein a MAC subPDU n is for a TCI state indication of $M_n$ UEs. The MAC PDU can also include other MAC subPDUs for MAC SDU and/or other MAC CE.

In one example, each UE with a TCI state indication in a MAC subPDU has at least one TCI (a TCI state can be common (joint) for UL and DL channels or separate TCI states for DL and UL channels) in the MAC subPDU.

In another example, a TCI state in a MAC subPDU can apply to a subset of UEs within the group of UEs of that MAC subPDU, wherein a TCI state can be common (joint) for UL and DL channels, and/or a TCI state for UL channels can be separate from that of a DL channel.

In yet another example a TCI state in a MAC subPDU can apply to all UEs within a group of UEs of that MAC subPDU, wherein a TCI state can be common (joint) for UL and DL channels, or a TCI state for UL channels can be separate from that of a DL channel.

Figure 27:
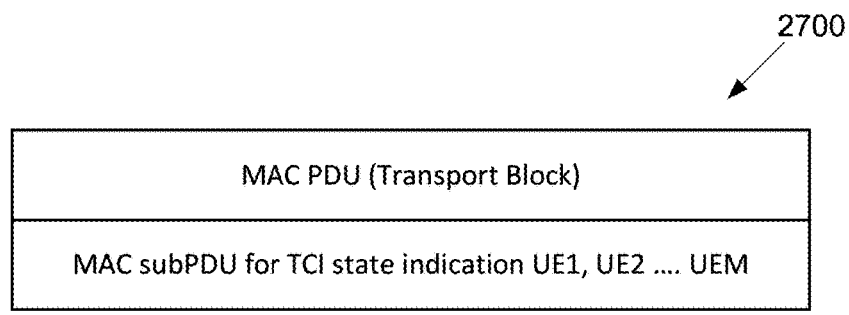
FIG. 27 illustrates yet another example MAC PDU and MAC subPDU according to embodiments of the present disclosure.

FIG. 27 illustrates yet another example MAC PDU and MAC subPDU 2700 according to embodiments of the present disclosure. An embodiment of the MAC PDU and MAC subPDU 2700 shown in FIG. 27 is for illustration only.

In another example II.2.3, a MAC CE includes TCI state(s) for multiple UEs, a MAC PDU can include a multiple MAC CEs for TCI state indication, wherein a first MAC CE for TCI state indication can indicate TCI states to a first set of UEs, a second MAC CE for TCI state indication can indicate TCI states to a second set of UEs and so on. A set can include one or more UEs. An example of a standalone MAC PDU for TCI state indication to multiple UEs is illustrated in FIG. 27, wherein a MAC subPDU is for a TCI state indication of M UEs. The MAC PDU can also include other MAC subPDUs for MAC SDU and/or other MAC CE.

In one example, each UE with a TCI state indication in a MAC subPDU has at least one TCI (a TCI state can be common (joint) for UL and DL channels or separate TCI states for DL and UL channels) in the MAC subPDU.

In another example, a TCI state in a MAC subPDU can apply to a subset of UEs within the group of UEs of the MAC subPDU, wherein a TCI state can be common (joint) for UL and DL channels, and/or a TCI state for UL channels can be separate from that of a DL channel.

In yet another example a TCI state in a MAC subPDU can apply to all UEs within a group of UEs of that MAC subPDU, wherein a TCI state can be common (joint) for UL and DL channels, or a TCI state for UL channels can be separate from that of a DL channel.

In one example II.3, a default beam (e.g., TCI state) is used in the absence of beam indication (e.g., TCI state indication). In one example II.3.1, a default beam (e.g., TCI state) is common (joint) for uplink and downlink channels. In another example II.3.2, a default beam (e.g., TCI state) is used for uplink channels, and a second default beam (e.g., TCI state) is used for downlink channels.

In one embodiment (component 3), a DCI TCI state signaling is provided.

Figure 28:
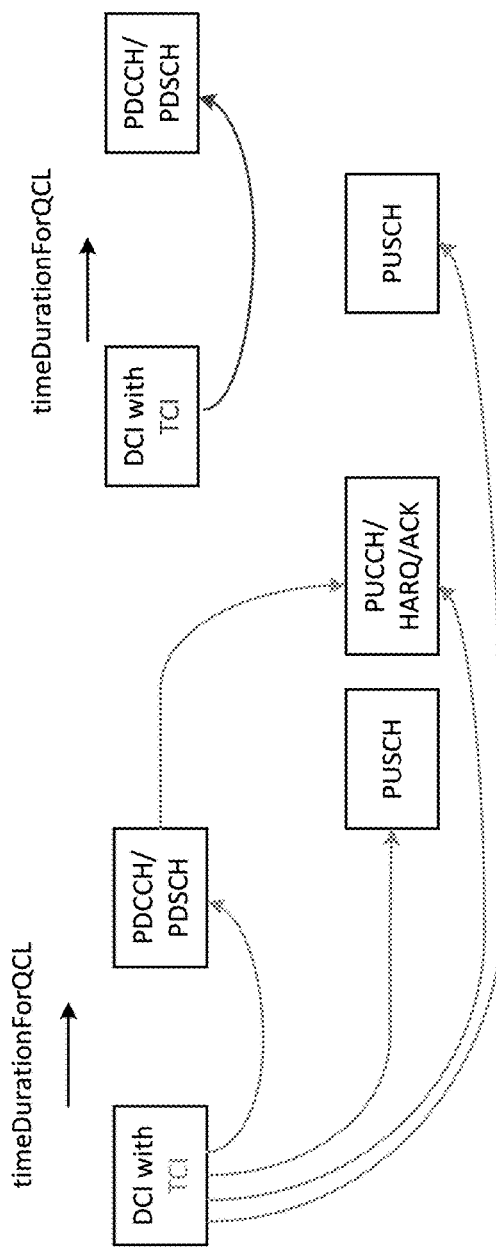
FIG. 28 illustrates an example DCI with TCI state signaling according to embodiments of the present disclosure.

FIG. 28 illustrates an example DCI with TCI state signaling 2800 according to embodiments of the present disclosure. An embodiment of the DCI with TCI state signaling 2800 shown in FIG. 28 is for illustration only.

A TCI signaled in a DCI at time $t_1$ becomes effective at time $t_1$+timeDurationForQCL, as illustrated in FIG. 28 (and also step 1106 of FIG. 11). The timeDurationForQCL is also referred to as beam application time. As illustrated in FIG. 28, timeDurationForQCL is the time required for the new TCI state to be activate. In such instance, the timeDurationForQCL can be specified in the system specifications and/or configured or updated by RRC signaling and/or MAC CE signaling and/or L1 control (DCI) signaling. The timeDurationForQCL can be configured/updated by UE specific signaling or by common signaling. In such instance, the timeDurationForQCL can be common for uplink and downlink channels or can be separately specified/configured/updated for uplink and downlink channels. In such instance, in case both TCI state update based on MAC CE signaling and TCI state update based on DCI signaling are supported, the time DurationForQCL can be common for MAC CE based signaling and DCI based signaling or can be separately configured. In such instance, the timeDurationForQCL can depend on the subcarrier spacing of the uplink and/or downlink channels involved with TCI state update. These channels can include the channels for indication of the TCI state update (e.g., PDCCH of DCI and corresponding PUCCH of the HARQ-ACK feedback), as well as the channels on which the updated TCI state applies. In case of different subcarrier spacing, timeDurationForQCL can depend on the smallest (or largest) subcarrier spacing among these channels.

Figure 29:
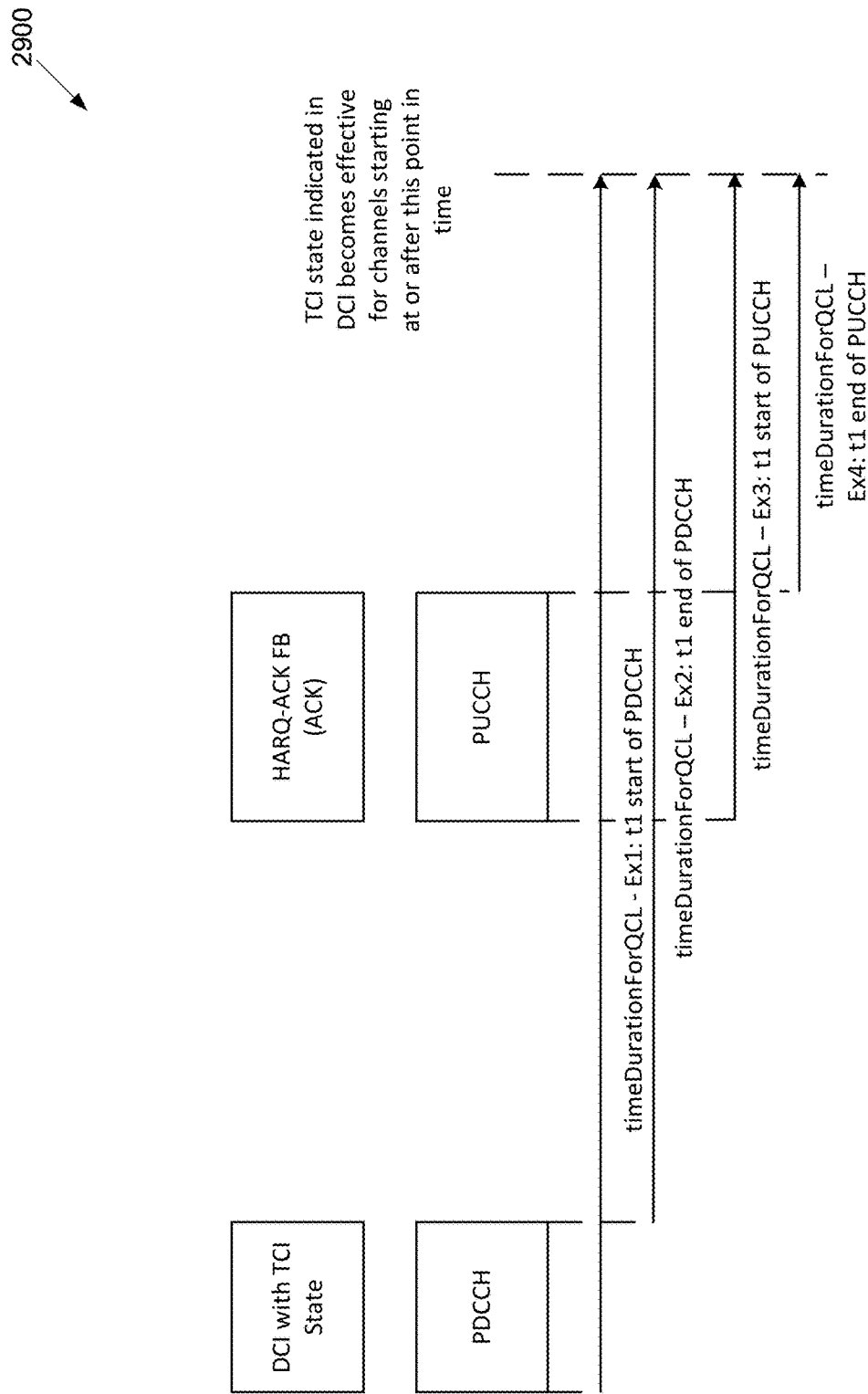
FIG. 29 illustrates an example time duration for QCL according to embodiments of the present disclosure.

FIG. 29 illustrates an example time duration for QCL 2900 according to embodiments of the present disclosure. An embodiment of the time duration for QCL 2900 shown in FIG. 29 is for illustration only.

Time $t_1$ can correspond to, as illustrated in FIG. 29, the starting symbol of the PDCCH of a positively acknowledged (if applicable) DCI including the TCI state update, or the ending symbol of the PDCCH of a positively acknowledged (if applicable) DCI including the TCI state update, or the starting symbol of the PUCCH including a positive ACK feedback of a DCI including the TCI state update or the ending symbol of the PUCCH including a positive ACK feedback of a DCI including the TCI state update. In one example, the PDCCH containing the TCI state (or TCI state code point) is acknowledged by the UE if successfully received (or if a corresponding PDSCH is successfully received), and the TCI state is applied in case of an acknowledgement of the PDCCH reception. In another example, the TCI state conveyed in the PDCCH is applied regardless of the presence of an acknowledgment.

The TCI state in the DCI can apply to UE-specific channels transmitted and received by a UE. A common (joint) TCI state can apply to uplink and downlink channels and/or signals transmitted from/received by a UE. Alternatively, a TCI state can apply to uplink channels transmitted from a UE and a separate TCI state can apply to downlink channels received by a UE.

In one example, an indication (implicit or explicit) in a DCI with the TCI state, can indicate whether common (joint) or separate TCI state(s) are indicated for UL and DL channels.

In another example, an indication can be configured/updated by higher layer UE dedicated or common signaling (e.g., RRC signaling and/or MAC CE signaling) whether common (joint) or separate TCI state(s) are indicated for UL and DL channels, Separate TCI state(s) can be signaled in a DCI for common and/or UE-group specific channels. In some examples, a same TCI state can apply to common and/or UE-group specific and/or UE-specific channels.

A DCI with a TCI state can be for a specific UE or for a group of UEs.

In one example III.1, UE-specific DCI signaling is used to indicate TCI state.

A DCI containing a TCI state can be part of a DCI that includes other control information, e.g., a TCI state can be included in a DL related DCI with a DL assignment or without a DL assignment, or a TCI state can be included in an UL related DCI with UL grant or without UL grant.

A TCI can be included in a purposed-design DCI for TCI state indication. One special example of a purpose-designed DCI is a DL-related DCI with no DL assignment for TCI state indication. Another special example of a purpose-designed DCI is an UL related DCI with no UL grant for TCI state indication.

In one example III.1.1, a TCI state of a single entity can be included in a DCI. Wherein, an entity can be serving cell ID, and/or a BWP ID and/or a TRP ID, and/or a TRP panel ID and/or a UE panel ID, etc. A TCI state can be common for UL and DL channels and/or separate TCI states for DL and UL channels.

In another example III.1.2, a TCI state of a multiple entities (e.g., N) can be included in a DCI. Wherein, an entity can be serving cell ID, and/or a BWP ID and/or a TRP ID, and/or a TRP panel ID and/or a UE panel ID, etc. The number of entities (e.g., N), can be indicated in the DCI, or the number of entities (e.g., N) can be configured by higher layer signaling (e.g., RRC signaling and/or MAC CE signaling). A TCI state can be common for UL and DL channels and/or separate TCI states for DL and UL channels.

In another example III.1.3, a TCI state of a multiple entities (e.g., N) and sub-entities (e.g., M (common to all entities), or $M_1, M_2, \ldots, M_N$, wherein $M_n$ is the number of sub-entities of entity n) can be included in a DCI. Wherein, an entity or sub-entity can be serving cell ID, and/or a BWP ID and/or a TRP ID, and/or a TRP panel ID and/or a UE panel ID, etc. The number of entities (e.g., N) and sub-entities (e.g., M or $M_1, M_2, \ldots, M_N$), can be indicated in the DCI, or the number of entities (e.g., N) and sub-entities (e.g., M or $M_1, M_2, \ldots, M_N$), can be configured by higher layer signaling (e.g., RRC signaling and/or MAC CE signaling). A TCI state can be common for UL and DL channels and/or separate TCI states for DL and UL channels.

In yet example, there could be more levels of sub-entities, i.e., sub-sub-entities, etc.

In another example III.2, a UE-group DCI signaling is used to indicate TCI state, wherein a DCI with TCI state includes TCI states for one or more UEs.

A DL-related DCI is a DCI that carries DL assignment information, such as DCI Format 1_1, DCI Format 1_2 or DCI Format 1_0. In one example III.3, a DL-related DCI can include a joint TCI for DL/UL beam indication or a separate TCIs for DL/UL beam indication or a DL TCI for DL beam indication (e.g., U.S. patent application Ser. No. 17/148,517 filed Jan. 13, 2021 as incorporated by reference herein).

DCI Format 1_1 and DCI Format 1_2 include a field "transmission configuration indication" for the indication of a downlink TCI state for PDSCH when higher layer parameter "tci-PresentForDCI," or "tci-PresentForDCI-Format1-2" is enabled.

In one example III.3.1, the "transmission configuration indication" field in DCI Format 1_1 and DCI Format 1_2 is repurposed to be used for joint (common DL and UL) TCI state indication, as described in component 1, for DL and UL channels and signals.

In another example III.3.2, a "transmission configuration indication" field is included in DCI Format 1_0 for the indication of a joint (common DL/UL) TCI state, as described in component 1, for DL and UL channels and signals.

In another example III.3.3, and in case of separate TCI state indication, the "transmission configuration indication" field in DCI Format 1_1 and DCI Format 1_2 is repurposed to be used for common DL TCI state indication for DL channels and signals. A second field "Uplink Transmission configuration indication" is included in DCI Format 1_1 and DCI Format 1_2 for common UL TCI state indication for UL channels and signals.

In another example III.3.4, and in case of separate TCI state indication, a "transmission configuration indication" field is included in DCI Format 1_0 for the indication of a common DL TCI state, as described in component 1, for DL channels and signals. A second field "Uplink Transmission configuration indication" is included in DCI Format 1_0 for common UL TCI state indication for UL channels and signals.

In another example III.3.5, and in case of separate TCI state indication, the "transmission configuration indication" field in DCI Format 1_1 and DCI Format 1_2 is repurposed to be used for common DL TCI state indication for DL channels and signals or for common UL TCI state indication for UL channels and signals. A second field "transmission configuration indication type," which can be of size 1 bit, is included in DCI Format 1_1 and DCI Format 1_2, to indicate the type of "transmission configuration indication" field, wherein the type can be (1) downlink, when the "transmission configuration indication" field indicates the TCI state of DL channels or signals, or (2) uplink, when the "transmission configuration indication" field indicates the TCI state of UL channels or signals. A gNB indicates the TCI state of DL channels and signals, and the TCI state of UL channels and signals, in separate transmissions of the DL-related DCI. For example, a first transmission of a DL-related DCI includes the TCI state of DL channels and signals, and a second transmission of a DL related DCI includes the TCI state of UL channels. An additional 1-bit flag can distinguish between joint and separate TCI state indication, wherein the flag can be conveyed by DCI signaling and/or MAC CE signaling and/or RRC signaling.

In another example III.3.6, and in case of separate TCI state indication, a "transmission configuration indication" field is included in DCI Format 1_0 for the indication of a common DL TCI state for DL channels and signals or for the indication of a common UL TCI state for UL channels and signals. A second field "transmission configuration indication type," which can be of size 1 bit, is included in DCI Format 1_0, to indicate the type of "transmission configuration indication" field, wherein the type can be (1) downlink, when the "transmission configuration indication" field indicates the TCI state of DL channels or signals, or (2) uplink, when the "transmission configuration indication" field indicates the TCI state of UL channels or signals. A gNB indicates the TCI state of DL channels and signals, and the TCI state of UL channels and signals in separate transmissions of the DL-related DCI. For example, a first transmission of a DL-related DCI includes the TCI state of DL channel and signals, and a second transmission of a DL related DCI includes the TCI state of UL channels and signals. An additional 1-bit flag can distinguish between joint and separate TCI state indication, wherein the flag can be conveyed by DCI signaling and/or MAC CE signaling and/or RRC signaling.

In another example III.3.7, the "transmission configuration indication" field in DCI Format 1_1 and DCI Format 1_2 can only indicate a joint (common DL and UL) TCI state, as described in component 1, for DL and UL channels and signals, or a common DL TCI state for DL channels and signals.

In another example III.3.8, a "transmission configuration indication" field is included in DCI Format 1_0 can only indicate a joint (common DL and UL) TCI state, as described in component 1, for DL and UL channels and signals, or a common DL TCI state for DL channels and signals.

In one example III.3.9, and based on examples III.3.1 to III.3.8, MAC CE activates two separate TCI state subsets (TCI state code points) as described in component 1. A first subset of code points is used for indication of a joint (common DL and UL) TCI state in case of joint beam indication or a common TCI state for DL channels and signals in case of separate DL/UL beam indication. A second subset of code points is used for a common TCI state for UL channels and signals in case of separate DL/UL beam indication. Wherein, a DL-related DCI (i.e., DCI Format 1_1 or DCI Format 1_2 or DCI Format 1_0) can include a first TCI field and possibly a second TCI field.

In such example, a first (or only) TCI state field indicates a code point from the first subset of code points, for a joint (common DL and UL) TCI state in case of joint beam indication or a common TCI state for DL channels and signals in case of separate DL/UL beam indication.

In such example, a second (if present) TCI state field indicates a code point from the second subset of code points, for a common TCI state for UL channels and signals in case of separate DL/UL beam indication.

In yet another example III.3.9.1, DCI and/or MAC CE signaling and/or RRC signaling can configure/update a UE whether joint DL/UL beam indication or separate DL/UL beam indication is being signaled (e.g., a 1-bit flag). For example, this can be based on an MPE event being detected. In case of joint DL/UL beam indication a single TCI state field in a DL related DCI indicates a joint DL/UL TCI state.

In case of separate DL/UL beam indication: (1) a single TCI state field in a DL related DCI indicates a common DL TCI state for DL channels and signals (example III.3.7 and example III.3.8); and/or (2) two TCI state fields in a DL related DCI wherein a first TCI state indicates a common DL TCI state for DL channels and signals and a second TCI state indicates a common UL TCI state for UL channels and signals (example III.3.3 and example III.3.4).

In one example III.3.9.2, a UE can signal to the network whether joint DL/UL beam indication or separate DL/UL beam indication may be signaled, and the network responds accordingly, i.e., based on the UE's signaling the network uses joint DL/UL beam indication or separate DL/UL beam indication. For example, this can be based on an MPE event being detected at the UE. In case of joint DL/UL beam indication a single TCI state field in a DL related DCI indicates a joint DL/UL TCI state.

In case of separate DL/UL beam indication: (1) a single TCI state field in a DL related DCI indicates a common DL TCI state for DL channels and signals (example III.3.7 and example III.3.8); and/or (2) two TCI state fields in a DL related DCI wherein a first TCI state indicates a common DL TCI state for DL channels and signals and a second TCI state indicates a common UL TCI state for UL channels and signals (example III.3.3 and example III.3.4).

In another example III.3.10, and based on examples III.3.5 and III.3.6, MAC CE activates two separate TCI state subsets (TCI state code points) as described in component 1. A first subset of code points is used for indication of a joint (common DL and UL) TCI state in case of joint beam indication or a common TCI state for DL channels and signals in case of separate DL/UL beam indication. A second subset of code points is used for a common TCI state for UL channels and signals in case of separate DL/UL beam indication.

In such example, a DL-related DCI (i.e., DCI Format 1_1 or DCI Format 1_2 or DCI Format 1_0) can include one TCI field.

In such example, a UE determines based on implicit indication, explicit indication (e.g., based on a field in the DCI) that: (1) the TCI state field indicates a code point from the first subset of code points, for a joint (common DL and UL) TCI state in case of joint DL/UL beam indication or a common TCI state for DL channels and signals in case of separate DL/UL beam indication; and/or (2) the TCI state field indicates a code point from the second subset of code points, for a common TCI state for UL channels and signals in case of separate DL/UL beam indication.

In one example III.3.10.1, DCI signaling and/or MAC CE signaling and/or RRC signaling can configure/update a UE whether joint DL/UL beam indication or separate DL/UL beam indication is being signaled. For example, this can be based on an MPE event being detected. In case of joint DL/UL beam indication a TCI state in a DL related DCI indicates a joint DL/UL TCI state. In case of separate DL/UL beam indication a TCI state in a DL related DCI indicates a common DL TCI state for DL channels and signals or a common UL TCI state for UL channels and signals.

In one example III.3.10.2, a UE can signal to the network whether joint DL/UL beam indication or separate DL/UL beam indication may be signaled, and the network responds accordingly, i.e., based on the UE's signaling the network uses joint DL/UL beam indication or separate DL/UL beam indication. For example, this can be based on an MPE event being detected at the UE. In case of joint DL/UL beam indication a TCI state in a DL related DCI indicates a joint DL/UL TCI state. In case of separate DL/UL beam indication a TCI state in a DL related DCI indicates a common DL TCI state for DL channels and signals or a common UL TCI state for UL channels and signals.

In another example III.3.11, and based on examples III.3.9 and III.3.10, MAC CE activates three separate TCI state subsets (TCI state code points) as described in component 1. A first subset of code points is used for indication of a joint (common DL and UL) TCI state in case of joint beam indication. A second subset of code points is used for a common TCI state for DL channels and signals in case of separate DL/UL beam indication. A third subset of code points is used for a common TCI state for UL channels and signals in case of separate DL/UL beam indication. Based on the type of TCI state being signaled (joint DL/UL, common DL or common UL), a code point from the corresponding subset of code points activated by MAC CE is signaled to the UE in a DL related DCI.

In another example III.3.12, and based on examples III.3.9 and III.3.10, MAC CE activates a single TCI state subset (TCI state code points) as described in component 1.

In such example, (1) the subset of code points is used for indication of a joint (common DL and UL) TCI state in case of joint beam indication, (2) the subset of code points is used for a common TCI state for DL channels and signals in case of separate beam indication of a DL TCI state, (3) the subset of code points is used for a common TCI state for UL channels and signals in case of separate beam indication of a UL TCI state, and/or (4) the subset of code points is used for indication of a first common TCI state for DL channels and signals and a second common TCI state for UL channels and singles in case of separate beam indication of a UL TCI state Based on the type of TCI state being signaled (joint DL/UL, common DL or common UL or a first common DL and a second common UL), a code point from the subset of code points activated by MAC CE is signaled to the UE in a DL related DCI to indicate: (1) a joint DL/UL TCI state; (2) a common DL TCI state; (3) a common UL TCI state; and/or (4) a common DL TCI state and a common UL TCI state.

In another example III.3.13, and based on examples III.3.11 and III.3.12 and FIG. 13B, the subset(s) of TCI state code points to be signaled in a DL related DCI is activated by RRC signaling.

In another example III.3.14, and based on examples III.3.9 to III.3.13 a purpose designed DCI for TCI state indication is used to signal a TCI state(s).

An UL-related DCI is a DCI that carries UL scheduling grant information, such as DCI Format 0_1, DCI Format 0_2 or DCI Format 1_0. In one example III.4, an UL-related DCI can include a joint TCI for DL/UL beam indication or a separate TCIs for DL/UL beam indication or an UL TCI for UL beam indication (cf. U.S. patent application Ser. No. 17/148,517 filed Jan. 13, 2021 as incorporated by reference herein).

DCI Format 0_1 and DCI Format 0_2 can include a field "SRS resource indicator."

In one example III.4.1, the "SRS resource indicator" field in DCI Format 0_1 and DCI Format 0_2 is repurposed to be used for joint (common DL and UL) TCI state indication, as described in component 1, for DL and UL channels and signals.

In another example III.4.2, a "transmission configuration indication" field is included in DCI Format 0_0, DCI Format 0_1 and/or DCI Format 2_1 for the indication of a joint (common DL/UL) TCI state, as described in component 1, for DL and UL channels and signals.

In another example III.4.3, and in case of separate TCI state indication, the "SRS resource indicator" field in DCI Format 0_1 and DCI Format 0_2 is repurposed to be used for common UL TCI state indication for UL channels and signals. A second field "Downlink Transmission configuration indication" is included in DCI Format 0_1 and DCI Format 0_2 for common DL TCI state indication for DL channels and signals.

In another example III.4.4, and in case of separate TCI state indication, a "uplink transmission configuration indication" field is included in DCI Format 0_0, DCI Format 0_1 and/or DCI Format 0_2 for the indication of a common UL TCI state, as described in component 1, for UL channels and signals. A second field "downlink transmission configuration indication" is included in DCI Format 0_0, DCI Format 0_1 and/or DCI Format 0_2 for common DL TCI state indication for DL channels and signals.

In another example III.4.5, and in case of separate TCI state indication, the "SRS resource indicator" field in DCI Format 0_1 and DCI Format 0_2 is repurposed to be used for common UL TCI state indication for UL channels and signals or for common DL TCI state indication for DL channels and signals. A second field "transmission configuration indication type," which can be of size 1 bit, is included in DCI Format 0_1 and DCI Format 0_2, to indicate the type of "transmission configuration indication" field, wherein the type can be (1) downlink, when the "transmission configuration indication" field indicates the TCI state of DL channels or signals, or (2) uplink, when the "transmission configuration indication" field indicates the TCI state of UL channels or signals. A gNB indicates the TCI state of DL channels and signals, and the TCI state of UL channels and signals, in separate transmissions of the UL-related DCI. For example, a first transmission of an UL-related DCI includes the TCI state of DL channels and signals, and a second transmission of an UL related DCI includes the TCI state of UL channels. An additional 1-bit flag can distinguish between joint and separate TCI state indication, wherein the flag can be conveyed by DCI signaling and/or MAC CE signaling and/or RRC signaling.

In another example III.4.6, and in case of separate TCI state indication, a "transmission configuration indication" field is included in DCI Format 0_0, DCI Format 0_1 and/or DCI Format 0_2 for the indication of a common UL TCI state for UL channels and signals or for the indication of a common DL TCI state for DL channels and signals. A second field "transmission configuration indication type," which can be of size 1 bit, is included in DCI Format 0_0, DCI Format 0_1 and/or DCI Format 0_2 to indicate the type of "transmission configuration indication" field, wherein the type can be (1) downlink, when the "transmission configuration indication" field indicates the TCI state of DL channels or signals, or (2) uplink, when the "transmission configuration indication" field indicates the TCI state of UL channels or signals.

A gNB indicates the TCI state of DL channels and signals, and the TCI state of UL channels and signals in separate transmissions of the UL-related DCI. For example, a first transmission of a UL-related DCI includes the TCI state of DL channel and signals, and a second transmission of a UL related DCI includes the TCI state of UL channels and signals. An additional 1-bit flag can distinguish between joint and separate TCI state indication, wherein the flag can be conveyed by DCI signaling and/or MAC CE signaling and/or RRC signaling.

In another example III.4.7, the "SRS resource indicator" field in DCI Format 0_1 and DCI Format 0_2 can only indicate a joint (common DL and UL) TCI state, as described in component 1, for DL and UL channels and signals, or a common UL TCI state for UL channels and signals.

In another example III.4.8, a "transmission configuration indication" field is included in DCI Format 0_0, DCI Format 0_1 and/or DCI Format 0_2 can only indicate a joint (common DL and UL) TCI state, as described in component 1, for DL and UL channels and signals, or a common UL TCI state for UL channels and signals.

In one example III.4.9, and based on examples III.4.1 to III.4.8, MAC CE activates two separate TCI state subsets (TCI state code points) as described in component 1. A first subset of code points is used for indication of a joint (common DL and UL) TCI state in case of joint beam indication or a common TCI state for UL channels and signals in case of separate DL/UL beam indication. A second subset of code points is used for a common TCI state for DL channels and signals in case of separate DL/UL beam indication.

In such example, a UL-related DCI (i.e., DCI Format 0_1 or DCI Format 0_2 or DCI Format 0_0) can include a first TCI field and possibly a second TCI field.

In such example, a first (or only) TCI state field indicates a code point from the first subset of code points, for a joint (common DL and UL) TCI state in case of joint beam indication or a common TCI state for UL channels and signals in case of separate DL/UL beam indication.

In such example, a second (if present) TCI state field indicates a code point from the second subset of code points, for a common TCI state for DL channels and signals in case of separate DL/UL beam indication.

In a further example III.4.9.1, DCI and/or MAC CE signaling and/or RRC signaling can configure/update a UE whether joint DL/UL beam indication or separate DL/UL beam indication is being signaled (e.g., a 1-bit flag). For example, this can be based on an MPE event being detected. In case of joint DL/UL beam indication a single TCI state field in a UL related DCI indicates a joint DL/UL TCI state.

In case of separate DL/UL beam indication: (1) a single TCI state field in a UL related DCI indicates a common UL TCI state for UL channels and signals (example III.4.7 and example III.4.8); and/or (2) two TCI state fields in a UL related DCI wherein a first TCI state indicates a common UL TCI state for UL channels and signals and a second TCI state indicates a common DL TCI state for DL channels and signals (example III.4.3 and example III.4.4).

In one example III.4.9.2, a UE can signal to the network whether joint DL/UL beam indication or separate DL/UL beam indication may be signaled, and the network responds accordingly, i.e., based on the UE's signaling the network uses joint DL/UL beam indication or separate DL/UL beam indication. For example, this can be based on an MPE event being detected at the UE. In case of joint DL/UL beam indication a single TCI state field in a UL related DCI indicates a joint DL/UL TCI state.

In case of separate DL/UL beam indication: (1) a single TCI state field in a UL related DCI indicates a common UL TCI state for UL channels and signals (example III.4.7 and example III.4.8); and/or (2) two TCI state fields in a UL related DCI wherein a first TCI state indicates a common UL TCI state for UL channels and signals and a second TCI state indicates a common DL TCI state for DL channels and signals (example III.4.3 and example III.4.4).

In another example III.4.10, and based on examples III.4.5 and III.4.6, MAC CE activates two separate TCI state subsets (TCI state code points) as described in component 1. A first subset of code points is used for indication of a joint (common DL and UL) TCI state in case of joint beam indication or a common TCI state for UL channels and signals in case of separate DL/UL beam indication. A second subset of code points is used for a common TCI state for DL channels and signals in case of separate DL/UL beam indication.

In such example, a UL-related DCI (i.e., DCI Format 0_1 or DCI Format 0_2 or DCI Format 0_0) can include one TCI field.

In such example, a UE determines based on implicit indication, explicit indication (e.g., based on a field in the DCI) that: (1) the TCI state field indicates a code point from the first subset of code points, for a joint (common DL and UL) TCI state in case of joint DL/UL beam indication or a common TCI state for UL channels and signals in case of separate DL/UL beam indication; and/or (2) the TCI state field indicates a code point from the second subset of code points, for a common TCI state for DL channels and signals in case of separate DL/UL beam indication.

In one example III.4.10.1, DCI and/or MAC CE signaling and/or RRC signaling can configure/update a UE whether joint DL/UL beam indication or separate DL/UL beam indication is being signaled. For example, this can be based on an MPE event being detected. In case of joint DL/UL beam indication a TCI state in a UL related DCI indicates a joint DL/UL TCI state. In case of separate DL/UL beam indication a TCI state in a UL related DCI indicates a common UL TCI state for UL channels and signals or a common DL TCI state for DL channels and signals.

In one example III.4.10.2, a UE can signal to the network whether joint DL/UL beam indication or separate DL/UL beam indication may be signaled, and the network responds accordingly, i.e., based on the UE's signaling the network uses joint DL/UL beam indication or separate DL/UL beam indication. For example, this can be based on an MPE event being detected at the UE. In case of joint DL/UL beam indication a TCI state in a UL related DCI indicates a joint DL/UL TCI state. In case of separate DL/UL beam indication a TCI state in a UL related DCI indicates a common UL TCI state for UL channels and signals or a common DL TCI state for DL channels and signals.

In another example III.4.11, and based on examples III.4.9 and III.4.10, MAC CE activates three separate TCI state subsets (TCI state code points) as described in component 1. A first subset of code points is used for indication of a joint (common DL and UL) TCI state in case of joint beam indication. A second subset of code points is used for a common TCI state for DL channels and signals in case of separate DL/UL beam indication. A third subset of code points is used for a common TCI state for UL channels and signals in case of separate DL/UL beam indication. Based on the type of TCI state being signaled (joint DL/UL, common DL or common UL), a code point from the corresponding subset of code points activated by MAC CE is signaled to the UE in a UL related DCI.

In another example III.4.12, and based on examples III.4.9 and III.4.10, MAC CE activates a single TCI state subset (TCI state code points) as described in component 1. In such example, (1) the subset of code points is used for indication of a joint (common DL and UL) TCI state in case of joint beam indication; (2) the subset of code points is used for a common TCI state for DL channels and signals in case of separate beam indication of a DL TCI state; (3) the subset of code points is used for a common TCI state for UL channels and signals in case of separate beam indication of a UL TCI state; and/or (4) the subset of code points is used for indication of a first common TCI state for DL channels and signals and a second common TCI state for UL channels and singles in case of separate beam indication of a UL TCI state Based on the type of TCI state being signaled (joint DL/UL, common DL or common UL or a first common DL and a second common UL), a code point from the subset of code points activated by MAC CE is signaled to the UE in a UL related DCI to indicate: (1) a joint DL/UL TCI state; (2) a common DL TCI state; (3) a common UL TCI state; and/or (4) a common DL DCI state and a common UL TCI state.

In another example III.4.13, and based on examples III.4.11 and III.4.12 and FIG. 13B, the subset(s) of TCI state code points to be signaled in a UL related DCI is activated by RRC signaling.

In another example III.4.14, and based on examples III.4.9 to III.4.13 a purpose designed DCI for TCI state indication is used to signal a TCI state(s).

In another example III.4.15 and based on example III.3.9 to III.3.13 and III.4.9 to III.4.13, MAC CE activates two separate TCI state subsets (TCI state code points) as described in component 1.

Regarding a first subset of code points: (1) a first subset of code points is used for indication of a joint (common DL and UL) TCI state in case of joint beam indication; (2) for DL related DCI, a first subset of code points is used for a common TCI state for DL channels and signals in case of separate DL/UL beam indication; and/or (3) for UL related DCI, a first subset of code points is used for a common TCI state for UL channels and signals in case of separate DL/UL beam indication.

Regarding a second subset of code points: (1) for DL related DCI, a second subset of code points is used for a common TCI state for UL channels and signals in case of separate DL/UL beam indication; and/or (2) for UL related DCI, a second subset of code points is used for a common TCI state for DL channels and signals in case of separate DL/UL beam indication.

In one embodiment (component 4), a C-RNTI update during L1/L2 centric handover is provided.

In L1/L2 centric handover a UE is handed over from one cell to the next through L1/L2 procedures without invoking L3, for low latency, low overhead, high efficiency handover. A UE in connected state has a cell radio network temporary identifier (C-RNTI). The C-RNTI is typically allocated uniquely within a cell, as a UE moves from one cell to the next, the C-RNTI can be updated. It is possible that the C-RNTI used by a UE in the source cell is occupied in the target cell, hence this necessitates a C-RNTI update.

In this component, a method is provided for efficient update of the C-RNTI.

A cell can maintain a set of reserved C-RNTI values for each of the neighboring cells. The reserved C-RNTI values can be configured/updated by RRC signaling and/or MAC CE signaling. The C-RNTI values in the reserved set can be available or unavailable as described in the following. When a UE is handed over to the neighboring target cell from a source cell, a C-RNTI from the reserved set of C-RNTIs for that target cell, and that is available is selected and the C-RNTI of the UE being handed over is updated to the value of the selected C-RNTI as part of the L1/L2 centric handover procedure. The selected C-RNTI is marked as unavailable in the set of reserved C-RNTIs for the target cell. The C-RNTI remains unavailable until the target cell notifies the source cell that the C-RNTI is no longer in use and is available.

A C-RNTI can be updated during handover by MAC CE signaling and/or L1 signaling. In one example, the C-RNTI can be included in a beam indication message (TCI state indication message), wherein the beam indication message updates the beam to a beam of a neighboring cell (target handover cell). The beam indication message can include an index within the set of reserved C-RNTI values to indicate the selected C-RNTI of the target cell.

In the aforementioned examples/embodiments, the DL and UL beam indication are separate (decoupled), i.e., the DL beam indication is based on DL-TCI indication and UL beam indication is based on UL-TCI. In the present disclosure, a joint TCI that couples DL and UL beam indications (either partially or fully) is provided. An example use case of the provided joint TCI indication can be a reciprocal system in which UL-DL beam correspondence holds.

The present disclosure includes the following components. A next component includes the structure of the joint TCI.

In one embodiment (component 5), a joint TCI structure is provided.

In embodiment V, a UE is configured/indicated with a joint TCI, denoted as J-TCI, state indicating both UL and DL beam indication, wherein each J-TCI includes/comprises up to three components (A, B, C). In such embodiment, "A" includes/comprises common components such as RSs and/or parameters for both UL and DL, "B" includes/comprises DL-specific components such as RSs and/or parameters for DL, and "C" includes/comprises UL-specific components such as RSs and/or parameters for UL.

Hence, up to two components (A, B) is used to indicate/configure DL-TCI and up to two components (A, C) is used to indicate/configure UL-TCI, i.e., DL-TCI=(A, B) and UL-TCI=(A, C). In addition, any component A, B, and C can be empty (i.e., does not exist, hence not included in J-TCI).

In one example, component A, if present, can include at least one or more of the following; a reference signal identifier, a QCL Type e.g., QCL-Type D, or a spatial relation, a cell index, a physical cell identifier (PCI), bandwidth part identifier (BWP ID).

In one example, component B, if present, can include at least one or more of the following; a reference signal identifier, a QCL Type e.g., QCL-Type D, or a spatial relation, a cell index, a PCI, a BWP ID, additional QCL-Types (e.g., QCL Type A or B or C), for the same reference signal or for another reference signal, wherein each reference signal can include a reference signal identifier, a cell index, a PCI, a BWP ID.

In one example, component C, if present, can include at least one or more of the following; a reference signal identifier, a QCL Type e.g., QCL-Type D, or a spatial relation, a cell index, a PCI, a BWP ID, pathloss reference signal ID, power control parameter P0, pathloss compensation factor alpha, power control closed loop index, time advance $TA_{TCI}$, wherein $TA_{TCI}$ is an additional TA corresponding to this TCI state. Total time advance=physical channel TA (as described in section 4.2 of 38.213)+$TA_{TCI}$. $TA_{TCI}$ can be a positive value, a negative value or zero.

At least one of the following sub-embodiments can be used (to indicate/configure J-TCI) by the gNB or network (NW).

In one sub-embodiment 1A, the component A is empty (i.e., does not exist or not included in J-TCI), and J-TCI comprises two components (B, C). Hence, UL and DL beam indication is separate via DL-TCI=B and UL-TCI=C, since there is no common component (A) indicated/configured to the UE.

In one sub-embodiment 1B, the component B and C are empty (i.e., do not exist or not included in J-TCI), and J-TCI comprises only one component A. Hence, UL and DL beam indication is joint via DL-TCI=UL-TCI=J-TCI=A, since there is no DL-specific component (B) or UL-specific component (C) indicated/configured to the UE.

In one sub-embodiment 1C, the component B is empty (i.e., does not exist or not included in J-TCI), and J-TCI comprises two components (A, C). Hence, DL beam indication is via DL-TCI=A, and UL beam indication is via UL-TCI=J-TCI=(A, C). Some components of UL-TCI are common with (the same as) DL-TCI=A, and the remaining components (C) are indicated/configured additionally.

In example 1C-1, the remaining components (C) indicates K=1 panel selection (single panel selection, SPS) for UL transmission for the case when there are N>1 antenna panels at the UE.

In example 1C-2, the remaining components (C) indicates either K=1 panel selection (SPS) or K>1 panel selection (multi-panel selection, MPS) for UL transmission for the case when there are N>1 antenna panels at the UE.

In example 1C-3, the remaining components (C) indicates per panel parameters for the case when there are N>1 antenna panels at the UE.

In example 1C-4, the remaining components (C) indicates K=1 panel selection (single panel selection, SPS) for UL transmission and per panel parameters for the case when there are N>1 antenna panels at the UE.

In example 1C-5, the remaining components (C) indicates either K=1 panel selection (SPS) or K>1 panel selection (multi-panel selection, MPS) for UL transmission and per panel parameters for the case when there are N>1 antenna panels at the UE.

In the aforementioned examples, the K panel selection (SPS or MPS) is indicated via SRI included in the component C, where the SRI indicates (or is associated with) the K panel(s) selected out of N antenna panels. Alternatively, the K panel selection is indicated via panel-ID indication included in the component C, where the panel-ID indicates (or is associated with) the K panel(s) selected out of N antenna panels. In addition, a few examples of per-panel parameters include timing parameters (e.g., timing advance or TA), panel-ID, and RS ID (e.g., SRI).

In one sub-embodiment 1D, the component C is empty (i.e., does not exist or not included in J-TCI), and J-TCI comprises two components (A, B). Hence, DL beam indication is via DL-TCI=J-TCI=(A, B), and UL beam indication is via UL-TCI=A. Some components of DL-TCI are common with (the same as) UL-TCI=A, and the remaining components (B) are indicated/configured additionally.

In one sub-embodiment 1E, none of components A, B, and C is empty, and J-TCI comprises all three components (A, B, C). Hence, DL beam indication is via DL-TCI=(A, B), and UL beam indication is via UL-TCI=(A, C).

In one sub-embodiment 1F, the beam indication is according to sub-embodiment 1B when there is N=1 antenna panel at the UE, and the beam indication is according to sub-embodiment 1C when there are N>1 antenna panels at the UE.

In one example, only one of the above sub-embodiments (1A through 1E) is used/supported to indicate/configure J-TCI. In another example, multiple sub-embodiments are supported, and one of the supported sub-embodiments is indicated/configured to the UE via either higher layer (e.g., RRC) or/and more dynamic MAC CE or/and DCI based signaling.

In embodiment V.1, a UE is configured/indicated with a generalized joint TCI, denoted as J-TCI, state indicating beam indications for two entities (E1, E2), wherein each J-TCI includes/comprises up to three components (A0, A1, A2). In such embodiment, "A0" includes/comprises common components for beam indications for two entities, "A1" includes/comprises specific components for entity E1, and "A2" includes/comprises specific components for entity E2.

Hence, up to two components (A0, A1) is used to indicate/configure TCI state (beam), TCI1, for entity E1 and up to two components (A0, A2) is used to indicate/configure TCI state (beam), TCI2, for entity E2, i.e., TCI1=(A0, A1) and TCI2=(A0, A2). In addition, any of components A0, A1, and A2 can be empty (i.e., does not exist, hence not included in Gen-J-TCI).

At least one of the following sub-embodiments can be used (to indicate/configure J-TCI) by the gNB or network (NW).

In one sub-embodiment V.1A, the component A0 is empty (i.e., does not exist or not included in J-TCI), and J-TCI comprises two components (A1, A2). Hence, two beam indications are separate via TCI1=A1 and TCI2=A2, since there is no common component (A0) indicated/configured to the UE.

In one sub-embodiment V.1B, the component A1 and A2 are empty (i.e., do not exist or not included in J-TCI), and J-TCI comprises only one component A0. Hence, two beam indications are joint via TCI1=TCI2=J-TCI=A0.

In one sub-embodiment V.1C, the component A1 is empty (i.e., does not exist or not included in J-TCI), and J-TCI comprises two components (A0, A2). Hence, one beam indication is via TCI1=A0, and another beam indication is via TCI2=J-TCI=(A0, A2).

In one sub-embodiment V.1D, the component A2 is empty (i.e., does not exist or not included in J-TCI), and J-TCI comprises two components (A0, A1). Hence, one beam indication is via TCI1=J-TCI=(A0, A1), and another beam indication is via TCI2=A0.

In one sub-embodiment V.1E, none of components A0, A1, and A2 is empty.

At least one of the following examples can be used.

In one example V.1.1, two entities (E1, E2)=(all DL channels, all UL channels).

In one example V.1.2, two entities (E1, E2)=(PDCCH, PDSCH).

In one example V.1.3, two entities (E1, E2)=(PUCCH, PUSCH).

In one example V.1.4, two entities (E1, E2)=(PDCCH and PUCCH, PDSCH and PUSCH).

In one example V.1.5, two entities (E1, E2)=(one of more DL channel(s), one of more UL channel(s)), where one of more DL channel(s) correspond to PDCCH or/and PDSCH, and one of more UL channel(s) correspond to PUCCH or/and PUSCH or/and PRACH.

In one example V.1.6, two entities (E1, E2)=(DL RS, UL RS).

In one example V.1.7, two entities (E1, E2)=(DL RS(s) or/and DL channel(s), UL RS(s) or/and UL channel(s)).

In one example V.1.8, two entities (E1, E2)=(TRP1, TRP2), where TRP1 and TRP2 are two transmit-receive points (TRPs) the UE receives DL reception (PDCCH or/and PDSCH) from or/and transmits UL transmission (PUCCH or/and PUSCH or/and PRACH) to. Optionally, the two beam indications can also be configured for the reception of DL RS(s) or/and the transmission of UL RS(s), where DL RS(s) is transmitted and UL RS(s) is received by one or both TRPs.

In one example V.1.9, two entities (E1, E2)=(CC1, CC2), where CC1 and CC2 are two component carrier (CCs) the UE receives DL reception (PDCCH or/and PDSCH) from or/and transmits UL transmission (PUCCH or/and PUSCH or/and PRACH) to. Optionally, the two beam indications can also be configured for the reception of DL RS(s) or/and the transmission of UL RS(s), where DL RS(s) and UL RS(s) are associated with one or both TRPs.

In one example V.1.10, two entities (E1, E2)=(panel1, panel2), where panel1 and panel2 are two antenna panels (at gNB) the UE receives DL reception (PDCCH or/and PDSCH) from or/and transmits UL transmission (PUCCH or/and PUSCH or/and PRACH) to. Optionally, the two beam indications can also be configured for the reception of DL RS(s) or/and the transmission of UL RS(s), where DL RS(s) is transmitted and UL RS(s) is received by one or both panels.

In one example V.1.11, two entities (E1, E2)=(panel1, panel2), where panel1 and panel2 are two antenna panels (at UE) the UE uses to receive DL reception (PDCCH or/and PDSCH) or/and transmit UL transmission (PUCCH or/and PUSCH or/and PRACH). Optionally, the two beam indications can also be configured for the reception of DL RS(s) or/and the transmission of UL RS(s), where DL RS(s) is received and UL RS(s) is transmitted by one or both panels.

In one embodiment V.1.1, a UE is configured/indicated with a generalized joint TCI, denoted as J-TCI, state indicating beam indications for two entities (E1, E2), wherein each J-TCI includes/comprises up to nine components ((A0, A1, A2), (B0, B1, B2), (C0, C1, C2)): (1) "A0" includes/comprises entity-common and UL/DL-common components for beam indications; (2) "A1" includes/comprises E1 entity-specific and UL/DL-common components for beam indications; (3) "A2" includes/comprises E2 entity-specific and UL/DL-common components for beam indications; (4) "B0" includes/comprises entity-common and DL-specific components for beam indications; (5) "B1" includes/comprises E1 entity-specific and DL-specific components for beam indications; (6) "B2" includes/comprises E2 entity-specific and DL-specific components for beam indications; (7) "C0" includes/comprises entity-common and UL-specific components for beam indications; (8) "C1" includes/comprises E1 entity-specific and UL-specific components for beam indications; and/or (9) "C2" includes/comprises E2 entity-specific and UL-specific components for beam indications.

Hence, up to four components (A0, A1, B0, B1) are used to indicate/configure DL-TCI state (beam), DL-TCI1, for entity E1 and up to four components (A0, A1, C0, C1) are used to indicate/configure UL-TCI state (beam), UL-TCI1, for entity E1 and up to four components (A0, A2, B0, B2) are used to indicate/configure DL-TCI state (beam), DL-TCI2, for entity E2, and up to four components (A0, A2, C0, C2) are used to indicate/configure UL-TCI state (beam), UL-TCI2, for entity E2, i.e., DL-TCI1=(A0, A1, B0, B1), UL-TCI1=(A0, A1, C0, C1), DL-TCI2=(A0, A2, B0, B2) and UL-TCI2=(A0, A2, C0, C2). In addition, any of components A0, A1, A2, B0, B1, B2, C0, C1 and C2 can be empty (i.e., does not exist, hence not included in Gen-J-TCI).

In one embodiment V.2, a UE is configured/indicated with a generalized joint TCI, denoted as J-TCI, state indicating beam indications for N>1 entities ($E_1, E_2, \ldots E_N$). In such embodiment, each J-TCI includes/comprises up to N+1 components ($A_0, A_1, A_2, \ldots, A_N$) and (1) "$A_0$" includes/ comprises common components for beam indications for two entities, and (2) "$A_n$" includes/comprises specific components for entity $E_n$, for n=1, 2, . . . , N.

Hence, up to two components ($A_0$, $A_n$) is used to indicate/configure TCI state (beam), $TCI_n$, for entity $E_n$, i.e., $TCI_n$=($A_0$, $A_n$). In addition, any of components $A_0$, $A_1$, . . . $A_N$ can be empty (i.e., does not exist, hence not included in Gen-J-TCI).

At least one of the following sub-embodiments can be used (to indicate/configure J-TCI) by the gNB or NW.

In one sub-embodiment V.2A, the component $A_0$ is empty (i.e., does not exist or not included in J-TCI), and J-TCI comprises two components ($A_1$, $A_2$, . . . , $A_N$). Hence, N beam indications are separate via $TCI_n=A_n$, for n=1, 2, . . . , N, since there is no common component ($A_0$) indicated/configured to the UE.

In one sub-embodiment V.2B, the components $A_1$, $A_2$, . . . , $A_N$ are empty (i.e., do not exist or not included in J-TCI), and J-TCI comprises only one component $A_0$. Hence, N beam indications are joint via $TCI_n$=J-TCI=$A_0$.

In one sub-embodiment V.2C, a subset of components $A_1$, $A_2$, . . . , $A_N$ is empty (i.e., does not exist or not included in J-TCI), and J-TCI comprises K+1 components ($A_0$, $A_{i_1}$, . . . $A_{i_K}$) where K<N is number of components that are not empty, and let $i_1, i_2, \ldots i_K \in \{1,2,\ldots, N\}$ are their indices. Hence, for components that are empty, the beam indication is via $TCI_n=A_0$, where $n \neq \{i_1, i_2, \ldots i_K\}$ and for components that are not empty, the beam indication is via $TCI_n$=J–TCI=($A_0$, $A_n$), where $n \in \{i_1, i_2, \ldots i_K\}$.

In sub-embodiment 1.2E, none of components $A_1$, $A_2$, . . . , $A_N$ is empty.

At least one of the following examples can be used.

In one example V.2.1, entities ($E_1, E_2, \ldots E_N$)=(channel 1, channel 2, . . . channel N), where channel 1, . . . channel N belongs to a set of all DL and UL channels {PDCCH, PDSCH, PUCCH, PUSCH, PRACH}.

In one example V.2.2, entities ($E_1, E_2, \ldots E_N$)=(channel 1, channel 2, . . . channel N), where channel 1, . . . channel N belongs to a set of all DL channels {PDCCH, PDSCH}.

In one example V.2.3, entities ($E_1, E_2, \ldots E_N$)=(channel 1, channel 2, . . . channel N), where channel 1, . . . channel N belongs to a set of all UL channels {PUCCH, PUSCH, PRACH}.

In one example V.2.4, entities ($E_1, E_2, \ldots E_N$)=(channel 1, channel 2, . . . channel N), where channel 1, . . . channel N belongs to a set of all DL and UL control channels {PDCCH, PUCCH}.

In one example V.2.5, entities ($E_1, E_2, \ldots E_N$)=(channel 1, channel 2, . . . channel N), where channel 1, . . . channel N belongs to a set of all DL and UL data/RACH channels {PDSCH, PUSCH, PRACH}.

In one example V.2.6, entities ($E_1, E_2, \ldots E_N$)=(RS 1, RS 2, . . . RS N), where RS 1, . . . RS N belongs to a set of all DL and UL RSs {CSI-RS, SSB, SRS, DL DMRS, UL DMRS}.

In one example V.2.7, entities ($E_1, E_2, \ldots E_N$)=(channel 1 or/and RS 1, channel 2 or/and RS 2, . . . channel N or/and RS N)), where channel 1, . . . channel N belongs to a set of all DL and UL channels {PDCCH, PDSCH, PUCCH, PUSCH, PRACH}, and RS 1, . . . RS N belongs to a set of all DL and UL RSs {CSI-RS, SSB, SRS, DL DMRS, UL DMRS}.

In one example V.2.8, entities ($E_1, E_2, \ldots E_N$)=(TRP1, TRP2, . . . $TRP_N$), where TRP1 . . . $TRP_N$ are N transmit-receive points (TRPs) the UE receives DL reception (PDCCH or/and PDSCH) from or/and transmits UL transmission (PUCCH or/and PUSCH or/and PRACH) to. Optionally, the N beam indications can also be configured for the reception of DL RS(s) or/and the transmission of UL RS(s), where DL RS(s) is transmitted and UL RS(s) is received by one or multiple of N TRPs.

In one example V.2.9, entities ($E_1, E_2, \ldots E_N$)=(CC1, CC2, . . . $CC_N$), where CC1 . . . $CC_N$ are N component carrier (CCs) the UE receives DL reception (PDCCH or/and PDSCH) from or/and transmits UL transmission (PUCCH or/and PUSCH or/and PRACH) to. Optionally, the N beam indications can also be configured for the reception of DL RS(s) or/and the transmission of UL RS(s), where DL RS(s) and UL RS(s) are associated with one or multiple of N TRPs.

In one example V.2.10, entities ($E_1, E_2, \ldots E_N$)=(panel1, panel2, . . . , $panel_N$), where panel1 . . . $panel_N$ are N antenna panels (at gNB) the UE receives DL reception (PDCCH or/and PDSCH) from or/and transmits UL transmission (PUCCH or/and PUSCH or/and PRACH) to. Optionally, the N beam indications can also be configured for the reception of DL RS(s) or/and the transmission of UL RS(s), where DL RS(s) is transmitted and UL RS(s) is received by one or multiple of N panels.

In one example V.2.11, entities ($E_1, E_2, \ldots E_N$)=(panel1, panel2, . . . , $panel_N$), where panel1 . . . $panel_N$ are N antenna panels (at UE) the UE uses to receive DL reception (PDCCH or/and PDSCH) or/and transmit UL transmission (PUCCH or/and PUSCH or/and PRACH). Optionally, the N beam indications can also be configured for the reception of DL RS(s) or/and the transmission of UL RS(s), where DL RS(s) is received and UL RS(s) is transmitted by one or multiple of N panels.

In one embodiment V.2.1, a UE is configured/indicated with a generalized joint TCI, denoted as J-TCI, state indicating beam indications for N>1 entities ($E_1, E_2, \ldots E_N$). In such embodiment, each J-TCI includes/comprises up to 3(N+1) components (($A_0, A_1, A_2, \ldots, A_N$), ($B_0, B_1, B_2, \ldots, B_N$), ($C_0, C_1, C_2, \ldots, C_N$): (1) "A0" includes/comprises entity-common and UL/DL-common components for beam indications; (2) "An" includes/comprises En entity-specific and UL/DL-common components for beam indications; (3) "B0" includes/comprises entity-common and DL-specific components for beam indications; (4) "Bn" includes/comprises En entity-specific and DL-specific components for beam indications; (5) "C0" includes/comprises entity-common and UL-specific components for beam indications; and/or (6) "Cn" includes/comprises En entity-specific and UL-specific components for beam indications.

Hence, up to four components ($A_0, A_n, B_0, B_n$) are used to indicate/configure DL-TCI state (beam), $DLTCI_n$, for entity En and up to four components ($A_0, A_n, C_0, C_n$) are used to indicate/configure UL-TCI state (beam), $ULTCI_n$, for entity En, i.e., $DLTCI_n$=($A_0, A_n, B_0, B_n$) and $ULTCI_n$=($A_0, A_n, C_0, C_n$). In addition, any of components $A_0$, $A_1, \ldots A_N, B_0, B_1, \ldots B_N, C_0, C_1, \ldots C_N$ can be empty (i.e., does not exist, hence not included in Gen-J-TCI).

In the present disclosure, J-TCI=(A, B, C) (cf. embodiment V) is assumed only for illustration. It is straightforward for a skilled-in-the-art to apply the following embodiments for other types of joint TCIs including the generalized joint TCI in embodiments V.1 and V.2.

In one embodiment (component 6), a joint TCI based on DL or/and UL RS is provided.

In one embodiment VI, the component A comprises a reference RS, the component B comprises a target DL RS, and the component C comprises a target UL RS.

In one sub-embodiment VI-A, the reference RS is a DL RS. In one example, the reference DL RS is a NZP CSI-RS. In one example, the reference DL RS is an SSB/PBCH. In one example, the reference DL RS is a DL DMRS. In one example, the reference DL RS is a combination of NZP CSI-RS and SSB/PBCH. In one example, the reference DL RS is other combinations such as (NZP CSI-RS, DL DMRS) or (DL DMRS, SSB/PBCH) or (NZP CSI-RS, SSB/PBCH, DL DMRS).

The UE can be configured with a single set of K RSs for all of the reference DL RS, target DL RS, and target UL RS. Alternatively, the UE can be configured with a first set of $K_1$ RSs for the reference DL RS and target DL RS, and a second set of $K_2$ RSs for the target UL RS. Alternatively, the UE can be configured with a first set of $K_1$ RSs for the reference DL RS, a second set of $K_2$ RSs for the target DL RS, and a third set of $K_3$ RSs for the target UL RS. This configuration can be via higher-layer (such as RRC) signaling.

In one sub-embodiment VI-B, the reference RS is an UL RS. In one example, the reference UL RS is an SRS. In one example, the reference UL RS is a UL DMRS. In one example, the reference UL RS is a combination of SRS and UL DMRS.

The UE can be configured with a single set of K RSs for all of the reference UL RS, target DL RS, and target UL RS. The UE can be configured with a first set of $K_1$ RSs for the target DL RS, and a second set of $K_2$ RSs for the reference UL RS and the target UL RS. The UE can be configured with a first set of $K_1$ RSs for the reference UL RS, a second set of $K_2$ RSs for the target DL RS, and a third set of $K_3$ RSs for the target UL RS. This configuration can be via higher-layer (such as RRC) signaling.

In one sub-embodiment VI-C, the reference RS is a DL RS or an UL RS. In one example, the reference DL RS is a NZP CSI-RS. In one example, the reference DL RS is an SSB/PBCH. In one example, the reference DL RS is a DL DMRS. In one example, the reference UL RS is an SRS. In one example, the reference UL RS is a UL DMRS. In one example, the reference DL RS is a combination of (NZP CSI-RS and SSB/PBCH). In one example, the reference DL RS is other combinations such as (NZP CSI-RS, DL DMRS) or (DL DMRS, SSB/PBCH) or (NZP CSI-RS, SSB/PBCH, DL DMRS). In one example, the reference UL RS is a combination of (SRS and UL DMRS). In one example, the reference RS is other combinations such as (NZP CSI-RS, SRS), or (SSB/PBCH, SRS), or (DL DMRS, SRS), or (NZP CSI-RS, UL DMRS), or (SSB/PBCH, UL DMRS), or (DL DMRS, UL DMRS) or (NZP CSI-RS, SSB/PBCH, SRS) or (NZP CSI-RS, DL DMRS, SRS) or (DL DMRS, SSB/PBCH, SRS) or (NZP CSI-RS, SSB/PBCH, UL DMRS) (NZP CSI-RS, DL DMRS, UL DMRS) or (DL DMRS, SSB/PBCH, UL DMRS) or (NZP CSI-RS, SSB/PBCH, DL DMRS, SRS, UL DMRS) or any other combination not listed.

The UE can be configured with a single set of K RSs for all of the reference DL/UL RS, target DL RS, and target UL RS. The UE can be configured with a first set of $K_1$ RSs for the reference DL RS and for the target DL RS, and a second set of $K_2$ RSs for the reference UL RS and the target UL RS. The UE can be configured with a first set of $K_1$ RSs for the reference DL RS, a second set of $K_2$ RSs for the reference UL RS, a third set of $K_3$ RSs for the target DL RS, and a fourth set of $K_4$ RSs for the target UL RS. This configuration can be via higher-layer (such as RRC) signaling.

The target DL RS (comprising the component B) is according to at least one of the following examples. In one example, the target DL RS is DL DMRS. In one example, the target DL RS is NZP CSI-RS. In one example, the target DL RS is an SSB/PBCH. In one example, the target DL RS is a combination of NZP CSI-RS and SSB/PBCH. In one example, the target DL RS is other combinations such as (NZP CSI-RS, DL DMRS) or (DL DMRS, SSB/PBCH) or (NZP CSI-RS, SSB/PBCH, DL DMRS).

The target UL RS (comprising the component C) is according to at least one of the following examples. In one example, the target UL RS is SRS. In one example, the target UL RS is UL DMRS. In one example, the target UL RS is a combination of SRS and UL DMRS.

An example of J-TCI states according to sub-embodiment VI-A is shown in TABLE 2. An example of J-TCI states according to sub-embodiment VI-B is shown in TABLE 3. The tables show the types of the DL or/and UL RSs along with their indices (shown in parentheses) according to the configured set(s) of RSs. In TABLE 2 and TABLE 3, x0 and x1 are indices of NZP CSI-RS resources in the higher-layer (RRC) configured set(s) of RSs. Likewise, v0 and v1 are indices of SSB/PBCH resources, y1 is an index of DL DMRS, z1 is an index of UL DMRS, and u0 and u1 are indices of SRS resources.

TABLE 2

Example of J-TCI

| J-TCI state | A: Reference DL RS (index) | B: Target DL RS (index) | C: Target UL RS (index) | QCL |
|---|---|---|---|---|
| 0 | NZP CSI-RS (x0) | DL DMRS (y1) | UL DMRS (z1) | Type D |
| 1 | NZP CSI-RS (x0) | DL DMRS (y1) | SRS (u1) | Type D |
| 2 | NZP CSI-RS (x0) | SSB/PBCH (v1) | UL DMRS (z1) | Type D |
| 3 | NZP CSI-RS (x0) | SSB/PBCH (v1) | SRS (u1) | Type D |
| 4 | NZP CSI-RS (x0) | NZP CSI-RS (x1) | UL DMRS (z1) | Type D |
| 5 | NZP CSI-RS (x0) | NZP CSI-RS (x1) | SRS (u1) | Type D |
| 6 | NZP CSI-RS (x0) | empty | UL DMRS (z1) | Type D |
| 7 | NZP CSI-RS (x0) | empty | SRS (u1) | Type D |
| 7 | SSB/PBCH (v0) | DL DMRS (y1) | UL DMRS (z1) | Type D |
| 8 | SSB/PBCH (v0) | DL DMRS (y1) | SRS (u1) | Type D |
| 9 | SSB/PBCH (v0) | NZP CSI-RS (x1) | UL DMRS (z1) | Type D |
| 10 | SSB/PBCH (v0) | NZP CSI-RS (x1) | SRS (u1) | Type D |

TABLE 3

Example of J-TCI

| J-TCI state | A: Reference UL RS (index) | B: Target DL RS (index) | C: Target UL RS (index) | QCL |
|---|---|---|---|---|
| 0 | SRS (u0) | DL DMRS (y1) | UL DMRS (z1) | Type D |
| 1 | SRS (u0) | DL DMRS (y1) | SRS (u1) | Type D |
| 2 | SRS (u0) | DL DMRS (y1) | empty | Type D |
| 3 | SRS (u0) | SSB/PBCH (v1) | UL DMRS (z1) | Type D |
| 4 | SRS (u0) | SSB/PBCH (v1) | SRS (u1) | Type D |
| 5 | SRS (u0) | SSB/PBCH (v1) | empty | Type D |

In one embodiment VI.1, the component A comprises a reference RS, the component B is empty, and the component C is empty. In one example, the reference RS is a DL RS (similar to embodiment VI-A). An example of J-TCI states is shown in TABLE 4. In one example, the reference RS is a UL RS (similar to embodiment VI-B). An example of J-TCI states according to sub-embodiment 2B is shown in TABLE 5.

TABLE 4

Example of J-TCI

| J-TCI state | A: Reference DL RS (index) | B | C | QCL |
|---|---|---|---|---|
| 0 | NZP CSI-RS ($x_0$) | empty | empty | Type D |
| 1 | NZP CSI-RS ($x_1$) | empty | empty | Type D |
| ... | NZP CSI-RS (...) | empty | empty | Type D |

TABLE 4-continued

Example of J-TCI

| J-TCI state | A: Reference DL RS (index) | B | C | QCL |
|---|---|---|---|---|
| $p_1$ | NZP CSI-RS ($x_{p1}$) | empty | empty | Type D |
| $p_1 + 1$ | SSB/PBCH ($v_0$) | empty | empty | Type D |
| $p_1 + 2$ | SSB/PBCH ($v_1$) | empty | empty | Type D |
| ... | SSB/PBCH (...) | empty | empty | Type D |
| $p_1 + p_2 - 1$ | SSB/PBCH ($v_{p2}$) | empty | empty | Type D |

TABLE 5

Example of J-TCI

| J-TCI state | A: Reference UL RS (index) | B | C | QCL |
|---|---|---|---|---|
| 0 | SRS ($u_0$) | empty | empty | Type D |
| 1 | SRS ($u_1$) | empty | empty | Type D |
| ... | SRS (...) | empty | empty | Type D |
| $p_3$ | SRS ($u_{p3}$) | empty | empty | Type D |

In one embodiment VI.2, the component A comprises a reference RS, the component B comprises a target DL channel, and the component C comprises a target UL channel. In one example, the reference RS is a DL RS (similar to embodiment VI-A). In one example, the reference RS is a UL RS (similar to embodiment VI-B).

In one example, the target DL channel is PDCCH. In one example, the target DL channel is PDSCH. In one example the target DL channel includes PDCCH and PDSCH. In one example, the target UL channel is PUCCH. In one example, the target UL channel is PUSCH. In one example, the target UL channel includes PUCCH and PUSCH. In one example, the target UL channel is PRACH. In one example, the target UL channel includes PUCCH and PRACH. In one example, the target UL channel includes PUCCH, PDSCH, and PRACH.

In embodiment VI.3, the component A comprises a reference RS, the component B comprises a target DL channel or/and DL RS, and the component C comprises a target UL channel or/and UL RS. In one example, the reference RS is a DL RS (similar to embodiment VI-A). In one example, the reference RS is a UL RS (similar to embodiment VI-B). The target DL channel and target UL channel are according to at least one example in embodiment VI.2. The target DL RS and target UL RS are according to at least one example in embodiment VI and VI.1.

In one embodiment VI2.4, the component A is replaced with a pair of components (A, A'), the component A comprises a reference RS for a target DL RS, the component A' comprises a reference RS for a target UL RS, the component B comprises a target DL RS, and the component C comprises a target UL RS. In one example, the two reference RSs in components A and A' are different. In one example, whether the two reference RSs are the same or different is configured, e.g., via RRC or/and MAC CE or/and DCI.

In one sub-embodiment VI.4A, the reference RS for either component A or component A' is a DL RS. In one example, the reference DL RS is a NZP CSI-RS. In one example, the reference DL RS is an SSB/PBCH. In one example, the reference DL RS is a DL DMRS. In one example, the reference DL RS is a combination of NZP CSI-RS and SSB/PBCH. In one example, the reference DL RS is other combinations such as (NZP CSI-RS, DL DMRS) or (DL DMRS, SSB/PBCH) or (NZP CSI-RS, SSB/PBCH, DL DMRS).

The UE can be configured with a single set of K RSs for all of the reference DL RS of component A and component A', target DL RS, and target UL RS. Alternatively, the UE can be configured with a first set of $K_1$ RSs for the reference DL RS of component A and component A' and target DL RS, and a second set of $K_2$ RSs for the target UL RS. Alternatively, the UE can be configured with a first set of $K_1$ RSs of component A and component A' for the reference DL RS, a second set of $K_2$ RSs for the target DL RS, and a third set of $K_3$ RSs for the target UL RS. Alternatively, the UE can be configured with a first set of $K_1$ RSs for the reference DL RS of component A, a second set of $K_2$ RSs for the reference DL RS of component A', a third set of $K_3$ RSs for the target DL RS, and a fourth set of $K_4$ RSs for the target UL RS. This configuration can be via higher-layer (such as RRC) signaling. In one further example, the configuration can be updated RRC signaling and/or MAC CE signaling and/or L1 control signaling.

In one sub-embodiment VI.4B, the reference RS for either component A or A' is an UL RS. In one example, the reference UL RS is an SRS. In one example, the reference UL RS is a UL DMRS. In one example, the reference UL RS is a combination of SRS and UL DMRS. In one example, the two reference RSs in components A and A' are different. In one example, whether the two reference RSs are the same or different is configured, e.g., via RRC or/and MAC CE or/and DCI.

The UE can be configured with a single set of K RSs for all of the reference UL RS of component A and component A', target DL RS, and target UL RS. Alternatively, the UE can be configured with a first set of $K_1$ RSs for the target DL RS, and a second set of $K_2$ RSs for the reference UL RS of component A and component A' and the target UL RS. Alternatively, the UE can be configured with a first set of $K_1$ RSs for the reference UL RS of component A and component A', a second set of $K_2$ RSs for the target DL RS, and a third set of $K_3$ RSs for the target UL RS. Alternatively, the UE can be configured with a first set of $K_1$ RSs for the reference UL RS of component A, a second set of $K_2$ RSs for the reference UL RS of component A', a third set of $K_3$ RSs for the target DL RS, and a fourth set of $K_4$ RSs for the target UL RS. This configuration can be via higher-layer (such as RRC) signaling. In one further example, the configuration can be updated by RRC signaling and/or MAC CE signaling and/or L1 control signaling.

In one sub-embodiment VI.4C, the reference RS for either of component A and A' is a DL RS or an UL RS. In one example, the reference DL RS is a NZP CSI-RS. In one example, the reference DL RS is an SSB/PBCH. In one example, the reference DL RS is a DL DMRS. In one example, the reference UL RS is an SRS. In one example, the reference UL RS is a UL DMRS. In one example, the reference DL RS is a combination of (NZP CSI-RS and SSB/PBCH). In one example, the reference DL RS is other combinations such as (NZP CSI-RS, DL DMRS) or (DL DMRS, SSB/PBCH) or (NZP CSI-RS, SSB/PBCH, DL DMRS). In one example, the reference UL RS is a combination of (SRS and UL DMRS). In one example, the reference RS is other combinations such as (NZP CSI-RS, SRS), or (SSB/PBCH, SRS), or (DL DMRS, SRS), or (NZP CSI-RS, UL DMRS), or (SSB/PBCH, UL DMRS), or (DL DMRS, UL DMRS) or (NZP CSI-RS, SSB/PBCH, SRS) or (NZP CSI-RS, DL DMRS, SRS) or (DL DMRS, SSB/PBCH, SRS) or (NZP CSI-RS, SSB/PBCH, UL DMRS) (NZP CSI-RS, DL DMRS, UL DMRS) or (DL DMRS, SSB/PBCH, UL DMRS) or (NZP CSI-RS, SSB/PBCH, DL DMRS, SRS, UL DMRS) or any other combination not listed.

In one sub-embodiment VI.4D, the reference RS for component A is a DL RS and the reference RS for component A' is an UL RS.

In one sub-embodiment VI.4E, the reference RS for component A is an UL RS and the reference RS for component A' is an DL RS.

The UE can be configured with a single set of K RSs for all of the reference DL/UL RS, target DL RS, and target UL RS. The UE can be configured with a first set of $K_1$ RSs for the reference DL RS and for the target DL RS, and a second set of $K_2$ RSs for the reference UL RS and the target UL RS. The UE can be configured with a first set of $K_1$ RSs for the reference DL RS, a second set of $K_2$ RSs for the reference UL RS, a third set of $K_3$ RSs for the target DL RS, and a fourth set of $K_4$ RSs for the target UL RS. Alternatively, the UE can be configured with a first set of $K_1$ RSs for the reference DL RS and the reference UL RS, and a second set of $K_2$ RSs for the target DL RS and the target UL RS. Alternatively, the UE can be configured with a first set of $K_1$ RSs for the reference DL RS and the reference UL RS, and a second set of $K_2$ RSs for the target DL RS, and a third set of $K_3$ RSs the target UL RS. This configuration can be via higher-layer (such as RRC) signaling. In one further example, the configuration can be updated by RRC signaling and/or MAC CE signaling and/or L1 control signaling.

The target DL RS (comprising the component B) is according to at least one of the following examples. In one example, the target DL RS is DL DMRS. In one example, the target DL RS is NZP CSI-RS. In one example, the target DL RS is an SSB/PBCH. In one example, the target DL RS is a combination of NZP CSI-RS and SSB/PBCH. In one example, the target DL RS is other combinations such as (NZP CSI-RS, DL DMRS) or (DL DMRS, SSB/PBCH) or (NZP CSI-RS, SSB/PBCH, DL DMRS). In one example there is no target DL RS. In one example component B is absent. In one example component B is present with no target DL RS.

The target UL RS (comprising the component C) is according to at least one of the following examples. In one example, the target UL RS is SRS. In one example, the target UL RS is UL DMRS. In one example, the target UL RS is a combination of SRS and UL DMRS. In one example there is no target UL RS. In one example component C is absent. In one example component C is present with no target UL RS.

An example of J-TCI states according to sub-embodiment VI.4A is shown in TABLE 6. An example of J-TCI states according to sub-embodiment VI.4B is shown in TABLE 7. An example of J-TCI states according to sub-embodiment VI.4D is shown in TABLE 8. An example of J-TCI states according to sub-embodiment VI.4E is shown in TABLE 9. An example of J-TCI states according to sub-embodiment VI.4C is shown in TABLE 10. The tables show the types of the DL or/and UL RSs along with their indices (shown in parentheses) according to the configured set(s) of RSs. In TABLE 2 and TABLE 3, x0, x1 and x2 are indices of NZP CSI-RS resources in the higher-layer (RRC) configured set(s) of RSs. Likewise, v0 and v1 are indices of SSB/PBCH resources, y1 is an index of DL DMRS, z1 is an index of UL DMRS, and u0, u1 and u2 are indices of SRS resources.

TABLE 6

Example of J-TCI

| J-TCI state | A: Reference DL RS (index) For target DL RS | A': Reference DL RS (index) for target UL RS | B: Target DL RS (index) | C: Target UL RS (index) | QCL |
|---|---|---|---|---|---|
| 0 | NZP CSI-RS (x0) | NZP CSI-RS (x2) | DL DMRS (y1) | UL DMRS (z1) | Type D |
| 1 | NZP CSI-RS (x0) | NZP CSI-RS (x2) | DL DMRS (y1) | SRS (u1) | Type D |
| 2 | NZP CSI-RS (x0) | NZP CSI-RS (x2) | SSB/PBCH (v1) | UL DMRS (z1) | Type D |
| 3 | NZP CSI-RS (x0) | NZP CSI-RS (x2) | SSB/PBCH (v1) | SRS (u1) | Type D |
| 4 | NZP CSI-RS (x0) | NZP CSI-RS (x2) | NZP CSI-RS (x1) | UL DMRS (z1) | Type D |
| 5 | NZP CSI-RS (x0) | NZP CSI-RS (x2) | NZP CSI-RS (x1) | SRS (u1) | Type D |
| 6 | NZP CSI-RS (x0) | NZP CSI-RS (x2) | empty | UL DMRS (z1) | Type D |
| 7 | NZP CSI-RS (x0) | NZP CSI-RS (x2) | empty | SRS (u1) | Type D |
| 7 | SSB/PBCH (v0) | SSB/PBCH (v1) | DL DMRS (y1) | UL DMRS (z1) | Type D |
| 8 | SSB/PBCH (v0) | SSB/PBCH (v1) | DL DMRS (y1) | SRS (u1) | Type D |
| 9 | SSB/PBCH (v0) | SSB/PBCH (v1) | NZP CSI-RS (x1) | UL DMRS (z1) | Type D |
| 10 | SSB/PBCH (v0) | SSB/PBCH (v1) | NZP CSI-RS (x1) | SRS (u1) | Type D |

TABLE 7

Example of J-TCI

| J-TCI state | A: Reference UL RS (index) For target DL RS | A': Reference UL RS (index) For target UL RS | B: Target DL RS (index) | C: Target UL RS (index) | QCL |
|---|---|---|---|---|---|
| 0 | SRS (u0) | SRS (u2) | DL DMRS (y1) | UL DMRS (z1) | Type D |
| 1 | SRS (u0) | SRS (u2) | DL DMRS (y1) | SRS (u1) | Type D |
| 2 | SRS (u0) | SRS (u2) | DL DMRS (y1) | empty | Type D |
| 3 | SRS (u0) | SRS (u2) | SSB/PBCH (v1) | UL DMRS (z1) | Type D |
| 4 | SRS (u0) | SRS (u2) | SSB/PBCH (v1) | SRS (u1) | Type D |
| 5 | SRS (u0) | SRS (u2) | SSB/PBCH (v1) | empty | Type D |

TABLE 8

Example of J-TCI

| J-TCI state | A: Reference DL RS (index) For target DL RS | A': Reference UL RS (index) For target UL RS | B: Target DL RS (index) | C: Target UL RS (index) | QCL |
|---|---|---|---|---|---|
| 0 | NZP CSI-RS (x0) | SRS (u2) | DL DMRS (y1) | UL DMRS (z1) | Type D |

TABLE 9

Example of J-TCI

| J-TCI state | A: Reference UL RS (index) For target DL RS | A': Reference DL RS (index) For target UL RS | B: Target DL RS (index) | C: Target UL RS (index) | QCL |
|---|---|---|---|---|---|
| 0 | SRS (u0) | NZP CSI-RS (x0) | DL DMRS (y1) | UL DMRS (z1) | Type D |

TABLE 10

Example of J-TCI

| J-TCI state | A: Reference DL/UL RS (index) For target DL RS | A': Reference DL/UL RS (index) For target UL RS | B: Target DL RS (index) | C: Target UL RS (index) | QCL |
|---|---|---|---|---|---|
| 0 | NZP CSI-RS (x0) | NZP CSI-RS (x0) | DL DMRS (y1) | UL DMRS (z1) | Type D |
| 1 | NZP CSI-RS (x0) | SRS (u0) | DL DMRS (y1) | UL DMRS (z1) | Type D |
| 2 | SRS (u0) | NZP CSI-RS (x0) | DL DMRS (y1) | UL DMRS (z1) | Type D |
| 3 | SRS (u0) | SRS (u0) | DL DMRS (y1) | UL DMRS (z1) | Type D |

Further examples of J-TCI with DL Target RS empty and UL Target RS empty are shown in TABLEs 11 to 15

TABLE 11

Example of J-TCI

| J-TCI state | A: Reference DL RS (index) For target DL RS | A': Reference DL RS (index) for target UL RS | B: Target DL RS (index) | C: Target UL RS (index) | QCL |
|---|---|---|---|---|---|
| 0 | NZP CSI-RS (x0) | NZP CSI-RS (x2) | empty | empty | Type D |
| 1 | NZP CSI-RS (x1) | NZP CSI-RS (x2) | empty | empty | Type D |
| 2 | NZP CSI-RS (x0) | NZP CSI-RS (x3) | empty | empty | Type D |
| 3 | NZP CSI-RS (x1) | NZP CSI-RS (x3) | empty | empty | Type D |
| 4 | SSB/PBCH (v0) | SSB/PBCH (v1) | empty | empty | Type D |

TABLE 12

Example of J-TCI

| J-TCI state | A: Reference UL RS (index) For target DL RS | A': Reference UL RS (index) For target UL RS | B: Target DL RS (index) | C: Target UL RS (index) | QCL |
|---|---|---|---|---|---|
| 0 | SRS (u0) | SRS (u2) | empty | empty | Type D |
| 1 | SRS (u1) | SRS (u2) | empty | empty | Type D |
| 2 | SRS (u0) | SRS (u3) | empty | empty | Type D |
| 3 | SRS (u1) | SRS (u3) | empty | empty | Type D |

TABLE 13

Example of J-TCI

| J-TCI state | A: Reference DL RS (index) For target DL RS | A': Reference UL RS (index) For target UL RS | B: Target DL RS (index) | C: Target UL RS (index) | QCL |
|---|---|---|---|---|---|
| 0 | NZP CSI-RS (x0) | SRS (u2) | empty | empty | Type D |

TABLE 14

Example of J-TCI

| J-TCI state | A: Reference UL RS (index) For target DL RS | A': Reference DL RS (index) For target UL RS | B: Target DL RS (index) | C: Target UL RS (index) | QCL |
|---|---|---|---|---|---|
| 0 | SRS (u0) | NZP CSI-RS (x0) | empty | empty | Type D |

TABLE 15

Example of J-TCI

| J-TCI state | Reference DL/UL RS (index) For target DL RS | A': Reference DL/UL RS (index) For target UL RS | B: Target DL RS (index) | C: Target UL RS (index) | QCL |
|---|---|---|---|---|---|
| 0 | NZP CSI-RS (x0) | NZP CSI-RS (x0) | empty | empty | Type D |
| 1 | NZP CSI-RS (x0) | SRS (u0) | empty | empty | Type D |
| 2 | SRS (u0) | NZP CSI-RS (x0) | empty | empty | Type D |
| 3 | SRS (u0) | SRS (u0) | empty | empty | Type D |

In the general case, the component A comprises X1 reference RS(s) for a target DL RS or multiple target DL RSs, the component A' comprises X2 reference RS(s) for a target UL RS or multiple target UL RSs, the component B comprises a target DL RS or multiple target DL RSs, and the component C comprises a target UL RS or multiple target UL RSs. For example, X1>1 for a multi-TRP and/or multi-panel gNB. For example, X2>1 for a multi-panel UE.

When X1>1, there are multiple reference RSs for a target DL RS or channel (or multiple target DL RSs or channels), for example, (1) a first reference RS for PDCCH (or DL DMRS for PDCCH), a second reference RS for PDSCH (or DL DMRS of PDSCH), or (2) a first reference RS for PDCCH, a second reference RS for a first PDSCH, a third reference RS for a second PDSCH, . . . .

When X2>1, there are multiple reference RSs for target UL RS or channel (or multiple target UL RSs or channels), for example, (1) a first reference RS for PUCCH (or UL DMRS for PUCCH), a second reference RS for PUSCH (or UL DMRS for PUSCH), or (2) a first reference RS for PUCCH, a second reference RS for a first PUSCH, a third reference RS for a second PUSCH, . . . .

In one example, X1>1, and X2>1. In another example X1>1 and X2=1. In another example X1=1 and X2>1. In another example, X1=X2.

In one example, X1 and/or X2 can be fixed by system specifications or configured/updated by RRC signaling and/or MAC CE signaling and/or L1 control signaling.

In one example, component B consists of one or more target DL RS, N1 is the cardinality of component B, i.e., N1 is the number of target DL RS in component B, and X1=N1. Component C consist of one or more target UL RS, N2 is the cardinality of component C, i.e., N2 is the number of target UL RS in component C, and X2=N2.

In one example, component B consists of one or more target DL RS, N1 is the cardinality of component B, i.e., N1 is the number of target DL RS in component B, and 1≤X1≤N1, where X1 can be configured/updated by RRC signaling and/or MAC CE signaling and/or L1 control signaling. Component C consist of one or more target UL RS, N2 is the cardinality of component C, i.e., N2 is the number of target UL RS in component C, and 1≤X2≤N2, where X2 can be configured/updated by RRC signaling and/or MAC CE signaling and/or L1 control signaling.

In one example, component B consists of one or more target DL RS, N1 is the cardinality of component B, i.e., N1 is the number of target DL RS in component B, and 1<X1≤N1, where X1 can be configured/updated by RRC signaling and/or MAC CE signaling and/or L1 control signaling. Component C consist of one or more target UL RS, N2 is the cardinality of component C, i.e., N2 is the number of target UL RS in component C, and 1<X2≤N2, where X2 can be configured/updated by RRC signaling and/or MAC CE signaling and/or L1 control signaling.

In one example, component B is absent and X1=0. The target DL RS uses the TCI framework of release 15 and 16. X2 can be fixed by system specifications or configured/updated by RRC signaling and/or MAC CE signaling and/or L1 control signaling.

In one example, component B is absent and X1=0. The target DL RS uses the TCI framework of release 15 and 16. Component C consist of one or more target UL RS, N2 is the cardinality of component C, i.e., N2 is the number of target UL RS in component C, and X2=N2.

In one example, component B is absent and X1=0. The target DL RS uses the TCI framework of release 15 and 16. Component C consist of one or more target UL RS, N2 is the cardinality of component C, i.e., N2 is the number of target UL RS in component C, and 1≤X2≤N2, where X2 can be configured/updated by RRC signaling and/or MAC CE signaling and/or L1 control signaling.

In one example, component B is absent and X1=0. The target DL RS uses the TCI framework of release 15 and 16. Component C consist of one or more target UL RS, N2 is the cardinality of component C, i.e., N2 is the number of target UL RS in component C, and 1<X2≤N2, where X2 can be configured/updated by RRC signaling and/or MAC CE signaling and/or L1 control signaling.

The sub-embodiments of embodiment VI (i.e., embodiment VI.1, VI.2 and VI.3) can be extended to embodiment VI.4, wherein a TCI state includes multiple reference RSs.

In one embodiment (component 7), a TCI state signaling/indication is provided.

Let $k_1$, $k_2$, and $k_3$ be number of TCI states that are of type J-TCI, DL-TCI, and UL-TCI, respectively, where J-TCI=(A, B, C) where A is not empty and J-TCI is according to some of the embodiments (e.g., 5 or 6) of this disclosure, and DL-TCI and UL-TCI respectively correspond to separate beam indications for DL and UL (e.g., similar to TCI based DL beam indication in 3GPP standard specification Rel. 15 NR).

In one embodiment VII, a UE is configured with k>1 TCI states, where the set of k TCI states is according to at least one of the following alternatives (Alt): (1) Alt VII-1, all k TCI states are of the same type (either J-TCI, DL-TCI, or UL-TCI), i.e., (k=$k_1$, $k_2$=$k_3$=0) or (k=$k_2$, $k_1$=$k_3$=0) or (k=$k_3$, $k_1$=$k_2$=0); (2) Alt VII-2: $k_1$ TCI states are J-TCI and $k_2$=k−$k_1$ TCI states are DL-TCI, where $k_1$, $k_2$>0 and $k_3$=0; (3) Alt VII-3: $k_1$ TCI states are J-TCI and $k_3$=k−$k_1$ TCI states are UL-TCI, where $k_1$, $k_{3>0}$ and $k_{2=0}$; and (4) Alt VII-4: $k_1$ TCI states are J-TCI, $k_2$ TCI states are DL-TCI, and $k_3$=k−$k_1$−$k_2$ TCI states are UL-TCI, where $k_1$, $k_2$, $k_3$>0.

In one example, only one of the above alternatives (VII-1 through VII-4) is used/supported for TCI indication. In another example, multiple alternatives are supported, and one of the supported alternatives is indicated/configured to the UE via either higher layer (e.g., RRC) or more dynamic MAC CE or DCI based signaling.

An example of k TCI states and their types are shown in TABLE 16.

TABLE 16

Example of N TCI states

| TCI state | TCI type |
| --- | --- |
| 0 | J-TCI ($a_0$) |
| 1 | J-TCI ($a_1$) |
| .... | ... |
| $k_1$ − 1 | J-TCI ($a_{k_1-1}$) |
| $k_1$ | DL-TCI ($b_0$) |
| $k_1$ + 1 | DL-TCI ($b_1$) |
| .... | ... |
| $k_1$ + $k_2$ − 1 | DL-TCI ($b_{k_2-1}$) |
| $k_1$ + $k_2$ | UL-TCI ($c_0$) |
| $k_1$ + $k_2$ + 1 | UL-TCI ($c_1$) |
| ... | ... |
| $k_1$ + $k_2$ + $k_3$ − 1 = k − 1 | UL-TCI ($c_{k_3-1}$) |

The k TCI states can be configured via higher-layer (RRC/L3) signaling, or the k TCI states can be configured dynamically, via L2 control signaling (such as MAC control element or MAC CE), or L1 control signaling (via DCI, UL-related and/or DL-related), or a combination between L2 and L1 control signaling. When L1 control signaling is used, a different RNTI can be used to differentiate this signaling from DL assignment and UL grant. Optionally, UE-group DCI (instead of UE-specific DCI) can be used since this mapping can be common across several UEs.

In one sub-embodiment VII-A, with the set of k TCI states configured (according to embodiment VII), a TCI field can be used in a DL-related DCI to indicate the UL TX or/and DL RX beam selection to the UE. The number of hypotheses for the TCI field is k, therefore $\lceil \log_2 k \rceil$ bits can be used. In this case, TCI is a separate DCI field. Optionally, the k TCI hypotheses can be jointly signaled and/or encoded in another DCI field. In this sub-embodiment, DL-related DCI is used for TCI indication regardless of the TCI type (J-TCI, DL-TCI, or UL-TCI).

In one example (sub-embodiment VII-A.1), the TCI field in a DL related DCI can indicate $k_1$ J-TCI sates or $k_2$ DL-TCI states or $k_3$ UL-TCI states and hence can include $\lceil \log_2 k \rceil$ bits, k=$k_1$+$k_2$+$k_3$.

In another example, a TCI field in a DL-related can indicate $k_1$ J-TCI sates or $k_2$ DL-TCI states and hence can include $\lceil \log_2(k_1+k_2) \rceil$ bits.

In one sub-embodiment VII-B, with the set of k TCI states configured (according to embodiment VII), a TCI field can be used in a UL-related DCI to indicate the UL TX or/and DL RX beam selection to the UE. The number of hypotheses for the TCI field is k, therefore $\lceil \log_2 k \rceil$ bits can be used. In this case, TCI is a separate DCI field. Optionally, the k TCI hypotheses can be jointly signaled and/or encoded in another DCI field. In this sub-embodiment, UL-related DCI is used for TCI indication regardless of the TCI type (J-TCI, DL-TCI, or UL-TCI).

In one example (sub-embodiment VII-B.1), the TCI field in an UL related DCI can indicate $k_1$ J-TCI sates or $k_2$ DL-TCI states or $k_3$ UL-TCI states and hence can include $\lceil \log_2 k \rceil$ bits, $k=k_1+k_2+k_3$.

In another example, a TCI field in an UL-related can indicate $k_1$ J-TCI sates or $k_3$ UL-TCI states and hence can include $\lceil \log_2(k_1+k_3) \rceil$ bits.

In one sub-embodiment VII-C, with the set of k TCI states configured (according to embodiment VII), the TCI indication is as follows (depending on the TCI type).

In such sub-embodiment VII-C, when TCI Type is J-TCI, then at least one of the following alternatives is used: (1) in Alt VII-C-1, the TCI indication is via a TCI field in DL-related DCI; (2) in Alt VII-C-2, the TCI indication is via a TCI field in UL-related DCI; (3) in Alt VII-C-3, the TCI indication is via both DL-related DCI and UL-related DCI. For example, the components (A, B) are indicated via a TCI field in DL-related DCI, and the component C is indicated via a TCI field in UL-related DCI; and/or (4) in Alt VII-C-4, the TCI indication is via both DL-related DCI and UL-related DCI. For example, the component B is indicated via a TCI field in DL-related DCI, and the components (A, C) are indicated via a TCI field in UL-related DCI.

In such sub-embodiment, when TCI Type is DL-TCI, a TCI field can be used in a DL-related DCI to indicate the DL RX beam selection to the UE, and when TCI Type is UL-TCI, a TCI field can be used in a UL-related DCI to indicate the UL TX beam selection to the UE.

In one example, the DL-related DCI can either be a dedicated DCI for DL-TCI state indication or a DCI scheduling DL assignment (e.g., PDSCH). In one example, the UL-related DCI can either be a dedicated DCI for UL-TCI state indication or a DCI scheduling UL grant (e.g., PUSCH).

In one example, the total number of TCI states is Nt.

In one sub-example Nt is shared between uplink and downlink channels/signals. A TCI state can be applied to a downlink channel/signal, an uplink channel/signal, or jointly to uplink and downlink channels/signals.

In one sub-example Nt is sub-divided into Nd TCI states for downlink channels/signals, Nu TCI states for uplink channels/signals. Where, Nu and Nd are configured/updated by RRC configuration and/or MAC CE and/or L1 control signaling.

In one sub-example Nt is sub-divided into Nd TCI states for downlink channels/signals, Nu TCI states for uplink channels/signals. Where, Nu and Nd are configured/updated by RRC configuration and/or MAC CE and/or L1 control signaling. Where, Nd TCI states are the release 15/release 16 configured TCI states for downlink channels/signals.

In one sub-example Nt is sub-divided into Nd=Nd1+Nd2 TCI states for downlink channels/signals, Nu TCI states for uplink channels/signals. Where, Nu, Nd1 and Nd2 are configured/updated by RRC configuration and/or MAC CE and/or L1 control signaling. Where, Nd1 TCI states consists of Nd1 TCI states following the release 15/release 16 configured TCI states for downlink channels/signals, and Nd2 additional TCI states for downlink channels/signals.

In one sub-example Nt is sub-divided into Nd1 TCI states for downlink channels/signals, Nud TCI states for downlink and uplink channels/signals. Where, Nud and Nd1 are configured/updated by RRC configuration and/or MAC CE and/or L1 control signaling. Where, Nd1 TCI states consists of Nd1 TCI states following the release 15/release 16 configured TCI states for downlink channels/signals, and Nud additional TCI states for downlink and uplink channels/ signal. The Nud TCI states can be applied to a downlink channel/signal, an uplink channel/signal, or jointly to uplink and downlink channels/signals.

In one sub-example Nt is shared between uplink and downlink transmissions. Where, Nt TCI states are the release 15/release 16 configured TCI states, and can be applied to a downlink channel/signal, an uplink channel/signal, or jointly to uplink and downlink channels/signals.

In one sub-example Nt is sub-divided into Nud15 TCI states following the release 15/release 16 configured TCI states, and Nud17 additional TCI states. Where, Nud15 and Nud17 are configured/updated by RRC configuration and/or MAC CE and/or L1 control signaling. The Nud15 TCI states can be applied to a downlink channel/signal, an uplink channel/signal, or jointly to uplink and downlink channels/ signals. The Nud17 TCI states can be applied to a downlink channel/signal, an uplink channel/signal, or jointly to uplink and downlink channels/signals.

In one embodiment VII.1, a UE is configured with k>1 TCI states, where the set of k TCI states is according to at least one of the following alternatives VII-1 through VII-4. The $k_1$ TCI states correspond to the TCI Type J-TCI=$(A_i, B_i, C_i)$, the $k_2$ TCI states correspond to the TCI Type DL-TCI=$B_i$, and the $k_3$ TCI states correspond to the TCI Type UL-TCI=$C_i$. An example of k TCI states and their types are shown in TABLE 17.

TABLE 17

Example of k TCI states

| TCI state | TCI type | Components Common | DL-specific | UL-specific |
|---|---|---|---|---|
| 0 | J-TCI ($a_0$) | $A_0$ | $B_0$ | $C_0$ |
| 1 | J-TCI ($a_1$) | $A_1$ | $B_1$ | $C_1$ |
| ... | ... | | | |
| $k_1 - 1$ | J-TCI ($a_{k_1-1}$) | $A_{k_1-1}$ | $B_{k_1-1}$ | $C_{k_1-1}$ |
| $k_1$ | DL-TCI ($b_0$) | | $B_{k_1}$ | |
| $k_1 + 1$ | DL-TCI ($b_1$) | | $B_{k_1+1}$ | |
| ... | ... | | ... | |
| $k_1 + k_2 - 1$ | DL-TCI ($b_{k_2-1}$) | | $B_{k_1+k_2-1}$ | |
| $k_1 + k_2$ | UL-TCI ($c_0$) | | | $C_{k_1+k_2}$ |
| $k_1 + k_2 + 1$ | UL-TCI ($c_1$) | | | $C_{k_1+k_2+1}$ |
| ... | ... | | | ... |
| $k_1 + k_2 + k_3 - 1 =$ $k - 1$ | UL-TCI ($c_{k_3-1}$) | | | $C_{k_1+k_2+k_3-1}$ |

In one embodiment VII.2, a UE is configured with k>1 TCI states, where the set of k TCI states is according to at least one of the following alternatives VII-1 through VII-4. The $k_1$ TCI states correspond to the TCI Type J-TCI=$(A_i, B_i, C_i)$, the $k_2$ TCI states correspond to the TCI Type DL-TCI= $(A_i, B_i)$, and the $k_3$ TCI states correspond to the TCI Type UL-TCI=$(A_i, C_i)$. An example of k TCI states and their types are shown in TABLE 18.

TABLE 18

Example of k TCI states

| TCI state | TCI type | Components Common | DL-specific | UL-specific |
|---|---|---|---|---|
| 0 | J-TCI ($a_0$) | $A_0$ | $B_0$ | $C_0$ |
| 1 | J-TCI ($a_1$) | $A_1$ | $B_1$ | $C_1$ |
| ... | ... | | | |
| $k_1 - 1$ | J-TCI ($a_{k_1-1}$) | $A_{k_1-1}$ | $B_{k_1-1}$ | $C_{k_1-1}$ |
| $k_1$ | DL-TCI ($b_0$) | $A_{k_1}$ | $B_{k_1}$ | |

TABLE 18-continued

Example of k TCI states

| | | Components | | |
|---|---|---|---|---|
| TCI state | TCI type | Common | DL-specific | UL-specific |
| $k_1 + 1$ | DL-TCI ($b_1$) | $A_{k_1+1}$ | $B_{k_1+1}$ | |
| ... | ... | ... | ... | |
| $k_1 + k_2 - 1$ | DL-TCI ($b_{k_2-1}$) | $A_{k_1+k_2-1}$ | $B_{k_1+k_2-1}$ | |
| $k_1 + k_2$ | UL-TCI ($c_0$) | $A_{k_1+k_2}$ | | $C_{k_1+k_2}$ |
| $k_1 + k_2 + 1$ | UL-TCI ($c_1$) | $A_{k_1+k_2+1}$ | | $C_{k_1+k_2+1}$ |
| ... | ... | ... | | ... |
| $k_1 + k_2 + k_3 - 1 =$ $k - 1$ | UL-TCI ($c_{k_3-1}$) | $A_{k_1+k_2+k_3-1}$ | | $C_{k_1+k_2+k_3-1}$ |

In one embodiment VII.3, a UE is configured with k>1 TCI states, where the set of k TCI states is according to at least one of the following alternatives VII-1 through VII-4. The $k_1$ TCI states correspond to the TCI Type J-TCI=($A_i$, $B_i$, $C_i$), the $k_2$ TCI states correspond to the TCI Type DL-TCI= ($A_i$, $B_i$) or $B_i$, and the $k_3$ TCI states correspond to the TCI Type UL-TCI=($A_i$, $C_i$) or $C_i$.

In one embodiment VII.4, a UE is configured with a TCI type for DL and UL beam indication, where the TCI type can be joint (J-TCI) or separate (DL-TCI or/and UL-TCI). Depending on the configured TCI type, the UE uses one of the following beam indication mechanisms: (a) the joint DL/UL beam indication via J-TCI or (b) DL beam indication and UL beam indication via DL-TCI and UL-TCI respectively. In one example, this configuration of the TCI type can be via higher layer (RRC) signaling of a parameter, e.g., tci-Type.

The following two embodiments (C-1 and C-2) are examples of DL or/and UL multi-beam operations that utilize J-TCI-based DL or/and UL beam indication. In the first example embodiment (C-1), aperiodic CSI-RS is transmitted by the NW and measured by the UE. This embodiment can be used, for instance, when reciprocity between the UL and DL beam-pair-link (BPL) holds. This condition is termed "UL-DL beam correspondence." In the second example embodiment (C-2), aperiodic SRS is triggered by the NW and transmitted by the UE so that the NW (or a gNB) can measure the UL channel quality for the purpose of assigning an UL TX or DL RX beam. This embodiment can be used whether UL-DL beam correspondence holds or not. Although aperiodic RS is used in these two examples, periodic or semi-persistent RS can also be used.

Figure 30:
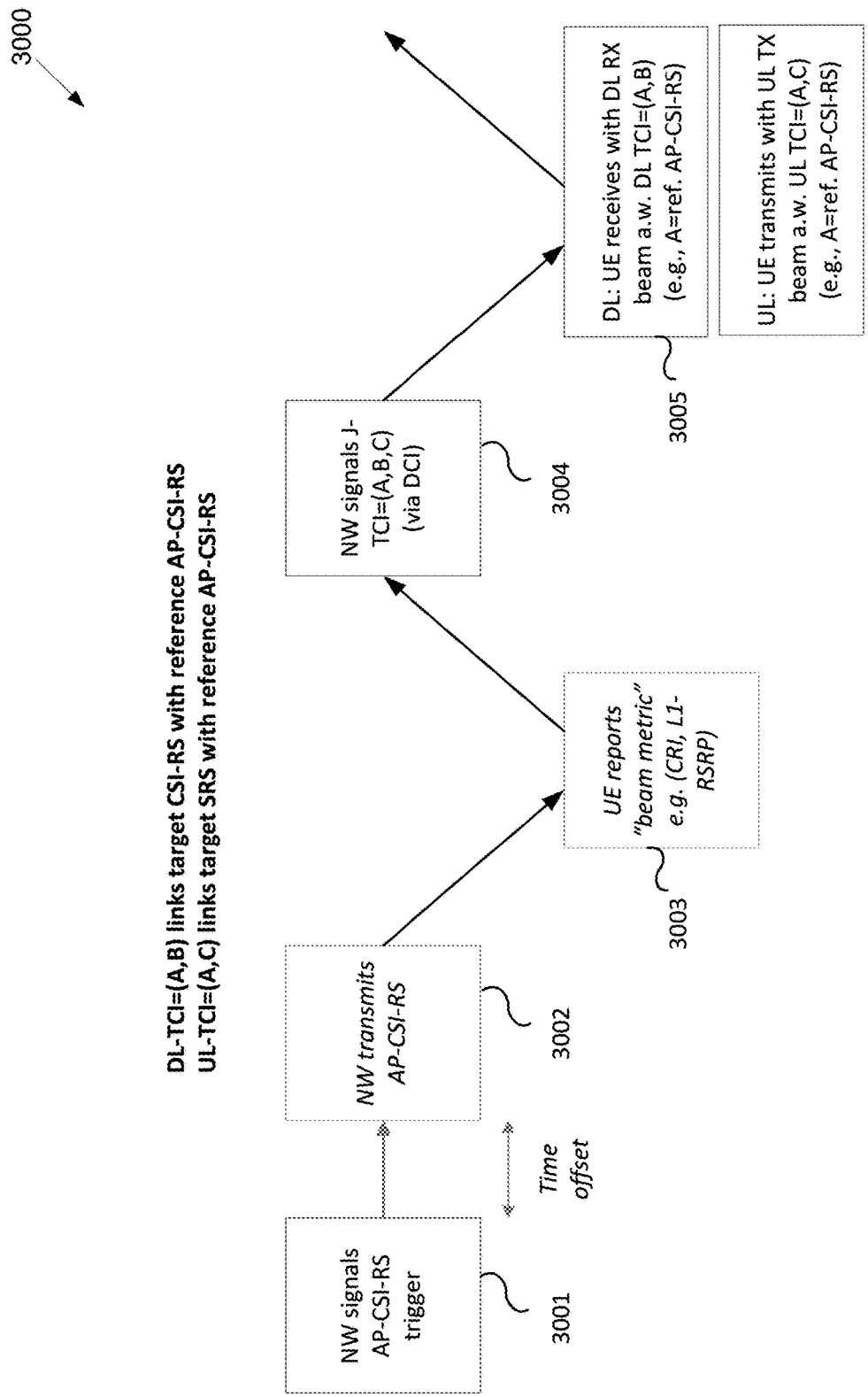
FIG. 30 illustrates an example DL and/or UL multi-beam operation according to embodiments of the present disclosure.

FIG. 30 illustrates a flowchart of a method 3000 for DL and/or UL multi-beam operation according to embodiments of the present disclosure. The method 3000 may be performed by a UE (e.g., 111-116 as illustrated in FIG. 1) and an eNB (e.g., 101-103 as illustrated in FIG. 1). An embodiment of the method 3000 shown in FIG. 30 is for illustration only. One or more of the components illustrated in FIG. 30 can be implemented in specialized circuitry configured to perform the noted functions or one or more of the components can be implemented by one or more processors executing instructions to perform the noted functions.

As illustrated in FIG. 30 (embodiment C-1), DL or/and UL multi-beam operation (method 3000) starts with the gNB/NW signaling to a UE an aperiodic CSI-RS (AP-CSI-RS) trigger or indication (step 3001). This trigger or indication can be included in a DCI (either UL-related or DL-related or both, either separately or jointly signaled with an aperiodic CSI request/trigger) and indicate transmission of AP-CSI-RS in a same (zero time offset) or later slot/subframe (>0 time offset). Upon receiving the AP-CSI-RS transmitted by the gNB/NW (step 3002), the UE measures the AP-CSI-RS and, in turn, calculates and reports a "beam metric" (indicating quality of a particular TX beam hypothesis) (step 3003). Examples of such beam reporting are CSI-RS resource indicator (CRI) or SSB resource indicator (SSB-RI) coupled with its associated L1-RSRP/L1-RSRQ/L1-SINR/CQI.

Upon receiving the beam report from the UE, the gNB/NW can use the beam report to select an UL TX or/and DL RX beam for the UE and indicate the UL TX or/and DL RX beam selection (step 3004) using the J-TCI field in either the UL-related DCI (that carries or doesn't carry the UL grant, such as DCI format 0_1, or DCI format 0_2 in NR) or DL-related DCI (that carries or doesn't carry the DL assignment, such as DCI format 1_1 or DCI format 1_2 in NR) or both. In this case, the J-TCI indicates a reference RS (in this case, an AP-CSI-RS) representing the selected UL RX or/and DL TX beam (by the gNB/NW).

Upon successfully decoding the DCI with the J-TCI (in step 3005), (1) for UL, the UE selects an UL TX beam and performs UL transmission (such as data transmission on PUSCH) with the UL TX beam associated with the reference CSI-RS, and (2) for DL, the UE selects an DL RX beam and performs DL reception (such as data reception via PDSCH) with the DL RX beam associated with the reference CSI-RS.

For this embodiment (C-1), as described above, the UE selects the UL TX or/and DL RX beam based on the derived DL RX beam associated with the reference RS index signaled via the J-TCI field. In this case, the CSI-RS resources (or, in general, the DL RS resources including CSI-RS, SSB, or a combination of the two) configured for the UE as the reference RS resources can be linked to (associated with) "beam metric" reporting such as CRI/L1-RSRP or L1-SINR.

Figure 31:
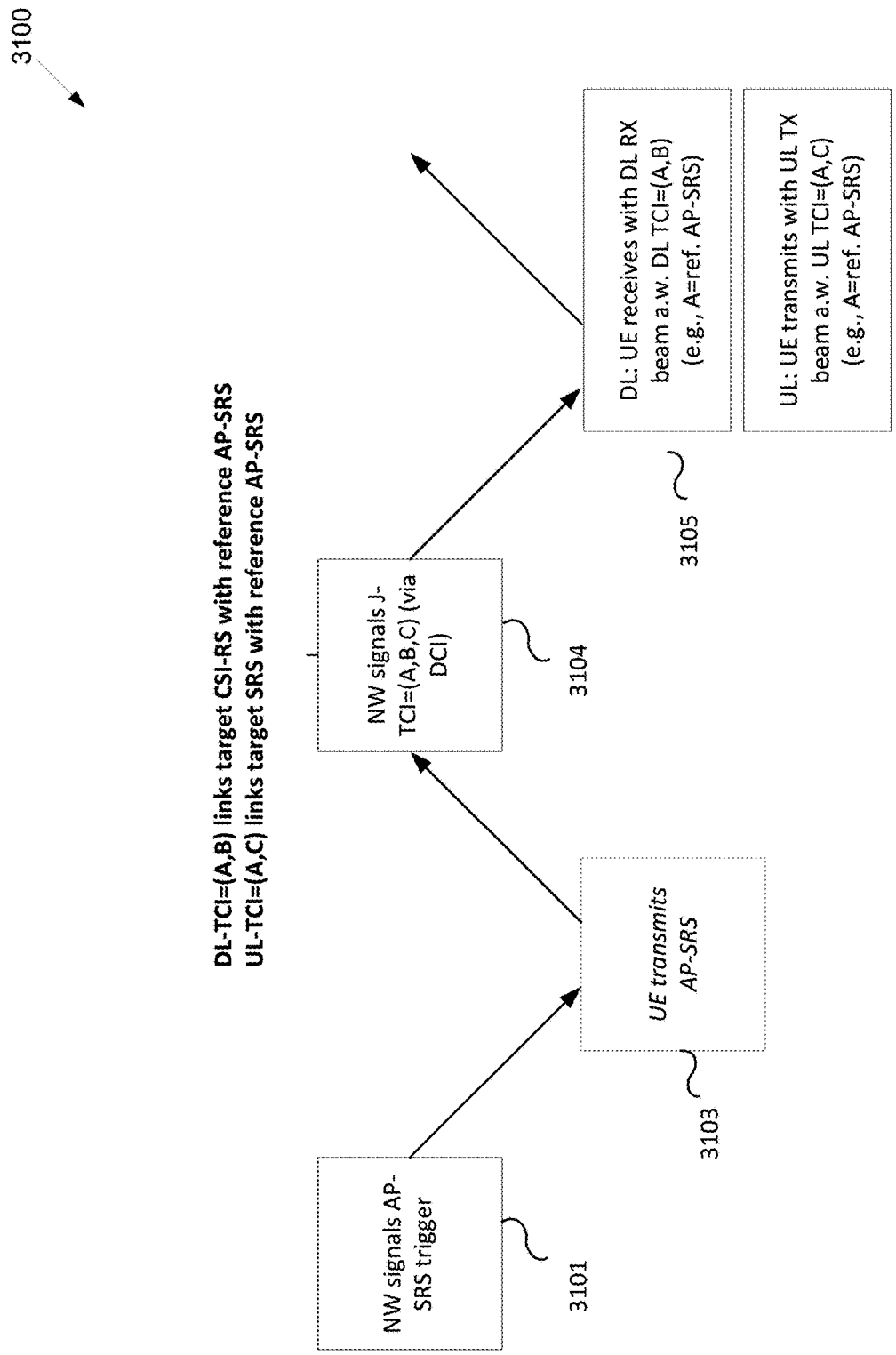
FIG. 31 illustrates another example DL and/or UL multi-beam operation according to embodiments of the present disclosure.

FIG. 31 illustrates a flowchart of a method 3100 for DL and/or UL multi-beam operation according to embodiments of the present disclosure. The method 3000 may be performed by a UE (e.g., 111-116 as illustrated in FIG. 1) and an eNB (e.g., 101-103 as illustrated in FIG. 1). An embodiment of the method 3100 shown in FIG. 31 is for illustration only. One or more of the components illustrated in FIG. 31 can be implemented in specialized circuitry configured to perform the noted functions or one or more of the components can be implemented by one or more processors executing instructions to perform the noted functions.

As illustrated in FIG. 31 (embodiment C-2), DL or/and UL multi-beam operation (method 3100) starts with the gNB/NW signaling to a UE an aperiodic SRS (AP-SRS) trigger or request (step 3101). This trigger can be included in a DCI (either UL-related or DL-related or both). Upon receiving and decoding the AP-SRS trigger (step 3102), the UE transmits AP-SRS to the gNB/NW (step 3103) so that the NW (or gNB) can measure the UL propagation channel and select an UL TX or/and DL RX beam for the UE.

The gNB/NW can then indicate the UL TX or DL RX beam selection (step 3104) using the J-TCI field in either the UL-related DCI (that carries or does not carry the UL grant, such as DCI format 0_1 or DCI format 0_2 in NR) or DL-related DCI (that carries or doesn't carry the DL assignment, such as DCI format 1_1 or DCI format 1_2 in NR) or both. In this case, the J-TCI indicates a reference RS (in this case, an AP-SRS) representing the selected UL TX or/and DL RX beam.

Upon successfully decoding the DCI with the J-TCI (in step 3105), (1) for UL, the UE performs UL transmission (such as data transmission on PUSCH) with the UL TX beam indicated by the J-TCI, and (2) for DL, the UE performs DL reception (such as data reception via PDSCH) with the DL RX beam indicated by the J-TCI.

For this embodiment (C-2), as described above, the UE selects the UL TX or/and DL RX beam from the reference RS (in this case SRS) index signaled via the J-TCI field.

For any of the embodiments or sub-embodiments, the terms TCI, J-TCI, DL-TCI, and UL-TCI field are used for illustrative purposes. Other terms and/or other DCI fields that are of a same functionality (that is, referring to at least one pre-configured TCI, J-TCI, DL-TCI, or UL-TCI state) can be used and are therefore covered in the present disclosure. For instance, the function of the UL-TCI field can also be achieved by reusing the existing SRI field in DCI format 0_1 in Rel.15 NR. In this case, however, the SRI field is interpreted not according to the SpatialRelationInfo specified in Rel.15 NR, but the UL TCI state definition (that includes a list of reference RS resource IDs) described above. This SRI field can also be extended to accommodate more UL TCI hypotheses, either with one configured SRS resource or more than one configured SRS resources as described above.

For illustrative purposes the steps of this algorithm are described serially, however, some of these steps may be performed in parallel to each other. The above operation diagrams illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A method performed by a user equipment (UE) in a wireless communication system, the method comprising:
   receiving (i) first information indicating whether a joint transmission configuration indicator (TCI) state is configured for an uplink (UL) transmission and a downlink (DL) reception and (ii) second information on one or more TCI states, wherein in case that the first information indicates that the joint TCI state is configured for the UL transmission and the DL reception, a configuration for each of the one or more TCI states in the second information includes (i) quasi co-located (QCL) information for the UL transmission and the DL reception and (ii) an identifier of a pathloss reference signal for the UL transmission;
   identifying a TCI state, among the one or more TCI states, to be used for the UL transmission and the DL reception;
   performing the UL transmission based on the identified TCI state; and
   performing the DL reception based on the identified TCI state.

2. The method of claim 1, wherein identifying the TCI state to be used for the UL transmission and the DL reception comprises:
   receiving, via medium access control-control element (MAC-CE) signaling, an activation message to map at least one of the one or more TCI states to at least one codepoint,
   wherein in case that a number of the at least one codepoint is one, the identified TCI state corresponds to a codepoint indicated by the activation message.

3. The method of claim 1, wherein the configuration further includes at least one of a pathloss compensation factor or a power control closed loop index.

4. The method of claim 1, wherein the first information and the second information are received via a radio resource control (RRC) signaling.

5. The method of claim 1, further comprising:
   receiving downlink control information (DCI) including a TCI field,
   wherein the identified TCI state is identified based on the DCI, and
   wherein the identified TCI state is applied starting from a first slot that is at least a specific time after a last symbol of a physical uplink control channel (PUCCH) with a positive hybrid automatic repeat request-acknowledgement (HARQ-ACK) corresponding to the DCI.

6. A user equipment (UE) in a wireless communication system, the UE comprising:
   a transceiver configured to transmit and receive a signal; and
   a processor operably coupled to the transceiver, the processor configured to:
      receive, via the transceiver, (i) first information indicating whether a joint transmission configuration indicator (TCI) state is configured for an uplink (UL) transmission and a downlink (DL) reception and (ii) second information on one or more TCI states, wherein in case that the first information indicates that the joint TCI state is configured for the UL transmission and the DL reception, a configuration for each of the one or more TCI states in the second information includes (i) quasi co-located (QCL) information for the UL transmission and the DL reception and (ii) an identifier of a pathloss reference signal for the UL transmission,
      identify, among the one or more TCI states, a TCI state to be used for the UL transmission and the DL reception,
      perform the UL transmission based on the identified TCI state, and
      perform the DL reception based on the identified TCI state.

7. The UE of claim 6, wherein to identify the TCI state to be used for the UL transmission and the DL reception, the processor is configured to:
   receive, via the transceiver and via medium access control-control element (MAC-CE) signaling, an activation message to map at least one of the one or more TCI states to at least one codepoint,
   wherein in case that a number of the at least one codepoint is one, the identified TCI state corresponds to a codepoint indicated by the activation message.

8. The UE of claim 6, wherein the configuration further includes at least one of a pathloss compensation factor or a power control closed loop index.

9. The UE of claim 6, wherein the first information and the second information are received via a radio resource control (RRC) signaling.

10. The UE of claim 6, wherein:

the transceiver is further configured to receive downlink control information (DCI) including a TCI field, the identified TCI state is identified based on the DCI, and the identified TCI state is applied starting from a first slot that is at least a specific time after a last symbol of a physical uplink channel (PUCCH) with a positive hybrid automatic repeat request-acknowledgement (HARQ-ACK) corresponding to the DCI.

11. A base station in a wireless communication system, the base station comprising:

a processor; and a transceiver operably coupled to the processor, the transceiver configured to:

transmit, to a user equipment (UE), (i) first information indicating whether a joint transmission configuration indicator (TCI) state is configured for an uplink (UL) and a downlink (DL) and (ii) second information on one or more TCI states, wherein in case that the first information indicates that the joint TCI state is configured for the UL transmission and the DL reception, a configuration for each of the one or more TCI states in the second information includes (i) quasi co-located (QCL) information for the UL and the DL and (ii) an identifier of a pathloss reference signal for the UL, receive, from the UE, an UL signal based on a TCI state among the one or more TCI states, and transmit, to the UE, a DL signal based on the TCI state.

12. The base station of claim 11, wherein:

the transceiver is further configured to transmit, to the UE, an activation message to map at least one of the one or more TCI states to at least one codepoint, via medium access control-control element (MAC-CE) signaling, and in case that a number of the at least one codepoint is one, the TCI state corresponds to a codepoint indicated by the activation message.

13. The base station of claim 11, wherein the first information and the second information are transmitted via a radio resource control (RRC) signaling.

14. The base station of claim 11, wherein the configuration further includes at least one of a pathloss compensation factor or a power control closed loop index.

15. The base station of claim 11, wherein:

the transceiver is further configured to transmit, to the UE, downlink control information (DCI) including a TCI field, the TCI state is based on the DCI, and the TCI state is applied starting from a first slot that is at least a specific time after a last symbol of a physical uplink control channel (PUCCH) with a positive hybrid automatic repeat request-acknowledgement (HARQ-ACK) corresponding to the DCI.

* * * * *